US012717373B2

(12) United States Patent
Koorapati et al.

(10) Patent No.: US 12,717,373 B2
(45) Date of Patent: Aug. 25, 2026

(54) ADAPTIVE LOCAL THROTTLE MANAGEMENT OF PROCESSING CIRCUITS BASED ON DETECTED STATES IN AN INTEGRATED CIRCUIT (IC) CHIP

(71) Applicant: QUALCOMM Incorporated, San Diego, CA (US)

(72) Inventors: Sagar Koorapati, Longview, TX (US); Manu Gulati, Saratoga, CA (US)

(73) Assignee: QUALCOMM Incorporated, San Diego, CA (US)

( * ) Notice: Subject to any disclaimer, the term of this patent is extended or adjusted under 35 U.S.C. 154(b) by 170 days.

(21) Appl. No.: 18/623,192

(22) Filed: Apr. 1, 2024

(65) Prior Publication Data

US 2024/0427369 A1 Dec. 26, 2024

Related U.S. Application Data

(63) Continuation of application No. 18/339,461, filed on Jun. 22, 2023, now Pat. No. 12,468,330.

(51) Int. Cl.
*G06F 1/08* (2006.01)
*G06F 1/26* (2006.01)

(52) U.S. Cl.
CPC . *G06F 1/08* (2013.01); *G06F 1/26* (2013.01)

(58) Field of Classification Search
CPC .......... G06F 1/08; G06F 1/3206; G06F 1/324; G06F 1/3237
See application file for complete search history.

(56) References Cited

U.S. PATENT DOCUMENTS 6,636,976 B1 * 10/2003 Grochowski ......... G06F 1/3237 713/320
8,478,928 B2 * 7/2013 Lee ..................... G06F 12/0607 711/E12.001

(Continued)

FOREIGN PATENT DOCUMENTS

WO 2015168164 A1 11/2015

OTHER PUBLICATIONS

International Search Report and Written Opinion for International Patent Application No. PCT/US2024/028303, mailed Sep. 2, 2024, 16 pages.

(Continued)

*Primary Examiner* — Hyun Soo Kim
(74) *Attorney, Agent, or Firm* — W&T

(57) ABSTRACT

A throttle management circuit is configured to receive throttle request(s) from at least one state detection circuit, generate and store a throttle recommendation in each clock cycle based on the received throttle request(s), and generate a throttle control signal to throttle activity of processing circuits based on a recent and stored throttle recommendation. The throttle requests may be based on measures of electric states, thermal states, and/or activity states among the processing circuits monitored by the LAM circuit and the measured states may be caused by activity of the processing circuits. The throttle management circuit can provide a local, dynamic, low-latency response to mitigate harm that could otherwise be caused by the measured local states of the processing circuits while waiting for a response from the power management hierarchy. In some examples, the throttle recommendation generated in each cycle affects the throttle control signal for a plurality of subsequent cycles.

25 Claims, 17 Drawing Sheets

(56) References Cited

U.S. PATENT DOCUMENTS

| | | | | |
|---|---|---|---|---|
| 11,442,890 | B1 * | 9/2022 | Volpe | G06N 3/063 |
| 2009/0300329 | A1 | 12/2009 | Naffziger et al. | |
| 2012/0221871 | A1 | 8/2012 | Suryanarayanan et al. | |
| 2015/0309551 | A1 * | 10/2015 | Yeager | G06F 11/3058 713/320 |
| 2016/0048188 | A1 * | 2/2016 | Kim | G06F 1/3206 713/323 |
| 2016/0231795 | A1 * | 8/2016 | Dressler | G06F 1/3287 |
| 2020/0064898 | A1 * | 2/2020 | Shen | G06F 1/324 |
| 2020/0341533 | A1 * | 10/2020 | Ho | G06F 1/3296 |
| 2021/0096635 | A1 | 4/2021 | Kalyanam et al. | |
| 2022/0057827 | A1 * | 2/2022 | Kwon | G06F 1/324 |
| 2022/0100247 | A1 | 3/2022 | Garg et al. | |
| 2022/0197361 | A1 | 6/2022 | Gendler et al. | |
| 2024/0427367 | A1 | 12/2024 | Koorapati et al. | |

OTHER PUBLICATIONS

U.S. Appl. No. 18/339,461, filed Jun. 22, 2023.

* cited by examiner

ADAPTIVE LOCAL THROTTLE MANAGEMENT OF PROCESSING CIRCUITS BASED ON DETECTED STATES IN AN INTEGRATED CIRCUIT (IC) CHIP

PRIORITY APPLICATION

The present application is a continuation of and claims priority to U.S. patent application Ser. No. 18/339,461, filed Jun. 22, 2023 and entitled "ADAPTIVE LOCAL THROTTLE MANAGEMENT OF PROCESSING CIRCUITS BASED ON DETECTED STATES IN AN INTEGRATED CIRCUIT (IC) CHIP," which is incorporated herein by reference in its entirety.

BACKGROUND

I. Field of the Disclosure

The field of the disclosure relates to processor-based systems (e.g., a central processing unit (CPU)-based systems, graphic processing unit (GPU)-based systems), or a neural network processing unit (NPU)-based system), and, more particularly, to power distribution management of circuits in the processor-based systems.

II. Background

Microprocessors, also known as processing units (PUs), perform computational tasks in a wide variety of applications. One type of conventional microprocessor or PU is a central processing unit (CPU). Another type of microprocessor or PU is a dedicated processing unit known as a graphics processing unit (GPU). A GPU is designed with specialized hardware to accelerate the rendering of graphics and video data for display. A GPU may be implemented as an integrated element of a general-purpose CPU or as a discrete hardware element that is separate from the CPU. Other examples of PUs may include neural network processing units or neural processing units (NPUs). CPUs are configured to execute software instructions that cause a processor to fetch data from a location in memory and to perform one or more processor operations using the fetched data.

PUs are included in a computer system that includes other supporting processing devices (circuits) involved with or accessed as part of performing computing operations in the computer system. Examples of these other supporting processing devices include memory, input/output (I/O) devices, secondary storage, modems, video processors, and related interface circuits. The PUs and supporting processing devices in a computer system are referred to collectively as processing devices. Processing devices of a processor-based system can be provided in separate ICs in separate IC chips or may be aggregated in a larger IC, like a system-on-a-chip (SoC) IC, wherein some or all of these processing devices are integrated into the same IC chip. For example, an SoC IC chip may include a PU that includes a plurality of processor cores and supporting processing devices, such as a memory system that includes cache memory and memory controllers for controlling access to external memory, I/O interfaces, power management systems, etc. A SoC may be particularly advantageous for applications in which a limited area is available for the computer system (e.g., a mobile computing device such as a cellular device). To manage power distributed to the processing devices, the SoC may also include a power management system that includes one or more power rails in the SoC that supply power to its components. A separate power management integrated circuit (PMIC) that can be off-chip or on-chip with the SoC can independently control power supplied to the power rails. The SoC may be designed with a plurality of different power rails that are distributed within the SoC to provide power to various clusters of the processing devices for their operation. For example, all the processor cores in the SoC may be coupled to a common power rail for power, whereas supporting processing devices may be powered from separate power rails in the SoC, depending on the design of the SoC.

SUMMARY OF THE DISCLOSURE

Aspects disclosed herein include adaptive local activity throttling based on measured states of processing circuits in an integrated circuit (IC) chip. Related methods of throttling local activity in an IC chip are also disclosed. The IC chip includes a processor as well as integrated supporting processing devices (e.g., network nodes, memory controllers, internal memory, input/output (I/O) interface circuits, etc.) for the processor. For example, the processor may be a central processing unit (CPU), a graphics processing unit (GPU), or a neural network processing unit (NPU), wherein the processor includes multiple processing units (PUs) and/or processor cores. The processor-based system may be provided as a system-on-a-chip (SoC) that includes a processor and the integrated supporting processing devices for the PU. As examples, the SoC may be employed in smaller mobile devices (e.g., a cellular phone, a laptop computer), as well as enterprise systems such as server chips in computer servers. The IC chip may also include a hierarchical power management system that is configured to control power consumption by the processor-based system at both local and centralized levels to achieve a desired performance within an overall power budget for the IC chip. The hierarchical power management system can be configured to control power consumption by controlling the power level (e.g., by controlling the voltage level) distributed at one or more power rails in the IC chip that provide power to the PUs and the integrated supporting processing devices. For example, the hierarchical power management system can be configured to provide additional power to certain power rails to supply power to higher current-demanding devices to achieve higher performance while providing less power to other power rails to keep the overall power within power and/or thermal limits for the IC chip. The hierarchical power management system can also be configured to control power consumption by throttling performance (e.g., frequency) of the processing devices in the processor-based system, which in turn throttles (i.e., reduces, maintains, or increases) their current demand and thus their power consumption. Note as used herein, throttle can mean to take an action that will decrease or increase a parameter that affects power and thus results in a respective decrease or increase in power consumption.

The hierarchical power management system is configured to throttle performance of the processing devices in the processor-based system, because the level of processing activity in the processing devices in a SoC can vary based on workload conditions. Some power rails in the SoC may experience heightened current demand. It is desired that this current demand does not exceed the maximum current limitations of its respective power rail. Even if a higher current demand on a power rail is within its maximum current limits, a heightened activity of a processing device in the SoC can generate a sudden increase in current demand from its power rail, referred to as a "di/dt" event. This di/dt event can cause a voltage droop in the power rail, thus negatively affecting performance of processing devices powered by such power rail. Also, even if a higher current demand on a power rail is within its maximum current limits, a higher current demand can increase the overall power consumption of the SoC. Processing devices may have a maximum power rating to properly operate and/or to not impact performance in an undesired manner. Higher current demand from processing devices can also generate excess heat. Thus, the maximum power rating of the SoC may be based in part on the ability of the SoC to dissipate heat generated by the processing devices during their operation.

In exemplary aspects, the hierarchical power management system may include local area management (LAM) circuits distributed in the IC chip that are each associated with one or more processing devices in the IC chip. The LAM circuits may be configured to generate power events associated with monitored processing devices (may also be referred to as "monitored processing circuits") in the IC chip that represent power consumption associated with the monitored processing devices in the IC chip. The power events can be reported from local areas in the IC chip, where power estimations for particular monitored processing devices are performed, to a centralized power estimation and limit (PEL) circuit in the hierarchical power management system. The PEL circuit may be configured to estimate and control (i.e., throttle) power in the processor-based system in the IC chip to achieve a desired performance within an overall power budget for the IC chip. The PEL circuit may determine how to throttle power based on the received power events. For example, the power events may be associated with estimations of power consumption that can be thought of as power throttle recommendations to throttle power in the IC chip if the estimated power consumption exceeds the power limits of the IC chip or negatively affects performance.

The activity of the processing devices in the IC chip may affect its steady state, current demand (i), and current transients (di/dt), and thus its power consumption. Because the IC chip may be larger in terms of die area due to the integration of the PUs and integrated supporting processing devices, there can be a significant delay between when the PEL circuit receives a power event regarding power consumption of a monitored processing device and the PEL circuit throttling power in the IC chip to throttle power consumption in response. This delay can, for example, cause devices in the IC chip to temporarily continue to consume excess power that can cause thermal and/or power issues (e.g., di/dt issues, voltage droop, heat generation) or permanent damage before the power management circuit has time to react.

In this regard, the processor-based system includes, additionally or alternatively, a throttle management circuit configured to receive throttle request(s) from one or more state detection circuits, generate and store a throttle recommendation in each clock cycle based on the received throttle request(s), and generate a throttle control signal to throttle activity of processing circuits based on a recent and stored throttle recommendations. The throttle requests may be based on measures of electric states, thermal states, and/or activity states among the processing circuits monitored by the LAM circuit, and the measured states may be caused by the activity of the processing circuits. The throttle management circuit can provide a local, dynamic, low-latency response to mitigate harm that could otherwise be caused by the measured local states of the processing circuits, e.g., while waiting for a response from a power management hierarchy. In some examples, the throttle recommendation generated in each cycle may affect the throttle control signal for a plurality of subsequent cycles. In other examples, the generated throttle recommendation may override the stored throttle recommendations.

In this regard, in one exemplary aspect, an integrated circuit (IC) chip comprising a processor-based system is disclosed. The processor-based system includes processing circuits operating in response to a clock signal and at least one state detection circuit configured to generate at least one throttle request based on one or more measures of at least one state of the processing circuits. The processor-based system further includes a throttle management circuit that includes a throttle request merge circuit configured to receive the at least one throttle request from the at least one state detection circuit and generate, in each cycle of the clock signal, a throttle recommendation based on the at least one throttle request, The throttle management circuit further includes a plurality of throttle recommendation registers each configured to, in a sequence: receive the throttle recommendation generated in the throttle request merge circuit in a first cycle of the clock signal, and store the received throttle recommendation for a first plurality of consecutive cycles of the clock signal after the first cycle. The processor-based system further includes a throttle recommendation aggregation circuit configured to generate a throttle result based on the throttle recommendations stored in the plurality of throttle recommendation registers and a throttle control circuit configured to receive the throttle result and generate, in each cycle of the clock signal, a throttle control signal to selectively throttle activity of the processing circuits.

In another exemplary aspect, a method of throttling activity in processing circuits in a processor-based system is disclosed. The method includes operating processing circuits in response to a clock signal, generating, in at least one state detection circuit, at least one throttle request based on one or more measures of at least one state of the processing circuits, and generating, in each cycle of the clock signal for a first plurality of consecutive cycles of the clock signal, a throttle recommendation based on the at least one throttle request. The method includes storing, in a plurality of throttle recommendation registers, the throttle recommendations generated in the first plurality of consecutive cycles of the clock signal, generating a throttle result based on the throttle recommendations stored in the plurality of throttle recommendation registers, and generating, in each cycle of the clock signal, a throttle control signal to throttle activity of the processing circuits based on the throttle control signal.

DETAILED DESCRIPTION

Figure 1:
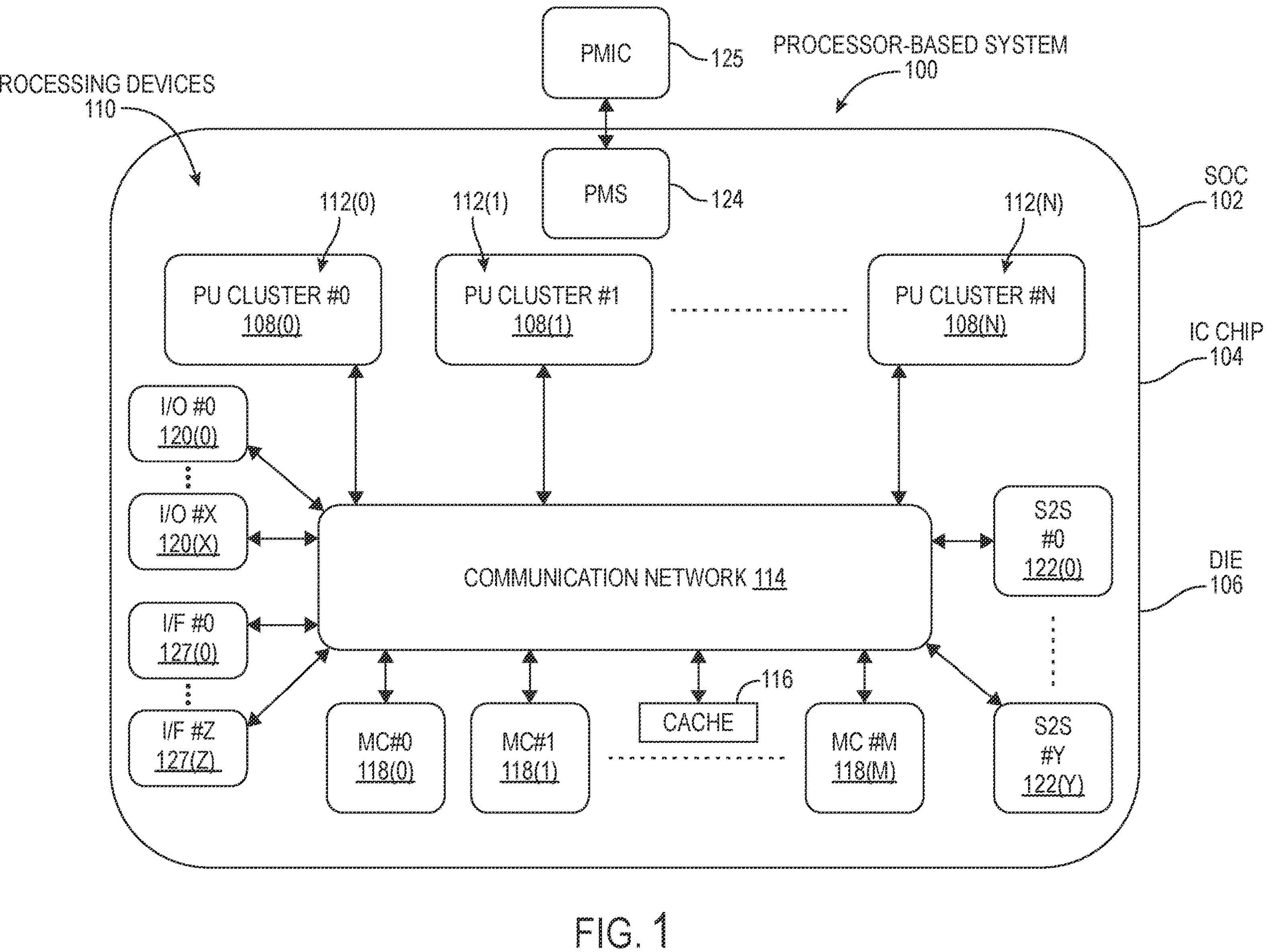
FIG. 1 is a schematic diagram of an exemplary processor-based system in the form of an exemplary system-on-a-chip (SoC) in an integrated circuit (IC) chip.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed herein may optionally include a hierarchical power estimation and throttling in a processor-based system in an integrated circuit (IC) chip. Related power management and power throttling methods are also disclosed. The IC chip includes a processor as well as integrated supporting processing devices (e.g., network nodes, memory controllers, internal memory, input/output (I/O) interface circuits, etc.) for the processor. For example, the processor may be a central processing unit (CPU), graphics processing unit (GPU), or neural network processing unit (NPU), wherein the processor includes multiple processing units (PUs) and/or processor cores. The processor-based system may be provided as a system-on-a-chip (SoC) that includes a processor and the integrated supporting processing devices for the PU. As examples, the SoC may be employed in smaller mobile devices (e.g., a cellular phone, a laptop computer), as well as enterprise systems such as server chips in computer servers. The IC chip may also include a hierarchical power management system that is configured to control power consumption by the processor-based system at both local and centralized levels to achieve a desired performance within an overall power budget for the IC chip. The hierarchical power management system can be configured to control power consumption by controlling the power level (e.g., voltage level) distributed at one or more power rails in the IC chip that provide power to the PUs and the integrated supporting processing devices. For example, the hierarchical power management system can be configured to provide additional power to certain power rails supplying power to higher current-demanding devices to achieve higher performance while providing less power to other power rails to keep the overall power within power and/or thermal limits for the IC chip. The hierarchical power management system can also be configured to control power consumption by throttling performance (e.g., frequency) of the processing devices in the processor-based system, which in turn throttles (i.e., reduces, maintains, or increases) their current demand and thus their power consumption. Note as used herein, throttle can mean to take an action that will decrease or increase a parameter that affects power and thus results in a respective decrease or increase in power consumption.

In exemplary aspects, the hierarchical power management system may include local area management (LAM) circuits distributed in the IC chip that are each associated with one or more processing devices in the IC chip. The LAM circuits may be configured to generate power events associated with its monitored processing devices in the IC chip that represent power consumption associated with the monitored processing devices in the IC chip. The power events can be reported from local areas in the IC chip, where power estimations for particular monitored processing devices are performed, to a centralized power estimation and limit (PEL) circuit in the hierarchical power management system. The PEL circuit is configured to estimate and control (i.e., throttle) power in the processor-based system in the IC chip to achieve a desired performance within an overall power budget for the IC chip. The PEL circuit may determine how to throttle power based on the received power events. For example, the power events may be associated with estimations of power consumption that can be thought of as power throttle recommendations to throttle power in the IC chip if the estimated power consumption exceeds the power limits of the IC chip or negatively affects performance.

The activity of the processing devices in the IC chip may affect its steady state current demand and transient current demands (e.g., changes in current flow rate referred to as "di/dt") and thus affect power consumption. Because the IC chip may be larger in terms of die area due to the integration of the processing units and integrated supporting processing devices, there can be a significant delay between when PEL circuit receives a power event regarding the consumption of a monitored processing device and the PEL circuit throttling power in the IC chip to throttle power consumption in response. This delay can, for example, cause devices in the IC chip to temporarily continue to consume excess power that can cause performance issues (e.g., di/dt issues, voltage droop, heat generation) before the power management circuit has time to react.

Additionally or alternatively, the processor-based system includes an exemplary throttle management circuit configured to receive throttle request(s) from one or more state detection circuits, generate and store a throttle recommendation in each clock cycle based on the received throttle request(s), and generate a throttle control signal to throttle activity of processing circuits based on a recent and stored throttle recommendations. The throttle requests may be based on measures of electric states, thermal states, and/or activity states among the processing circuits, or monitored by the LAM circuit, and the measured states may be caused by activity of the processing circuits. The throttle management circuit can provide a local, dynamic, low-latency response to mitigate harm that could otherwise be caused by the measured local states of the processing circuits while waiting for a response from the power management hierarchy. In some examples, the throttle recommendation generated in each cycle will affect the throttle control signal for a plurality of subsequent cycles. In other examples, the generated throttle recommendation may override the stored throttle recommendations.

In this regard, FIG. 1 is a schematic diagram of an exemplary processor-based system 100 in the form of an exemplary system-on-a-chip (SoC) 102 in an integrated circuit (IC) chip 104. Optionally, a hierarchical power management system can be provided. The SoC 102 may be employed in smaller mobile devices (e.g., a cellular phone, a laptop computer), as well as enterprise systems such as server chips in computer servers. The processor-based system 100 is first described with regard to FIG. 1 before exemplary hierarchical power management systems that can be provided in the processor-based system 100 to estimate and throttle power consumption in the IC chip 104 are described starting at FIG. 2 below.

With reference to FIG. 1, the processor-based system 100 is provided in a single semiconductor die 106 and integrated into a single IC chip 104. The processor-based system 100 includes a plurality of processing unit (PU) clusters 108(0)-108(N) that are examples of processing devices 110 in the processor-based system 100. Each of the PU clusters 108(0)-108(N) can include one or more processor cores 112(0)-112(N), which are each configured to execute instructions (e.g., software, firmware) to carry out tasks as is known for processors. For example, the PU clusters 108(0)-108(N) may be central processing unit (CPU) clusters wherein one or more of the processor cores 112(0)-112(N) includes CPUs and/or graphics processing unit (GPU) clusters, wherein one or more of the processor cores 112(0)-112(N) includes GPUs. The processor-based system 100 includes an internal communication network 114 that facilitates providing communication paths between the PU clusters 108(0)-108(N) and other supporting processing devices that are also considered processing devices to carry out desired processing requests and related processing tasks. The PU clusters 108(0)-108(N) are communicatively coupled to the internal communication network 114. The internal communication network 114 can be a coherent communication bus that provides a fabric in the processor-based system 100. The internal communication network 114 can be a network fabric that typically consists of network nodes and their communication lines, network of wires, and/or communication channels that provide communication paths that provide reliable communication between different PU clusters 108(0)-108(N) and the supporting processing devices 110. Network nodes are the circuits, such as interconnected switches and routers, that provide a reliable network fabric that provides and receives data on the communication paths between different PU clusters 108(0)-108(N) and the supporting processing devices 110. The fabric provided by the internal communication network 114 also includes a network of wires or communication channels that allow different processing devices in the processor-based system 100 to communicate and exchange data with each other at high speeds.

For example, as shown in FIG. 1, the processor-based system 100 also includes internal cache memory 116 and memory controllers (MCs) 118(0)-118(M) as other types of processing devices 110 that provide access to memory. The cache memory 116 shown in FIG. 1 is a shared cache memory that is communicatively coupled to the internal communication network 114 and can be accessed by the PU clusters 108(0)-108(N) through the internal communication network 114. The processor-based system 100 may also include private cache memory and/or private shared cache memory that is integrated or privately accessible by one or more of the respective PU clusters 108(0)-108(N) without having to access such through the internal communications network 114. The memory controllers 118(0)-118(M) are communicatively coupled to the internal communication network 114 in the IC chip 104. The memory controllers 118(0)-118(M) provide the PU clusters 108(0)-108(N) access to memory for storing and retrieving data to carry out processing tasks. For example, the memory controllers 118(0)-118(M) may be coupled to external memory from the IC chip 104 or internal memory integrated into the IC chip 104.

Also, as shown in FIG. 1, the processor-based system 100 in this example also includes I/O interface circuits 120(0)-120(X) as other examples of processing devices 110 that are also communicatively coupled to the internal communication network 114. The I/O interface circuits 120(0)-120(X) provide access to I/O devices, which may be internal and integrated into the IC chip 104 or external to the IC chip 104. For example, the I/O interface circuits 120(0)-120(X) may be a peripheral component interconnect (PCI) interface circuits that are used for connecting I/O hardware devices to a processor-based system, like the processor-based system 100 in FIG. 1, to allow high-speed data to be transferred between devices and the PU clusters 108(0)-108(N) in the processor-based system 100.

Also, as shown in FIG. 1, the processor-based system 100 in this example also includes socket-to-socket (S2S) interface circuits 122(0)-122(Y) as other examples of processing devices 110 that are also communicatively coupled to the internal communication network 114. The S2S interface circuits 122(0)-122(Y) allow the processor-based system 100 to be coupled to another separate processor-based system (which may be like the processor-based system 100 in FIG. 1) in a socket-to-socket connection. For example, the processor-based system 100 shown in FIG. 1 may be a first CPU motherboard system that can be communicatively coupled to another processor-based system for communication through the internal communication network 114 and a coupled S2S interface circuit 122(0)-122(Y).

Also, as shown in FIG. 1, the processor-based system 100 in this example also includes other interface (I/F) circuits 127(0)-127(Z) as other examples of processing devices 110 that are also communicatively coupled to the internal communication network 114. The interface circuits 127(0)-127(Z) can provide an additional external communications interface to the SoC 102 and can be configured to provide a communication interface according to the desired standard or protocol. For example, the interface circuits 127(0)-127(Z) could be PCIe interface circuits that are configured to support PCIe communications with the SoC 102.

Thus, in the processor-based system 100 in FIG. 1, the internal communication network 114 enables different processing devices such as PU clusters 108(0)-108(N) and their processor cores 112(0)-112(N), caches, the memory controllers 118(0)-118(M), the I/O interface circuits 120(0)-120(X), and/or the S2S interface circuits 122(0)-122(Y) to work together efficiently. The fabric provided by the internal communication network 114 is designed to provide high bandwidth, low latency, and efficient routing of data between different processing devices of the processor-based system 100.

Also, as shown in FIG. 1 and as described in more detail below, the processor-based system 100 may also include a hierarchical power management system 124. In this example, the hierarchical power management system 124 is integrated into the same IC chip 104 and in the same die 106 that includes the PU clusters 108(0)-108(N) and the internal communication network 114. The hierarchical power management system 124 may be configured to control the power consumption of the processor-based system 100 by controlling the power consumption of some or all of the processing devices 110 in the IC chip 104. The hierarchical power management system 124 may be configured to manage power consumption to achieve a desired performance within an overall power budget for the IC chip 104. For example, the processor-based system 100 may have an overall power budget that is based on the ability of the IC chip 104 to dissipate heat generated by the operation of the processor-based system 100. The processor-based system 100 may also have an overall power budget that is based on a current limit of power rails in the IC chip 104. The power budget of the processor-based system 100 may also be based on the power supply limits of a power supply that is powering the processor-based system 100. Thus, the hierarchical power management system 124 can be configured to control power consumption by controlling the power level (e.g., voltage level) distributed at one or more of the power rails in the IC chip 104 that provide power to the processing devices 110, or by controlling operating frequency. For example, the hierarchical power management system 124 can be configured to cause additional power to be supplied to certain power rails, thus supplying power to higher current demanding devices to achieve higher performance while providing less power to other power rails to keep the overall power within power and/or thermal limits for the IC chip 104. For example, the hierarchical power management system 124 can be configured to communicate with or include a power management integrated circuit (PMIC) chip 125 (that can either be on-chip or off-chip to the SoC 120) to actually cause the power supplied to certain power rails to be adjusted.

Also, as discussed in more detail below, a hierarchical power management system 124 can also be configured to control power consumption in the processor-based system 100 by throttling performance (e.g., frequency and/or voltage) of the processing devices 110 in the processor-based system 100. This, in turn, throttles (i.e., reduces, maintains, or increases) the current demand of such processing devices 110 and, thus, their power consumption in the IC chip 104. Throttling may generally refer to any measure (for example, modifying a clock frequency, and/or a supply voltage), to effect (i.e., reduce, maintain, or increase) power consumption. Performance of clocked circuits in the processing devices 110 in the processor-based system 100 in terms of frequency (f) is related to power (P) according to the power equation $P=cfV^2$, where 'c' is capacitance and 'V' is voltage. Thus, reducing the frequency of a clocked circuit in a processing device 110 in the processor-based system 100 also reduces its power consumption.

Figure 2:
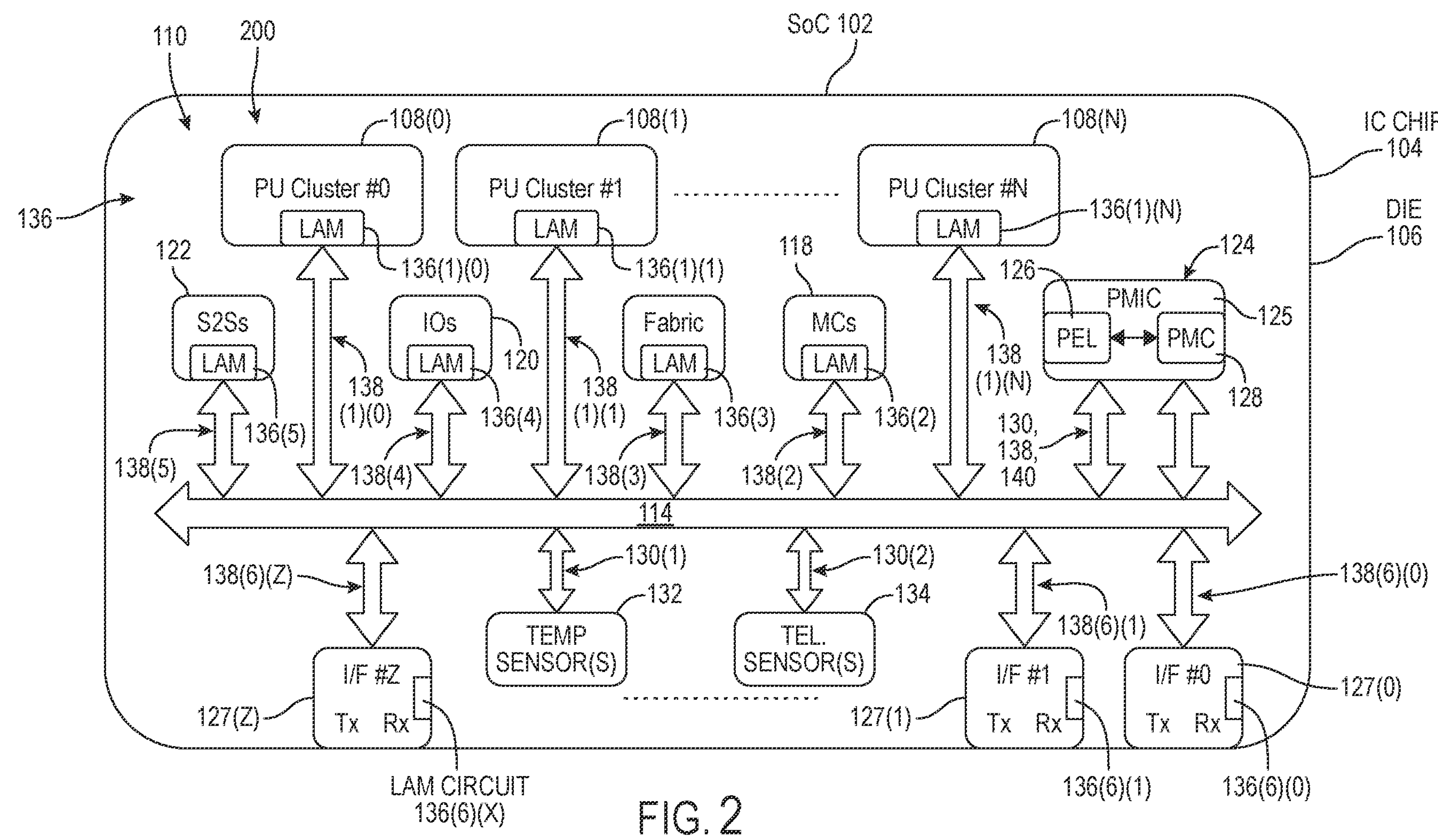
FIG. 2 is a logic diagram of the exemplary processor-based system in FIG. 1, illustrating processing circuits and other support devices communicatively coupled to an internal communication network and an optional hierarchical power management system that is configured to perform power estimation and throttling of power consumption.

FIG. 2 is a logic diagram of the exemplary processor-based system 100 in FIG. 1 illustrating processing devices 110 communicatively coupled to the internal communication network 114. A hierarchical power management system 124 to control power consumption in the IC chip 104 may be provided in accordance with aspects of the present disclosure. Common elements in the processor-based system 100 in FIGS. 1 and 2 are shown with common elements numbers and thus are not re-described. The IC chip 104 can also include target devices 200, whose control also affects power, which can include the processing devices 110 and other circuits that are described below. As will be discussed in more detail below, the hierarchical power management system 124 may be configured to throttle power to target devices 200 as well as processing devices 110 to throttle power consumption in the IC chip 104.

As also shown in FIG. 2, the hierarchical power management system 124 may include a centralized power estimation and limiting (PEL) circuit 126 that is configured to estimate power consumption in the IC chip 104 and take actions to limit or throttle power consumption in the IC chip 104. In this example, the PEL circuit 126 can be provided as part of a power management integrated circuit (PMIC) 125 that is integrated into the IC chip 104. The PEL circuit 126 may communicate such power throttling requests to a power management controller (PMC) 128, for example, that is configured to control power provided by voltage rails in the IC chip 104. Throttling power consumption can include both increasing power (e.g., increasing voltage to power rails) to increase power consumption for increased performance and decreasing power (e.g., decreasing voltage to power rails) to decrease power consumption. The hierarchical power management system 124 may be configured to estimate power consumption in the IC chip 104 through receipt of power events 130 reported to it from devices at lower hierarchical levels in the IC chip 104 that provide information that provides an indirect indication of power consumption. For example, the IC chip 104 may have one or more temperature sensor(s) 132 that are configured to report thermal power events 130(1) to the PEL circuit 126 to provide an indication of the temperature in the IC chip 104, which can then be correlated to power consumption by the processor-based system 100 in the IC chip 104. As another example, the IC chip 104 may have one or more telemetry sensor(s) 134 (e.g., current sensors) that are configured to detect and report telemetry power events 130(2) to the PEL circuit 126 to provide an indication of the telematics information in the IC chip 104 which can then also be correlated to power consumption by the processor-based system 100 in the IC chip 104.

The power consumption of the processing devices 110 in the processor-based system 100 may contribute to the power consumption in the IC chip 104. Thus, it may be desired to also have a way for the PEL circuit 126 in the hierarchical power management system 124 to receive a direct indication of power consumption for the processing devices 110. The PEL circuit 126 can then use this information to estimate power consumption in the IC chip 104 and use such information to appropriately throttle the power consumption in the IC chip 104. In this regard, as shown in FIG. 2, hierarchical power management system 124 may also include local area management (LAM) circuits 136 that are each associated with one or more processing devices 110 in the IC chip 104. The LAM circuits 136 could be placed in various places in the IC chip 104, including at corners of the IC chip 104, where power estimation and power limiting may need to be performed. For example, LAM circuits 136(1)(0)-136(1)(N) may be associated with one or more of the PU clusters 108(0)-108(N), as shown in FIG. 2. As another example, LAM circuits 136(2)-136(5), 136(6)(0)-136(6)(X) may also be associated with respective one or more of the memory controllers 118, the internal communication network 114, e.g., the fabric, one or more of the I/O interface circuits 120, the one or more of the S2S circuits 122, and/or one or more interface circuits 127(0)-127(Z). Each LAM circuit 136(2)-136(5), 136(6)(0)-136(6)(X) is configured to monitor the activity related to its associated processing device 110 as a monitored processing device 110 to then generate respective activity power events 138(1)(0)-138(1)(N), 138(2)-138(5), 138(6)(0)-138(6)(Z) (referred to herein individually, partially, or collectively as "activity power events 138") that are communicated directly or indirectly to the PEL circuit 126. The activity power events 138(1)(0)-138(1)(N), 138(2)-138(5), 138(6)(0)-138(6)(Z) contain information that relates to the power consumption of the respective monitored processing device 110. For example, the activity power events 138(1)(0)-138(1)(N), 138(2)-138(5), 138(6)(0)-138(6)(Z) could contain processing activity information, or power consumption information that is generated by the respective LAM circuits 136(1)(0)-136(1)(N), 136(2)-136(5), 136(6)(0)-136(6)(X) estimating power consumption of its monitored processing device 110 based on processing activity of its monitored processing device 110.

In either case, in this manner, the activity power events 138 can be reported from local areas in the IC chip 104, where power estimations for particular monitored processing devices 110 are performed, to the centralized PEL circuit 126. The PEL circuit 126 can then be configured to use the received activity power events 138 and/or the other power events 130 to estimate and control (i.e., throttle) power in the processor-based system 100 in the IC chip 104 to achieve a desired performance within an overall power budget for the IC chip 104. For example, the activity power events 138 that are associated with estimations of power consumption of processing devices 110 that can be thought of in essence as power throttle recommendations to the PEL circuit 126 for the PEL circuit 126 to throttle power in the IC chip 104 if the estimated power consumption exceeds the power limits of the IC chip 104 or negatively affects performance in an undesired manner.

The PEL circuit 126 being configured to receive activity power events 138 relating to activity for individual processing devices 110 in the processor-based system 100 allows the PEL circuit 126 to throttle power consumption to certain local processing devices 110 that are responsible for increased power consumption. This allows the PEL circuit 126 to throttle power with discrimination as opposed to throttling power to the power rails or, in other ways, in the IC chip 104 that affects the power delivered to a larger set of processing devices 110 as a whole. For example, as discussed in more detail below, the PEL circuit 126 can be configured to use the received activity power events 138 to perform performance throttling of processing devices 110 in the processor-based system 100 to throttle its power consumption. The PEL circuit 126 can be configured to generate power-limiting management responses 140 to be communicated to certain LAM circuits 136 in the processor-based system 100 to cause such LAM circuits 136 to limit the performance of its monitored processing device 110.

Performance throttling of a processing device 110 in the processor-based system 100 to throttle its power consumption can be accomplished in different manners. For example, as discussed in more detail below, performance throttling can be achieved by the PEL circuit 126 by generating a throughput throttling power limiting management response 140, which is destined for the LAM circuit 136(3) associated with the internal communication network 114. The LAM circuit 136(3) can be configured to throttle the throughput of communication traffic in the internal communication network 114, such as at a particular network node in the internal communication network 114, to throttle current demand in the internal communication network 114 and thus its power consumption. Throughput throttling can be isolated to only certain areas or network nodes in the internal communication network 114. In another example, as discussed in more detail below, performance throttling in the processor-based system 100 can be achieved by the PEL circuit 126 by generating a clock throttling power limiting management response 140 to cause a clock circuit (which may be clocking one or more of the processing devices 110) to throttle the speed (i.e., clock frequency) of certain clocked processing devices 110. Clock throttling of a processing device 110 throttles its current demand, which throttles its power consumption. In another example, as discussed in more detail below, performance throttling in the processor-based system 100 can be achieved by throttling or changing the power states of a monitored processing device 110 to throttle its performance and thus its power consumption.

Figure 3:
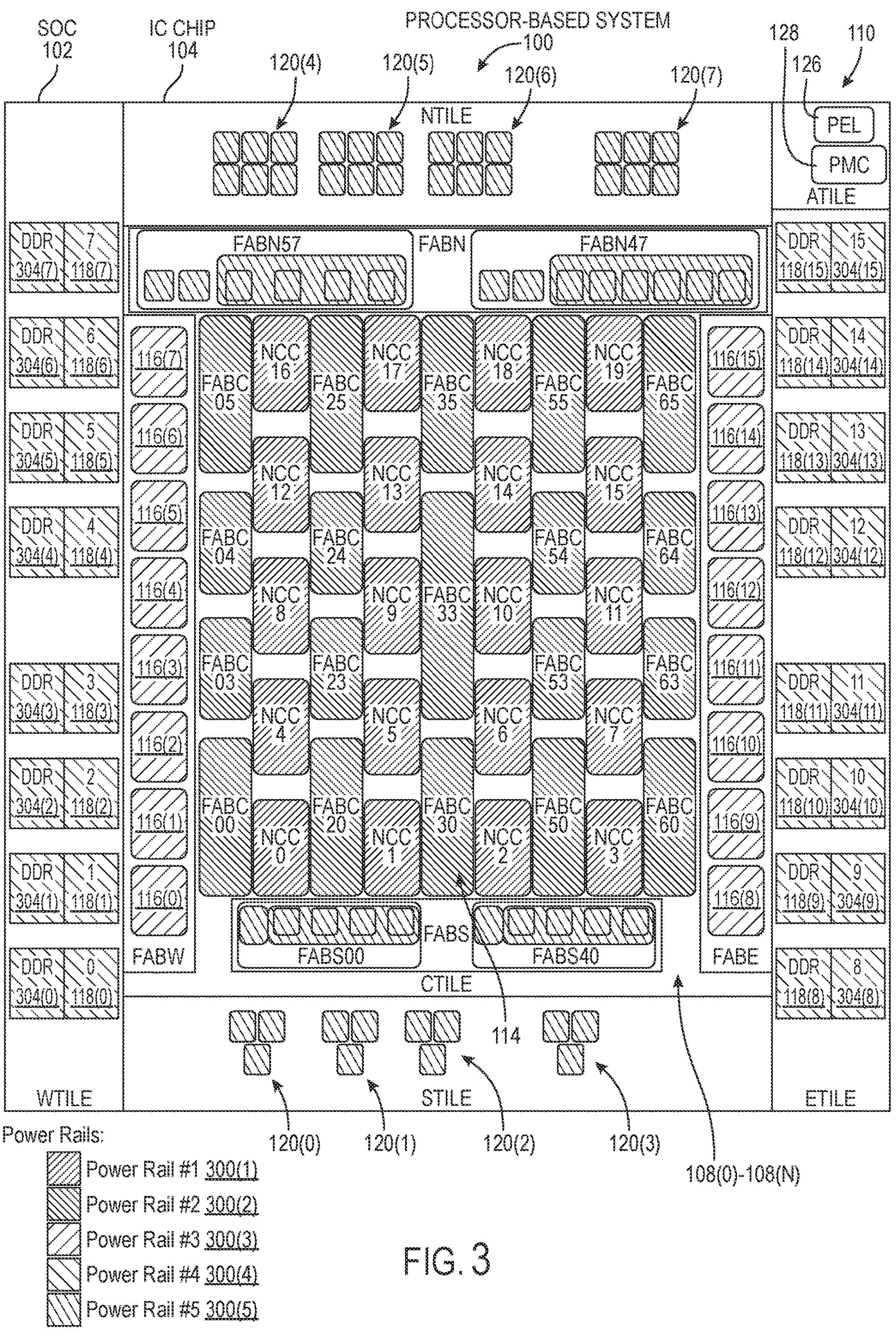
FIG. 3 is a top view of an exemplary physical layout of the semiconductor die ("die") that is an SoC in an IC chip of the processor-based system in FIG. 1 illustrating the physical layout of different tile regions and the devices physically present in such different tile regions, and coded with indicia indicating the separate power rails from which devices are supplied with power from the hierarchical power management system.

FIG. 3 is a top view of an exemplary physical layout of the semiconductor die ("die") 102 of the IC chip 104 in FIG. 1 that includes the processor-based system 100 to illustrate further exemplary details of the physical layout of a hierarchical power management system 124 and an exemplary organization of power rails provided in the processor-based system 100.

As shown in FIG. 3, the IC chip 104 has a physical layout that includes a center tile CTILE, a west tile WTILE, an east tile ETILE, a south tile STILE, a north tile NTILE, and an A-tile ATILE. A tile is a smaller section of a semiconductor die that has been processed in a wafer process and contains a set of IC components. The center tile CTILE in this example includes the PU clusters 108(0)-108(N), shown as NCC0-NCC19. Different numbers of processor cores can be provided in different PU clusters 108(0)-108(N), NCC0-NCC19. In this example, the PU clusters 108(0)-108(N), NCC0-NCC19 are all powered by a same power rail 300(1). The center tile CTILE in this example also includes the internal communication network 114, which is shown by a plurality of center network nodes FABC00-FABC65. The network nodes FABC00-FABC65 are circuits that create a network fabric ("fabric") of communication paths between the different PU clusters 108(0)-108(N) and the supporting processing devices 110. In this example, the network nodes FABC00-FABC65 are powered by a second power rail 300(2). The network nodes FABC00-FABC65 are circuits that can include interconnected switches and/or routers, that provide a reliable network fabric that provides and receives data on the internal communications network 104 between different PU clusters 108(0)-108(N) and the supporting processing devices 110. The center tile CTILE in this example also includes the system level cache memory 116(0)-116(7) powered by a third power rail 300(3) to provide shared cache memory 116 for the PU clusters 108(0)-108(N), NCC0-NCC19. The system level cache memory 116(0)-116(7) that is organized into different quadrants adjacent to and coupled to respective memory circuits DDR0-DDR7 that include respective memory controllers 118(0)-118(7) and memory 304(0)-304(7) (e.g., dynamic data random access memory (DDR) circuits) in the west tile WTILE to provide interlacing memory schemes for example. The memory circuits DDR0-DDR7 may be powered by yet a separate, fourth power rail 300(4). The memory circuits DDR0-DDR7 are also communicatively coupled to the internal communication network 114 through the respective network nodes FABC00-FABC05.

With continuing reference to FIG. 3, the center tile CTILE in this example also includes the system level cache memory 116(8)-116(15), also powered by the third power rail 300(3), to provide additional shared cache memory 116 for the PU clusters 108(0)-108(N), NCC0-NCC19. The system level cache memory 116(8)-116(15) may be organized into different quadrants adjacent to respective memory circuits DDR8-DDR15 that include respective memory controllers 118(8)-118(15) and coupled memory 304(8)-304(15) (e.g., DDR circuits) in the east tile ETILE to provide interlacing memory schemes for example. The memory circuits DDR8-DDR15 are also shown as being powered by the same fourth power rail 300(4) as is powering the memory circuits DDR0-DDR7 in the west tile WTILE. The memory circuits DDR8-DDR15 are also communicatively coupled to the internal communication network 114 through the respective network nodes FABC60-FABC65.

With continuing reference to FIG. 3, the center tile CTILE of the IC chip 104 in this example includes request node circuits FABS00, FABS40, FABN57, FABN47 that are coupled to the internal communication network 114 to provide network interfaces between the I/O interface circuits 120(0)-120(3), 120(4)-120(7) and the internal communication network 114 in the respective south tile STILE and north tile NTILE. The request node circuits FABS00, FABS40, FABN57, FABN47 manage the traffic requests from the I/O interface circuits 120(0)-120(3), 120(4)-120(7) to the internal communication network 114 and vice versa. The request node circuits FABS00, FABS40, FABN57, FABN47 and the I/O interface circuits 120(0)-120(3), 120(4)-120(7) in this example are powered by a fifth power rail 300(5).

With continuing reference to FIG. 3, the A-tile ATILE in the IC chip 104 includes the PEL circuit 126 and the PMC 128 of the hierarchical power management system 124 in this example.

Thus, as shown in FIG. 3, the processing devices 110 in the processor-based system 100 in the IC chip 104 are powered by a series of different power rails 300(1)-300(5). Thus, the PEL circuit 126 in the hierarchical power management system 124 has the resolution of each of these different power rails 300(1)-300(5) in which to vary the voltage on such power rails 300(1)-300(5) to throttle power consumption in the IC chip 104 based on the power events 130, 138. Note that each power rail 300(1)-300(5) can actually be included as a single or multiple power rails.

Figure 4:
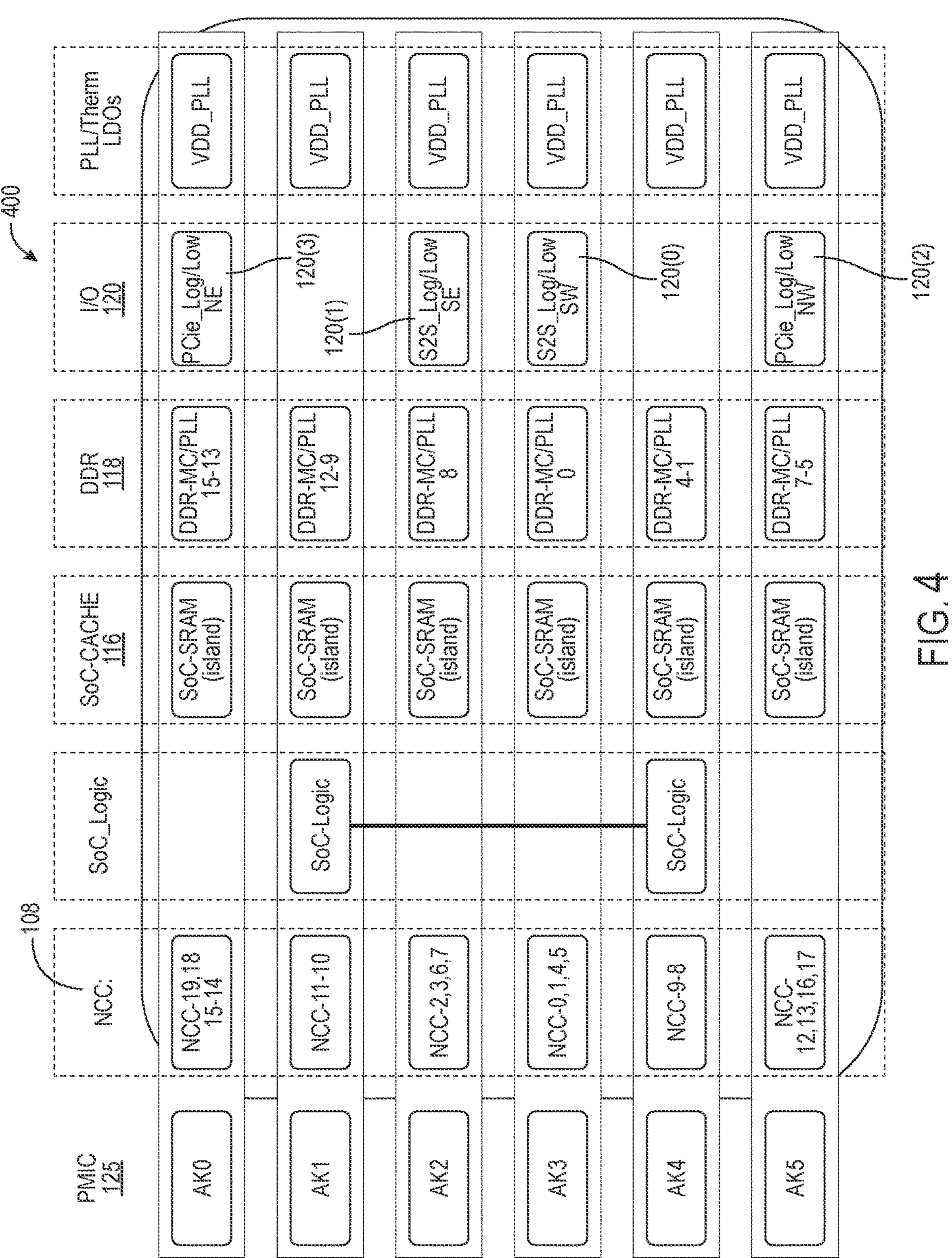
FIG. 4 is a table illustrating an exemplary assignment of power rails driven by respective power management ICs (PMIC), in the processor-based system in FIG. 1, to devices in the processor-based system for supplying power to such devices.

FIG. 4 is a table 400 illustrating an exemplary assignment of power management circuits AK0-AK5 in the PMIC 125 in the processor-based system 100 to devices in the processor-based system 100 for supplying power to such devices. Power management circuits AK0-AK5 can be responsible for controlling one or more different power rails 300(1)-300(5), as shown in FIG. 3, to supply power to various components. Multiple devices in the processor-based system 100 can be coupled to the same power rail 300(1)-300(5) to receive power. For example, as shown in FIG. 4, in this example, PU clusters NCC19, 18, 15, 14 are powered from power rails controlled by power management circuit AK0, PU clusters NCC 11-10 are powered from power rails controlled by power management circuit AK1, PU clusters NCC2, 3, 6, 7 are powered from power rails controlled by power management circuit AK2, PU clusters NCC0, 1, 4, 5 are powered from power rails controlled by power management circuit AK3, PU clusters NCC9-8 are powered from power rails controlled by power management circuit AK4, and PU clusters NCC12, 13, 16, 17 are powered from power rails controlled by power management circuit AK5. Also, as shown in FIG. 4, a single device in the processor-based system 100 can be coupled to more than one power rail to receive power. For example, power supplied to the logic circuits (SoC_Logic) can be controlled by the multiple power management circuits AK1-AK4. The cache memory 116 can be supplied power from power rails controlled by the power management circuits AK0-AK5. Different memory controllers 118 are shown as being powered by power rails controlled by the power management circuits AK0-AK5. The I/O interface circuits 120(0)-120(3) are shown as being powered by power rails controlled by separate respective power management circuits AK3, AK2, AK5, AK0.

Figure 5:
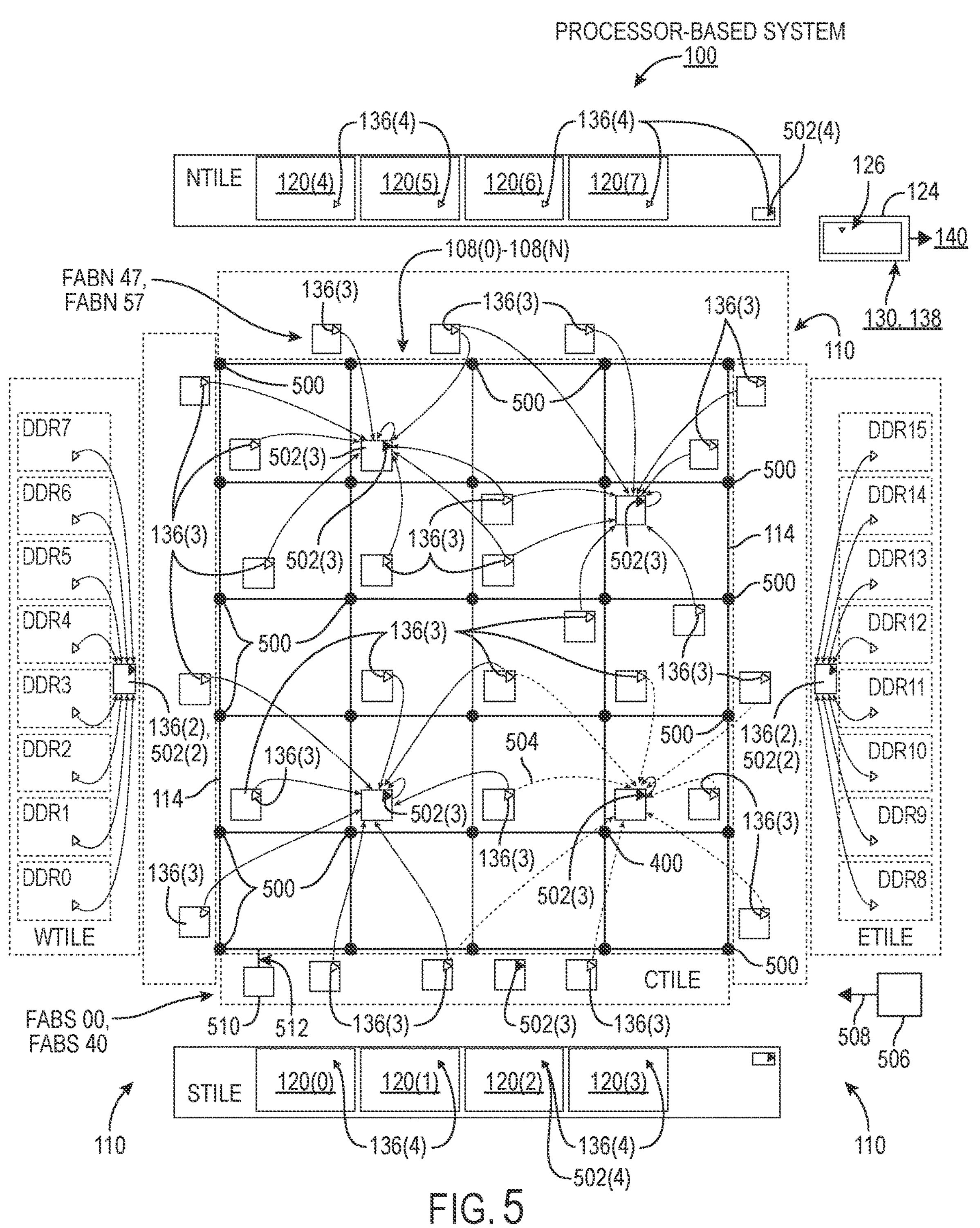
FIG. 5 is another top view of the processor-based system in the IC chip in FIG. 1, illustrating local area management (LAM) circuits, regional activity management (RAM) circuits, and a power estimation and limiting (PEL) circuit as part of a hierarchical power management system, wherein the hierarchical power management system is configured to locally monitor the activity of devices in the processor-based system to estimate and throttle its power consumption and report activity power events regarding estimated power consumption to the PEL circuit, wherein the PEL circuit is configured to collect activity power events regarding power consumption of the monitored processing devices and throttle power in the IC chip in response.

FIG. 5 is another top view of the processor-based system 100 in the IC chip 104 in FIG. 1, illustrating local area management (LAM) circuits 136 and the PEL circuit 126 as part of the hierarchical power management system 124. As discussed above with regard to FIG. 2, the LAM circuits 136 can be configured to locally monitor activity of processing devices 110, such as the PU clusters 108(0)-108(N) in the processor-based system 100 to estimate and throttle its power consumption and report activity power events 138 regarding estimated power consumption to the PEL circuit 126. The processor-based system 100 in this example includes a clock circuit 506 that generates a clock signal 508 to clock the PU clusters 108(0)-108(N) to control the speed of the PU clusters 108(0)-108(N). The PEL circuit 126 is configured to collect activity power events 138 regarding power consumption of the monitored processing devices 110 and issue power limiting management responses 140 in response to throttle power consumption in the IC chip 104.

As shown in FIG. 5, a plurality of LAM circuits 136(3) are distributed in the center tile CTILE and associated with respective network node 500 (as processing devices 110) of the internal communication network 114. For example, the internal communication network 114 can be a mesh network, as shown in FIG. 5. The internal communication network 114 is capable of routing communication traffic from the PU clusters 108(0)-108(N) through different network nodes 500 based on performance and traffic characteristics of the internal communication network 114. In this manner, the throughput of the internal communication network 114 is not limited by any single network node 500. The processor-based system 100 in this example includes a clock circuit 510 that generates a clock signal 512 to clock the network nodes 500 to control the speed of the internal communication network 114. The clock circuit 510 is another example of a target device 200 in the IC chip 104. As will be discussed in more detail below, the LAM circuits 136(3) associated with the network nodes 500 in the internal communication network 114 are configured to sample the processing activity of respectively assigned network nodes 500 to generate a plurality of activity samples. The LAM circuits 136(3) are then configured to estimate the power consumption of the assigned network node 500 based on the activity samples regarding its assigned network node 500 to generate an activity power event 138 based on the such estimated power consumption of the respective network node 500.

Also, as shown in FIG. 5, in this example, the hierarchical power management system 124 may also include regional activity management (RAM) circuits 502(3) configured to monitor activity of the internal communication network 114. The RAM circuits 502(3) can be located in a particular region of the internal communication network 114, with each being assigned and coupled to a subset of the LAM circuits 136(3). The RAM circuits 502(3) can be intermediate power management circuits in the hierarchical power management system 124. The RAM circuits 502(3) may be coupled to the PEL circuit 126 through a second communication network 504. The RAM circuits 502(3) can be communicatively and hierarchically located between the LAM circuits 136(3) and the centralized PEL circuit 126. In some examples, the RAM circuits 502(3) are configured to receive and aggregate activity power events 138 reported by assigned LAM circuits 136(3) regarding activity of their monitored network node 500. The RAM circuits 502(3) can then aggregate these activity power events 138 and report an aggregated activity power event to the PEL circuit 126 so that the PEL circuit 126 can determine how the power consumption of network nodes 500 should be throttled to achieve a desired overall performance of the internal communication network 114 while also maintaining power consumption within desired limits. The PEL circuit 126 can communicate a power limiting management response 140 back to a given RAM circuit 502(3) to perform throughput throttling of a given network node(s) 500 in response to the power consumption of a network node(s) 500 being determined to exceed desired limits. For example, as discussed in more detail below, the RAM circuit 502(3) can be configured to throttle throughput of a given network node(s) 500 by selectively enabling and disabling communication traffic through the network node(s) 500.

Also, as shown in FIG. 5, in this example, a plurality of LAM circuits 136(2) are distributed in the west tile WTILE and the east tile ETILE and associated with respective memory circuits DDR0-DDR7, DDR8-DDR15 (as processing devices 110). As will also be discussed in more detail below, the LAM circuits 136(2) associated with the memory circuits DDR0-DDR7, DDR8-DDR15 are configured to sample processing activity of respectively assigned memory circuits DDR0-DDR7, DDR8-DDR15 to generate a plurality of activity samples. The LAM circuits 136(2) are then configured to estimate the power consumption of the assigned memory circuit DDR0-DDR7, DDR8-DDR15 based on the activity samples regarding their assigned network node 500 to generate an activity power event 138 based on the such estimated power consumption of the respective memory circuits DDR0-DDR7, DDR8-DDR15.

Also, as shown in FIG. 5, in this example, the hierarchical power management system 124 also includes regional RAM circuits 502(2) configured to monitor activity of the memory circuits DDR0-DDR7, DDR8-DDR15. The RAM circuits 502(2) are located in a particular region of the memory circuits DDR0-DDR7, DDR8-DDR15, with each being assigned and coupled to a subset of the LAM circuits 136(2). The RAM circuits 502(2) are communicatively and hierarchically located between the LAM circuits 136(2) and the centralized PEL circuit 126. The RAM circuits 502(2) are coupled to the PEL circuit 126 through the second communication network 504. The RAM circuits 502(2) are configured to receive and aggregate activity power events 138 reported by assigned LAM circuits 136(2) regarding activity of their monitored memory circuits DDR0-DDR7, DDR8-DDR15. The RAM circuits 502(2) can then aggregate these activity power events 138 and report an aggregated activity power event to the PEL circuit 126 so that the PEL circuit 126 can determine how power consumption of the memory circuits DDR0-DDR7, DDR8-DDR15 should be throttled to achieve a desired overall performance of the memory circuits DDR0-DDR7, DDR8-DDR15 while also maintaining power consumption within desired limits. The PEL circuit 126 can communicate a power limiting management response 140 back to a given RAM circuit 502(2) to perform throughput and/or performance throttling of a given memory circuit(s) DDR0-DDR7, DDR8-DDR15 in response to the power consumption of a memory circuit DDR0-DDR7, DDR8-DDR15 being determined to exceed desired limits. For example, as discussed in more detail below, the RAM circuit 502(2) can be configured to throttle throughput and/or performance of a given memory circuit(s) DDR0-DDR7, DDR8-DDR15 by selectively enabling and disabling memory access requests/responses to the memory circuits DDR0-DDR7, DDR8-DDR15.

Also, as shown in FIG. 5, in this example, the hierarchical power management system 124 also includes regional RAM circuits 502(4) configured to monitor activity of the I/O interface circuits 120(0)-120(7). The RAM circuits 502(4) are located in a particular region of the I/O interface circuits 120(0)-120(7), with each being assigned and coupled to a subset of the LAM circuits 136(4) as shown. The RAM circuits 502(4) are communicatively and hierarchically located between the LAM circuits 136(4) and the centralized PEL circuit 126. The RAM circuits 502(4) are coupled to the PEL circuit 126 through the second communication network 504. The RAM circuits 502(4) are configured to receive and aggregate activity power events 138 reported by assigned LAM circuits 136(4) regarding activity of their monitored I/O interface circuits 120(0)-120(7). The RAM circuits 502(4) can then aggregate these activity power events 138 and report an aggregated activity power event to the PEL circuit 126 so that the PEL circuit 126 can determine how power consumption of the I/O interface circuits 120(0)-120(7) should be throttled to achieve a desired overall performance of the I/O interface circuits 120(0)-120(7) while also maintaining power consumption within desired limits. The PEL circuit 126 can communicate a power limiting management response 140 back to a given RAM circuit 502(4) to perform throughput and/or performance throttling of a given I/O interface circuit(s) 120(0)-120(7) in response to the power consumption of an I/O interface circuit(s) 120(0)-120(7) being determined to exceed desired limits. For example, as discussed in more detail below, the RAM circuit 502(4) can be configured to throttle throughput and/or performance of a given I/O interface circuit(s) 120(0)-120(7) by selectively enabling and disabling access requests/responses to the I/O interface circuit(s) 120(0)-120(7).

As shown back in FIG. 2, LAM circuits 136(1)(0)-136(1)(N) can also be associated with each PU cluster 108(0)-108(N) in the processor-based system 100 to sample activity therein to estimate power consumption in a respective PU cluster 108(0)-108(N). The LAM circuits 136(1)(0)-136(1)(N) can be configured to generate activity power events 138, including the estimated power consumptions in response to a RAM circuit 502, which in turn aggregates such activity power events 138 to the PEL circuit 126. The RAM circuits 502 assigned to the subset of LAM circuits 136(1)(0)-136(1)(N) are coupled to the PEL circuit 126 through the second communication network 504. The PEL circuit 126 can generate power-limiting management responses 140 in response to throttle the performance of the PU clusters 108(0)-108(N).

As also shown in FIG. 2, LAM circuits 136(5) can also be associated with each S2S interface circuit 122(0)-122(Y) in the processor-based system 100 to sample activity therein to estimate power consumption in a respective S2S interface circuit 122(0)-122(Y). The LAM circuits 136(5) can be configured to generate activity power events 138, including the estimated power consumptions in response to a RAM circuit 502, which in turn aggregates such activity power events 138 to the PEL circuit 126. The RAM circuits 502 assigned to the subset of LAM circuits 136(5) are coupled to the PEL circuit 126 through the second communication network 504. In response, the PEL circuit 126 can generate power-limiting management responses 140 to throttle the performance of the S2S interface circuits 122(0)-122(Y).

As shown back in FIG. 2, LAM circuits 136(6)(0)-136(6)(X) can also be associated with each interface circuit 127(0)-127(Z) in the processor-based system 100 to sample activity therein to estimate power consumption in a respective interface circuit 127(0)-127(Z). The LAM circuits 136(6)(0)-136(6)(X) can be configured to generate activity power events 138 that include the estimated power consumptions in response to a RAM circuit 502, which in turn aggregates such activity power events 138 to the PEL circuit 126. The RAM circuits 502 assigned to a subset of LAM circuits 136(6)(0)-136(6)(X), is coupled to the PEL circuit 126 through the second communication network 504. The PEL circuit 126 can generate power limiting management responses 140 in response to throttle the performance of the interface circuits 127(0)-127(Z).

In this example, any of the RAM circuits 502, 502(2)-504(4) discussed above can also include circuitry to behave functionally as a LAM circuit for an assigned processing device 110. In this regard, any of the RAM circuits 502, 502(2)-504(4) can also be configured to sample the processing activity of its respective assigned processing device 110 to generate a plurality of activity samples for such processing device 110. Such RAM circuits 502, 502(2)-504(4) can be configured to estimate the power consumption of its assigned processing device 110 based on the activity samples regarding its assigned processing device 110 to generate an aggregated activity power event based on the such estimated power consumption of the respective processing device 110 and the other received activity power events 138 from its coupled LAM circuits 136(1)(0)-(1)(N), 136(2)-136(5), 136(6)(0)-136(6)(X).

Note that in any of the above-referenced examples, the RAM circuits 502 are optional for any of the monitored processing devices 110, and their respective LAM circuits 136(1)-136(6) can be configured to communicate activity power events 138 directly to the PEL circuit 126.

Figure 6:
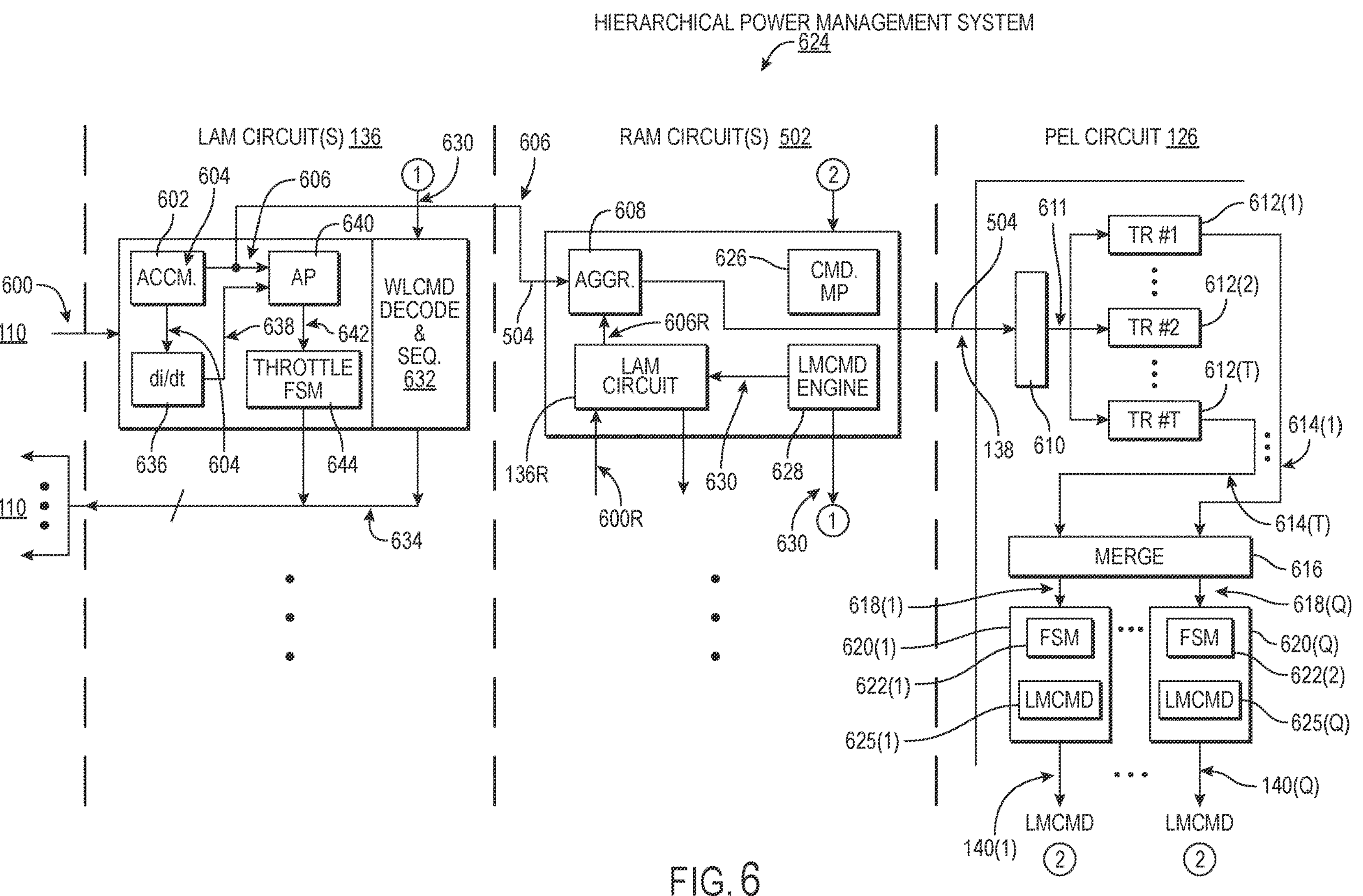
FIG. 6 is a schematic diagram of an exemplary three (3) level hierarchical power management system that can be provided in the processor-based system in the IC chip in FIG. 1, wherein the three (3) level hierarchical power management system may include: a first, local level of LAM circuits configured to perform local device monitoring and power consumption throttling, and report activity power events regarding monitored processing device power consumption, a second, intermediate level of RAM circuits configured to receive and aggregate local activity power events, and a third, centralized level of a PEL circuit configured to collect aggregated activity power events regarding power consumption of the monitored processing devices and throttle power in the IC chip in response.

FIG. 6 is a schematic diagram illustrating additional exemplary detail of a three (3) level hierarchical power management system 624 that can be provided as the hierarchical power management system 124 in the processor-based system 100 in the IC chip 104 in FIGS. 1-3 and 5. Common elements between the hierarchical power management system 624 in FIG. 6 and the hierarchical power management system 124 in FIGS. 1-3 and 5 are shown with common element numbers. In this regard, FIG. 6 illustrates a single LAM circuit 136 communicatively coupled to a single RAM circuit 502 which is coupled to the PEL circuit 126. Note, however, that this is to simplify the illustration in FIG. 6. In the hierarchical power management system 624 in FIG. 6, there can be a plurality of RAM circuits 502 that are communicatively coupled to the PEL circuit 126. There can also be a plurality of LAM circuits 136 that are communicatively coupled to each RAM circuit 502 of the plurality of RAM circuits 502. The discussion below regarding the exemplary operation of the LAM circuit 136 and RAM circuit 502 are equally applicable to any number of LAM circuits 136 and RAM circuits 502 included in the processor-based system, including the LAM circuits 136(1)(0)-(1)(N), 136(2)-136(5), 136(6)(1)-136(6)(X) and the RAM circuits 502, 502(2)-502(4).

With reference to FIG. 6, the LAM circuit 136 in this example is configured to sample the processing activity as a received activity sample 600 of an assigned, monitored processing device 110 in each cycle of a given local time window. The LAM circuit 136 periodically samples activity of its monitored processing device 110 in a local time window representing the activity of the assigned, monitored processing device 110 in that local time window. In this example, the LAM circuit 136 is configured to correlate received activity samples 600 into a power consumption during a given local time window for the activity of the processing device 110 for that given local time window. The LAM circuit 136 includes an accumulate circuit 602 that is configured to accumulate the estimated power consumptions based on the received activity samples 600 sampled in a given local time window to generate an estimated current demand 604 for the monitored processing device 110 for the local time window. The estimated current demand 604 is an estimate of the accumulated current measurement reported by the assigned processing device 110 (i.e., power consumption) over the local time window. The accumulate circuit 602 may then provide the estimated current demand 604 (current demand over time) for each local time window in a generated activity power event 606 on the second communication network 504, representing the estimated power consumption of the monitored processing device 110 that is communicated to the RAM circuit 502 assigned to the LAM circuit 136. The accumulate circuit 602 may repeat the same process for subsequent local time windows to accumulate the estimated power consumptions for received activity samples 600 during the local time window to generate a next estimated current demand 604 for the monitored processing device 110.

With continuing reference to FIG. 6, the RAM circuit 502 may include an aggregation circuit 608 that is configured to aggregate the received activity power events 606 from its coupled LAM circuits 136 into a generated aggregated activity power event 138. The RAM circuit 502 may then be configured to communicate the aggregated activity power event 138 on the second communication network 504 to the PEL circuit 126. Note that in this example, the RAM circuit 502 also includes its own LAM circuit 136R that may be configured like the LAM circuit 136 in FIG. 6. In this regard, the LAM circuit 136R may be configured to sample the processing activity 600R of an assigned processing device 110 into a plurality of activity samples 600R. The processing activity 600R of the assigned processing device 110 may be sampled periodically by the LAM circuit 136R to generate a plurality of activity samples over a given local time window representing the activity of the assigned, monitored processing device 110. The LAM circuit 136R is configured to determine a current flow rate and/or a change in the current flow rate (i.e., di/dt) of current provided to the assigned processing device 110 and represented by the received plurality of activity samples 600R. The LAM circuit 136R can be programmed to correlate processing activity to power consumption to estimate the power consumption of the monitored processing device 110 over the local time window. The LAM circuit 136R can then be configured to generate an activity power event 606 representing the estimated power consumption of the monitored processing device 110 that is communicated to the aggregation circuit 608 of the RAM circuit 502 to be aggregated into the aggregated activity power event 138.

With continuing reference to FIG. 6, the PEL circuit 126 may be configured to receive the aggregated activity power events 138 from the one or more RAM circuits 502 included in the hierarchical power management system 624. In this example, the PEL circuit 126 includes a decode circuit 610 that is configured to decode the received aggregated activity power events 138 into decoded activity power events 611 to be routed to a corresponding activity tracker circuit 612(1)-612(T) that are each associated with a monitored processing device 110 in the processor-based system 100. The PEL circuit 126 can also include other energy tracker circuits (not shown) that are associated with other power events (e.g., temperature, droop detection) that can also affect how the PEL circuit 126 decides to throttle power. The activity tracker circuits 612(1)-612(T) may be configured to aggregate associated activity power events 138 for an assigned monitored processing device 110 to determine whether power consumption for a monitored processing device 110 exceeds a defined threshold current flow rate/change in current flow rate (di/dt). The activity tracker circuits 612(1)-612(T) can also each include a power limit management policy that can be configured to generate respective power throttle recommendations 614(1)-614(T) for the PEL circuit 126 to use to determine how to throttle the distributed power and/or performance of the monitored processing devices 110 to throttle power consumption.

With continuing reference to FIG. 6, the PEL circuit 126 also includes a merge circuit 616 that merges the power throttle recommendations 614(1)-614(T) for the individual monitored processing devices 110 into merged power throttle recommendations 618(1)-618(Q). The merged power throttle recommendations 618(1)-618(Q) are provided to respective assigned target circuits 620(1)-620(Q). Each target circuit 620(1)-620(Q) is associated with a different target device 200 in the processor-based system 100 in which the PEL circuit 126 can issue power limiting management responses 140(1)-140(Q) to limit the power consumption of such target device 200. The target devices 200 are devices in the IC chip 104 whose operational control (e.g., operating voltage, frequency, workload) can affect power consumption in the IC chip 104. The target devices in the IC chip 104 can include more than just the processing devices 110 in the processor-based system 100. For example, the target devices 200 can include the power rails 300(1)-300(5), as shown in FIG. 3 and/or any of the processing devices 110 in the processor-based system 100. The PEL circuit 126 can be programmed to map (e.g., through firmware, electronic fuses, etc.) the merged power throttle recommendations 618(1)-618(Q) to a particular target device 200, and thus a target circuit 620(1)-620(Q), that may not directly correlate to each other. For example, it may be desired for the PEL circuit 126 to throttle power consumption of the I/O interface circuits 120(0)-120(X) by not only throttling power consumption for the I/O interface circuits 120(0)-120(X) but also by throttling power of the PU clusters 108(0)-108(N) that may be contributing to the power consumption by the I/O interface circuits 120(0)-120(X). In this manner, the merged power throttle recommendations 618(1)-618(Q) and/or other power events related to power issues and power consumption in the IC chip 104 can be mapped in the PEL circuit 126 to correlate to different target devices 200 for throttling power consumption. The merge circuit 616 can be programmed in a "many-to-many mapping" to correlate to different power-limiting management responses within the IC chip 104 in the desired manner for more flexibility in managing power consumption in the IC chip 104 while still achieving the desired performance. In this manner, the power throttling management behavior of the PEL circuit 126 can be configured and changed even after the IC chip 104 is deployed in an application.

With continuing reference to FIG. 6, the target circuits 620(1)-620(Q) may each be configured to determine if the power consumption of an associated target device 200 in the processor-based system 100 should be throttled based on the merged power throttle recommendations 618(1)-618(Q) provided to the target circuits 620(1)-620(Q). The target circuits 620(1)-620(Q) can each include finite state machine (FSM) circuits 622(1)-622(Q) that are configured to analyze the respective received merged power throttle recommendation 618(1)-618(Q) to determine if the power consumption of an associated target device 200 should be throttled. If an FSM circuit 622(1)-622(Q) determines that the power consumption of an associated target device 200 in the processor-based system 100 should be throttled, the FSM circuit 622(1)-622(Q) causes an associated power limiting command generation circuit 625(1)-625(Q) to generate a power limiting management response 140(1)-140(Q) to cause the power consumption of a target device 200 associated with the power limiting management response 140 (1)-140(Q) to limit power consumption.

For example, if the target circuit 620(1)-620(Q) is assigned to a target device 200 of a power rail 300(1)-300 (5), the target circuit 620(1)-620(Q) can be configured to determine how to throttle the voltage to the associated power rail 300(1)-300(5) to control power consumption of processing devices 110 powered by such power rail 300(1)-300(5). The respective power limiting command generation circuit 625(1)-625(Q) can be configured to generate a performance throttling power limiting management response 140(1)-140 (Q) to cause the voltage provided to the associated power rail 300(1)-300(5) to be throttled to control power consumption of processing devices 110 powered by such associated power rail 300(1)-300(5).

In another example, if the target circuit 620(1)-620(Q) is assigned to a target device 200, such as the internal communication network 114, the target circuit 620(1)-620(Q) can be configured to determine how to throttle performance of the internal communication network 114 to control power consumption of the internal communication network 114. For example, to throttle the throughput performance of the internal communication network 114, the target device 200 may be the clock circuit 506 (FIG. 5) that is configured to clock the internal communication network 114. The clock circuit 506 is another example of a target device 200 in the IC chip 104. The target circuit 620(1)-620(Q) can determine a throttle frequency of the clock signal 508 generated by the clock circuit 506 (FIG. 5) for generating a clock throttling power limiting management response 140(1)-140(Q). The clock throttling power limiting management response 140 (1)-140(Q) may cause the clock signal 508 to be throttled, which will, in turn, throttle the speed and the throughput performance of the internal communication network 114 and thus its power consumption and/or other circuits clocked by the clock signal 508.

In another example, if the target circuit 620(1)-620(Q) is assigned to a target device 200 as a PU cluster 108(0)-108 (N) or any other processing device 110, the target circuit 620(1)-620(Q) can be configured to determine how to throttle performance of the internal communication network 114 to control power consumption of the internal communication network 114. For example, to throttle performance of the PU cluster 108(0)-108(N) or other processing device 110, the target device 200 may be the clock circuit 506 (FIG. 5) that is configured to clock the PU clusters 108(0)-108(N). The target circuit 620(1)-620(Q) can determine a throttle frequency of the clock signal 508 generated by the clock circuit 506 for generating a performance power-limiting management response 140(1)-140(Q). The clock throttling power limiting management response 140(1)-140(Q) will cause the clock signal 508 to be throttled, which will, in turn, throttle the performance of the PU clusters 108(0)-108(N) or other processing devices 110.

As shown in FIG. 6, in this example, to communicate the power limiting management responses 140(1)-140(Q) generated by the PEL circuit 126 to affect a power throttling of a target device 200 in the processor-based system 100, the power limiting management responses 140(1)-140(Q) are communicated to a target device 200 in the processor-based system 100. For target devices 200 that are monitored processing devices 110 monitored by a LAM circuit 136 or RAM circuit 502, the PEL circuit 126 can be configured to communicate an associated power limiting management response 140(1)-140(Q) to the RAM circuit 502. The RAM circuit 502 in this example includes a command processor 626 that is configured to receive a power limiting management response 140(1)-140(Q) to process the power limiting management response 140(1)-140(Q) to identify the LAM circuit 136 to communicate with to effectuate the power throttling requested in the received power limiting management response 140(1)-140(Q). In this example, the RAM circuit 502 includes a limiting command engine circuit 628 that is configured to generate a local power limiting management response 630 directed to the LAM circuit 136 that can effectuate the power throttling requested in the received power limiting management response 140(1)-140(Q). Note that if the local power limiting management response 630 is to throttle power consumption of multiple processing devices 110 monitored by multiple LAM circuits 136 associated with the RAM circuit 502, the limiting command engine circuit 628 can address the local power limiting management response 630 to multiple LAM circuits 136. Also note that in this example, if the RAM circuit 502 includes the LAM circuit 136R, and the RAM circuit 502 is monitoring a processing device 110 that is the target device 200 to be throttled, the limiting command engine circuit 628 generates the local power limiting management response 630 directed to the LAM circuit 136R.

With continuing reference to FIG. 6, in response to a LAM circuit 136 receiving a local power limiting management response 630, a power limiting management decode and sequencer circuit 632 may process the received local power limiting management response 630. The power limiting management decode and sequencer circuit 632 may be configured to determine a power throttling response to be effectuated to a monitored processing device 110 based on the local power limiting management response 630. In this regard, the power limiting management decode and sequencer circuit 632 may be configured to generate local throttle signals 634 to cause the power consumption in the processing device 110 to be throttled. For example, power limiting management decode and sequencer circuit 632 can be configured to generate a sequence of local throttle signals 634 to continually throttle up or down the power consumption of the monitored processing device 110 associated with its LAM circuit 136.

Note that in the sequence of operations and communications described above with regard to the LAM circuits 136 communicating activity power events 606 to the RAM circuits 502, and the RAM circuits 502 communicating aggregated activity power events 138 to the PEL circuit 126, communication delays are incurred. There is a delay between generating the activity samples 600 of sampling of power consumptions in a processing device 110 in a LAM circuit 136 and the reporting and receipt of an associated aggregated activity power event 138 in the PEL circuit 126. This delay can be particularly large for an IC chip 104 that has a larger area, such as one that includes a number of PU clusters 108(0)-108(N) and other processing devices 110 as in the processor-based system 100. By the time the PEL circuit 126 receives the associated aggregated activity power event 138 and processes such to a generation of an associated power limiting management response 140(1)-140(Q), the power consumed by the monitored processing device 110 may have already exceeded desired power limits in an undesired manner and/or for an undesired amount of time, possibly causing the power consumption in the IC chip 104 to exceed designed power limits. Further, instantaneous current demand by a monitored processing device 110 can cause di/dt events or voltage droop events that can cause performance issues and/or failures that may not be able to be timely addressed by the PEL circuit 126.

To mitigate the delay in the PEL circuit 126 receiving aggregated activity power events 138 associated with monitored processing devices 110 in the processor-based system 100 that may affect throttling of power consumption within the processor-based system 100, each of the LAM circuits 136, 136R can also be configured to directly throttle performance of an associated monitored processing device 110 to throttle its current demand and thus throttle its power consumption. This gives the PEL circuit 126 more reaction time to receive and process aggregated activity power events 138 to determine how power consumption in the processor-based system 100 should be throttled to achieve a desired overall performance while also maintaining power consumption within desired limits. In this manner, the LAM circuits 136, 136R may be able to more timely mitigate a power issue by locally throttling power consumption of its specific monitored processing device 110 on a device granularity (without having to throttle performance in other processing devices 110). The LAM circuits 136, 136R can be configured to continuously monitor and throttle power consumption locally in its monitored processing device 110, co-existent with the PEL circuit 126 generating power limiting management responses 140 to limit power consumption by target devices 200 in the processor-based system 100.

In this regard, as shown in FIG. 6, the LAM circuit 136 in this example includes a di/dt circuit 636 to track the rate of change of power consumption by the processing device 110 for local power consumption throttling of its monitored processing device 110. In this regard, the di/dt circuit 636 may be configured to receive the estimated current demand 604 for the activity of the processing device 110 sampled by the LAM circuit 136 from the accumulate circuit 602 in each local time window. For each incoming estimated current demand 604 received (e.g., received for a given local time window), the di/dt circuit 636 may be configured to generate a next summed current demand 638 of such incoming estimated current demand 604 in the next local time window from the accumulate circuit 602 with one or more previous received estimated current demands 604 received for a previous estimated current demand 604 in a previous local time window. In this manner, the next summed current demand 638 is a running sum of the estimated current demands 604 for the processing device 110 over consecutive local time windows. The di/dt circuit 636 may provide the next summed current demand 638 to an application processor 640 that provides a determined next current flow rate 642 based on the next summed current demand 638 to a throttle FSM circuit 644. The throttle FSM circuit 644 may be configured to determine on an ongoing basis whether the next current flow rate 642 of the assigned processing device 110 exceeds a threshold current flow rate or change in current flow rate configured for the monitored processing device 110 in the LAM circuit 136. In response to determining that the next current flow rate 642 of the assigned processing device 110 exceeding the threshold current flow rate, the throttle FSM circuit 644 is configured to generate the local throttle signals 634 to throttle the power consumption of the monitored processing device 110.

In this manner, the LAM circuit 136 may be configured to continually monitor the ongoing current flow rate of its monitored processing device 110 to be able to locally throttle the power consumption of the monitored processing device 110. In this manner, the LAM circuit 136 may be configured to respond more quickly to power consumption issues caused by the current demand of the monitored processing device 110, such as di/dt events and voltage droops, before the PEL circuit 126 may be able to respond.

As an example, if the monitored processing device 110 by the LAM circuit 136 is a network node 500 of the internal communication network 114, the local throttle signals 634 generated by the LAM circuit 136 may be a throughput throttle to selectively enable and disable communication flow in the network node 500 to throttle its throughput thus throttling its power consumption. As another example, if the monitored processing device 110 by the LAM circuit 136 is a PU cluster 108(0)-108(N) or other processing device 110, the local throttle signals 634 generated by the LAM circuit 136 may be a performance throttle to selectively throttle performance or workload of the monitored PU cluster 108(0)-108(N) or other processing device 110 to throttle its performance thus throttling its power consumption.

Note that sampling of processing activity discussed herein may be accomplished by determining or sampling a quantity that is associated with an instantaneous activity of the monitored processing device 110. For example, the workload performed by a monitored processing device 100 may be determined or discoverable as an indirect method to determine instantaneous activity that can be correlated to an estimated current or power consumption. As another example, activity of a monitored processing device 110 may be determined by sensing a temperature at a temperature sensor associated with the processing device 110. As another example, a voltage droop may be sensed at the processing device 110 to determine an activity sample. Also, other quantities may be used to sample activity. As an example, an incoming interrupt at the processing device, a status register, a state of an interrupt queue, or a signal indicating whether the processing device busy or idle, may be used for sampling of processing activity.

Note that the components to perform local throttling by the LAM circuit 136 can also be provided in the LAM circuit 136R in the RAM circuit 502 so that the LAM circuit 136R may also be configured to locally throttle a monitored processing device 110.

Figure 7:
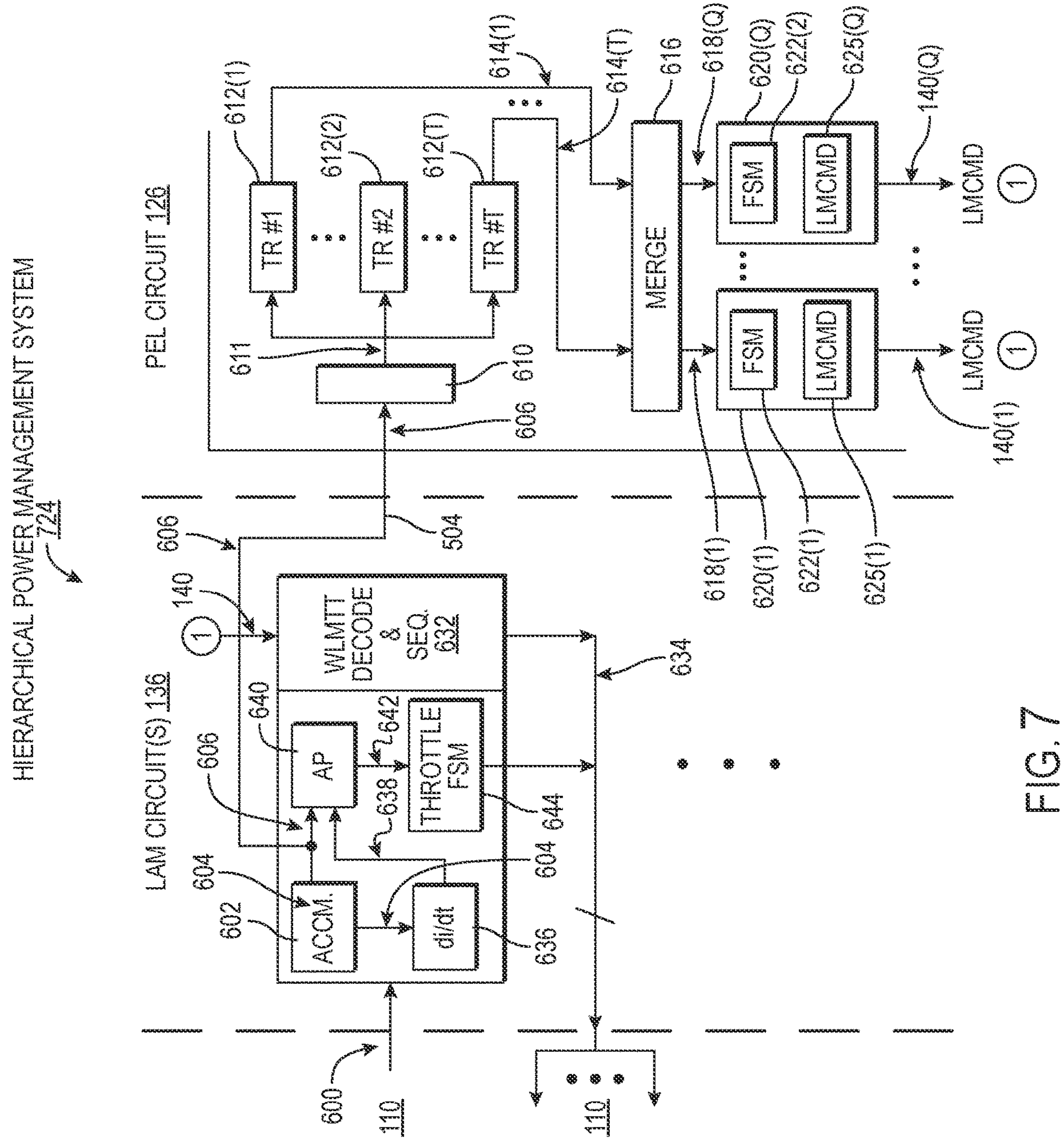
FIG. 7 is a schematic diagram of an exemplary two (2) level hierarchical power management system that can be provided in the processor-based system in the IC chip in FIG. 1, wherein two (2) level hierarchical power management system may include: a first local level of LAM circuits configured to perform local device monitoring and power consumption throttling, and a second, centralized level of a PEL circuit configured to collect aggregated activity power events regarding power consumption of the monitored processing devices and throttle power in the IC chip in response.

Note that the hierarchical power management system 124 provided in the IC chip 104 for the processor-based system 100 in FIG. 1 is not limited to the three (3) level hierarchical power management system 624 in FIG. 6. For example, FIG. 7 is a schematic diagram of an alternative two (2) level hierarchical power management system 724 that can be provided as the hierarchical power management system 124 in the processor-based system 100 in the IC chip 104 in FIGS. 1-3 and 5. The hierarchical power management system 724 in FIG. 7 is similar to the hierarchical power management system 624 in FIG. 6, except that the intermediate RAM circuits 502 are not included in the hierarchical power management system 724 in FIG. 7. The LAM circuits 136 can be configured to provide activity power events 606 directly to the PEL circuit 126 to be processed. Common elements between the hierarchical power management system 724 in FIG. 7 and the hierarchical power management system 124 in FIGS. 1-3 and 5 are shown with common element numbers and are not re-described.

Also, as discussed herein, it is stated that the PEL circuit 126 receives activity power events 606 from a LAM circuit 136, this receipt of activity power events 606 can be directly from the LAM circuit 136 to the PEL circuit 126 or indirectly from one or more intermediate circuits, including the RAM circuits 502. For example, as discussed above, the activity power events 606 generated by the LAM circuits 136 can be indirectly reported to the PEL circuit 126 the as part of being included in aggregated activity power events 138 generated and reported by a RAM circuit 502 to the PEL circuit 126 as part of received activity power events 606.

Figure 8:
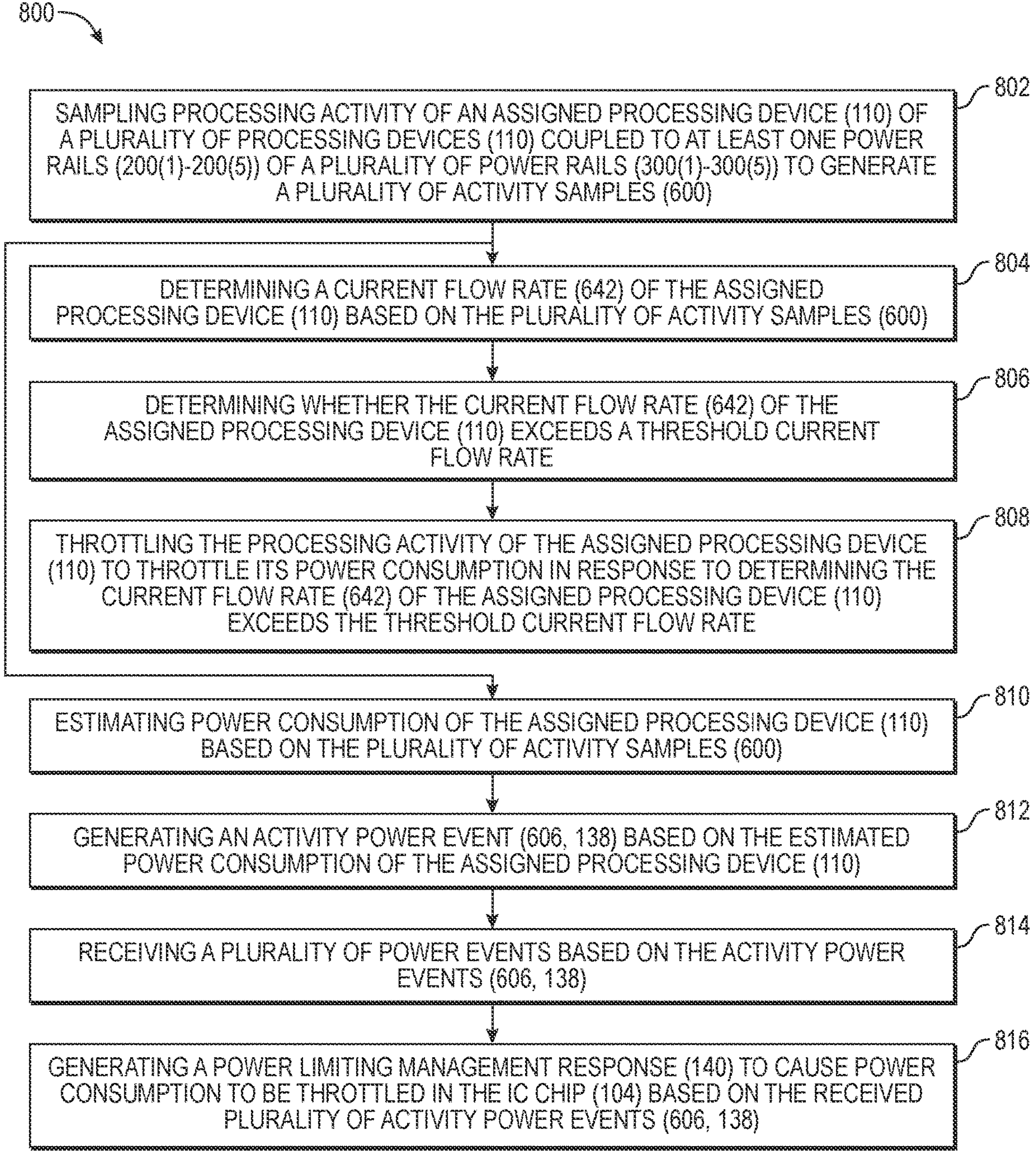
FIG. 8 is a flowchart illustrating an exemplary process of a hierarchical power management system of the processor-based system in FIG. 6, locally monitoring and throttling power consumption of monitored processing devices and hierarchically reporting activity power events related to the monitored power consumption to a PEL circuit configured to throttle power consumption in the processor-based system in response to the received power events.

FIG. 8 is a flowchart illustrating an exemplary process 800 of the LAM circuits 136 and/or the RAM circuits 502 in hierarchical power management systems 124, 624, 724 in FIGS. 1-3 and 5-7 locally monitoring and throttling power consumption of monitored processing devices 110. The process 800 also includes the hierarchically reporting activity power events 606, 138 related to the monitored power consumption by LAM circuits 136 and/or the RAM circuits 502 to throttle power consumption in the processor-based system 100 in response to the received activity power events 606, 138. The process 800 in FIG. 8 is discussed with regard to the hierarchical power management systems 624, 724 as examples.

In this regard, as shown in FIG. 8, a first step of the process 800 can be sampling processing activity of an assigned processing device 110 of a plurality of processing devices 110 coupled to at least one power rails 300(1)-300(5) of a plurality of power rails 300(1)-300(5) to generate a plurality of activity samples 600 (block 802 in FIG. 8). A next step in the process 800 can be determining a current flow rate 642 of the assigned processing device 110 based on the plurality of activity samples 600 (block 804 in FIG. 8). A next step in the process 800 can be determining whether the current flow rate 642 of the assigned processing device 110 exceeds a defined threshold current flow rate (block 806 in FIG. 8). A next step in the process 800 can be throttling the processing activity of the assigned processing device 110 to throttle its power consumption in response to determining the current flow rate 642 of the assigned processing device 110 exceeds the threshold current flow rate (block 808 in FIG. 8). Also, in addition to and/or in parallel to steps 804-808, another step in the process 800 can be estimating power consumption of the assigned processing device 110 based on the plurality of activity samples 600 (block 810 in FIG. 8). A next step in the process 800 can be generating an activity power event 606, 138 based on the estimated power consumption of the assigned processing device 110 (block 812 in FIG. 8). A next step in the process 800 can be receiving a plurality of power events based on the activity power events 606, 138 (block 814 in FIG. 8). A next step in the process 800 can be generating a power limiting management response 140 to cause power consumption to be throttled in the IC chip 104 based on the received plurality of activity power events 606, 138 (block 816 in FIG. 8).

Figure 9A:
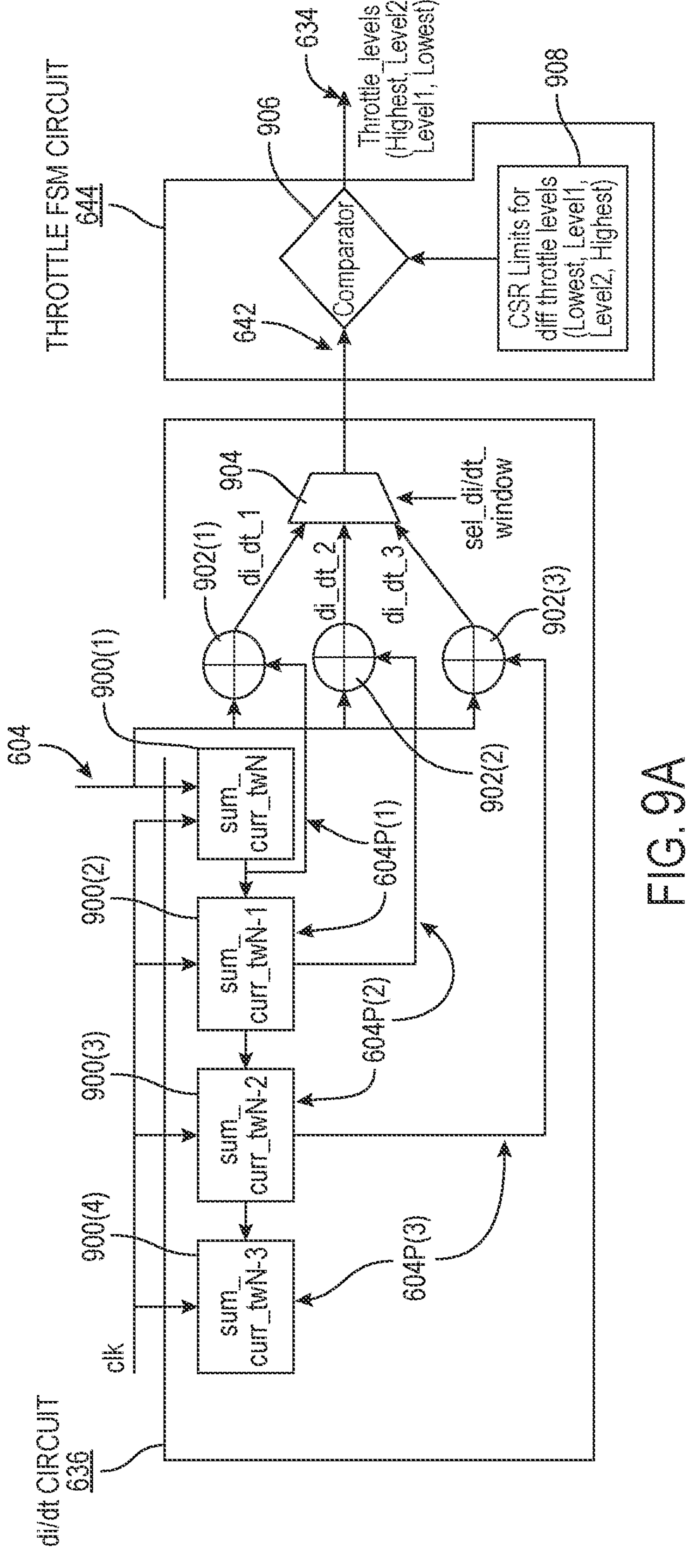
FIG. 9A is a schematic diagram illustrating an exemplary di/dt circuit that can be provided in a LAM circuit in the hierarchical power management system in FIG. 6, wherein the di/dt circuit is configured to collect activity samples of a device monitored by the LAM circuit and correlate the activity samples to estimate current and generate estimated current samples in a designated time window which can then be used to determine the slope of a rate of change in current (di/dt) consumed by the monitored processing device to determine whether the power consumption of the monitored processing device should be throttled by the LAM circuit.

FIG. 9A is a schematic diagram illustrating exemplary detail of the di/dt circuit 636 and throttle FSM circuit 644 in the LAM circuit 136 shown in FIG. 6 to collect received estimated current demands 604 for processing activity of a monitored processing device 110 over local time windows and determine if a current flow rate and/or change in current flow rate of the monitored processing device 110 exceeds a threshold current flow rate. This information is used by the LAM circuit 136 to determine if its monitored processing device 110 should be locally throttled by its assigned LAM circuit 136, as previously discussed in FIG. 6.

In this regard, as shown in FIG. 9A, the di/dt circuit 636 is configured to receive next estimated current demands 604 that are generated for each local time window of the LAM circuit 136 as discussed in FIG. 6. The di/dt circuit 636 includes a plurality of latch circuits 900(1)-900(4) that are clocked circuits (e.g., flip-flops) and are configured to store the incoming next estimated current demands 604 and previously received estimated current demands 604P(1)-604P(3). Latch circuit 900(1) stores the next incoming estimated current demand 604. The next incoming estimated current demand 604 stored in the latch circuit 900(1) and the previous estimated current demands 604P(1)-604P(3) stored in the latch circuits 900(1)-900(3) are then shifted to the next respective latch circuit 900(2)-900(4) for each newly received incoming estimated current demand 604 representing a local time window. For each incoming estimated current demand 604 received representing a local time window, the incoming estimated current demand 604 and previous estimated current demands 604P(1)-640P(3) are provided to respective summing circuits 902(1)-902(4). The summing circuits 902(1)-902(3) subtract the incoming estimated current demand 604 with a respective previous estimated current demand 604P(1)-604P(3) to generate respective current flow rates over local time windows (i.e., change in current flow rates) di_dt_1, di_dt_2, di_dt_3, as discussed below, of the incoming estimated current demand 604 and the respective estimated current demands 604P(1)-604P(3). Thus, the determined change in current flow rates di_dt_1, di_dt_2, di_dt_3 represent a rate in change in current flow rate or current demand and thus rate of change in power consumption of the monitored processing device 110 between the local time windows when the incoming estimated current demand 604 was received and a previous local time window of the respective previous estimated current demands 604P(1)-604P(3). di_dt_1 is the change in current or current flow rate between respective estimated current demand 604 and 604P(1). di_dt_2 is the change in current or current flow rate between respective estimated current demand 604 and 604P(2). di_dt3 is the change in current or current flow rate between respective estimated current demand 604 and 604P(3).

Figure 9B:
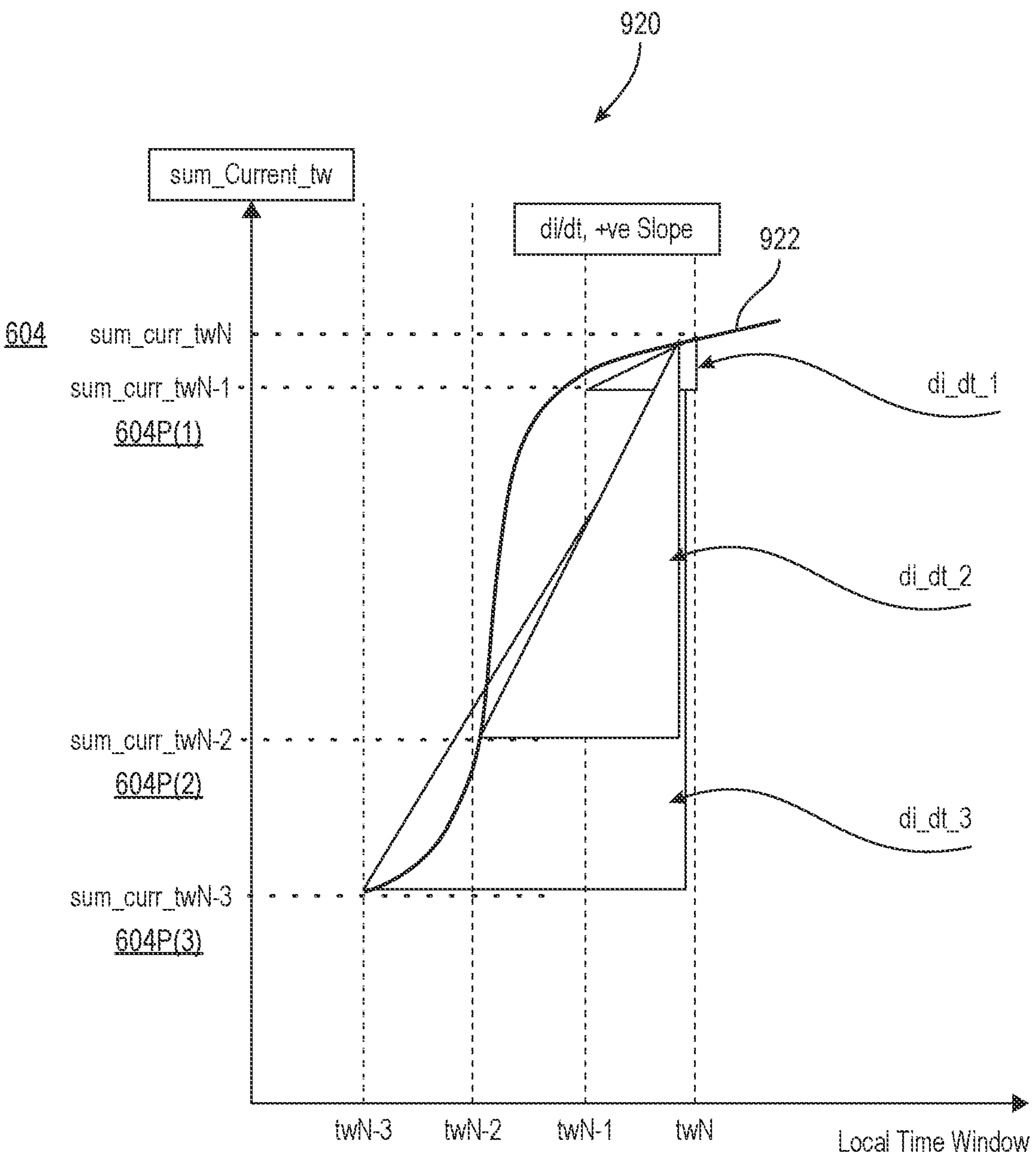
FIG. 9B is a graph illustrating exemplary estimated current samples collected by the di/dt circuit in FIG. 9A plotted as a function of time to determine the rate of change in current (di/dt) consumed by the monitored processing device.

With continuing reference to FIG. 9A, these change in current flow rates di_dt_1, di_dt_2, di_dt_3 may then be provided to a multiplexing circuit 904 that can selectively provide one of the change in current flow rates di_dt_1, di_dt_2, di_dt_3 as the next current flow rate 642 to a comparator circuit 906 in the throttle FSM circuit 644, discussed below. The selected change in current flow rate di_dt_1, di_dt_2, di_dt_3 provided as the next current flow rate 642 to the multiplexing circuit 904 may be based on a local time window selection signal sel_di_dt_window to select the local time windows to be compared to each current flow rate. This allows the flexibility of the di/dt circuit 636 to be programmed to select the local time windows of estimated current demands 604P(1), 604P(2) to be compared to the incoming estimated current demand 604. For example, FIG. 9B is a graph 920 illustrating exemplary incoming and estimated current demands 604, 604P(1)-604P(3) collected by the di/dt circuit 636 in FIG. 9A plotted as a function of local time window to show how the incoming and estimated current demands 604, 604P(1)-604P(3) can be subtracted to generate respective change in current flow rates di_dt_1, di_dt_2, di_dt_3 between the incoming estimated current demand 604 and the estimated current demands 604P(1)-604P(3) over their respective local time windows twN, twN−1, twN−2, twN−3. The duration of the local time windows is known. Thus, the change in current flow rates di_dt_1, di_dt_2, di_dt_3 represent a change in current demand between the incoming estimated current demand 604 in a current local time window and a respective previous estimated current demand 604P(1)-604P(3) over the difference in their local time windows. The current flow rate curve 922 represents the current flow rate of a processing device 110 over a period of local time windows twN−3, twN−2, twN−1, and twN. As shown in FIG. 9B, the slope of the current flow rate curve 922 changes at each of the local time windows twN−3, twN−2, twN−1, and twN based on the change in current demand or change in current flow rate demanded of the processing device 110 between local time windows twN−3, twN−2, twN−1, and twN. FIG. 9B shows the basis on which the di/dt circuit 636 in FIG. 9A can generate the change in current flow rates di_dt_1, di_dt_2, di_dt_3 representing a change in current demand between the incoming estimated current demand 604 in a current local time window and a respective previous estimated current demand 604P(1)-604P(3) over the difference in their local time windows twN−3, twN−2, twN−1, and twN. This can be used to provide the current flow rate 642 of the processing device 110 to use to determine local power consumption throttling.

The selected next current flow rate 642 is provided by the di/dt circuit 636 to the comparator circuit 906 in the throttle FSM circuit 644. The throttle FSM circuit 644 may be configured to generate the local throttle signals 634 to throttle power consumption of the monitored processing device 110 based on whether the selected next current flow rate 642 (from selection of change in current flow rate di_dt_1, di_dt_2, di_dt_3) exceeds a threshold current flow rate (which can include a threshold change in current flow rate) for the monitored processing device 110. The threshold current flow rate for the monitored processing device 110 can be obtained from a current flow rate register 908. The current flow rate register 908 can be programmed with a threshold current flow rate for the monitored processing device 110. For example, the current flow rate register 908 can be programmed with different threshold current flow rates (e.g., lowest, level 1, level 2, highest) so that the comparator circuit 906 can generate local throttle signals 634 for different levels of power consumption throttling based on the comparison of selected next current flow rate 642 (from selection of change in current flow rate di_dt_1, di_dt_2, di_dt_3) with the selected threshold current flow rate obtained from the current flow rate register 908.

Note that when current flow rate is discussed herein, such also means current flow and represents current (I) (e.g., transfer of electric charge (q) over time (t) (q/t)) or a change in the current flow rate (e.g., a change in current over time (di/dt)). A determined change in the current flow rate (di/dt) is determined from a determined current flow rate (I/t).

Figure 10:
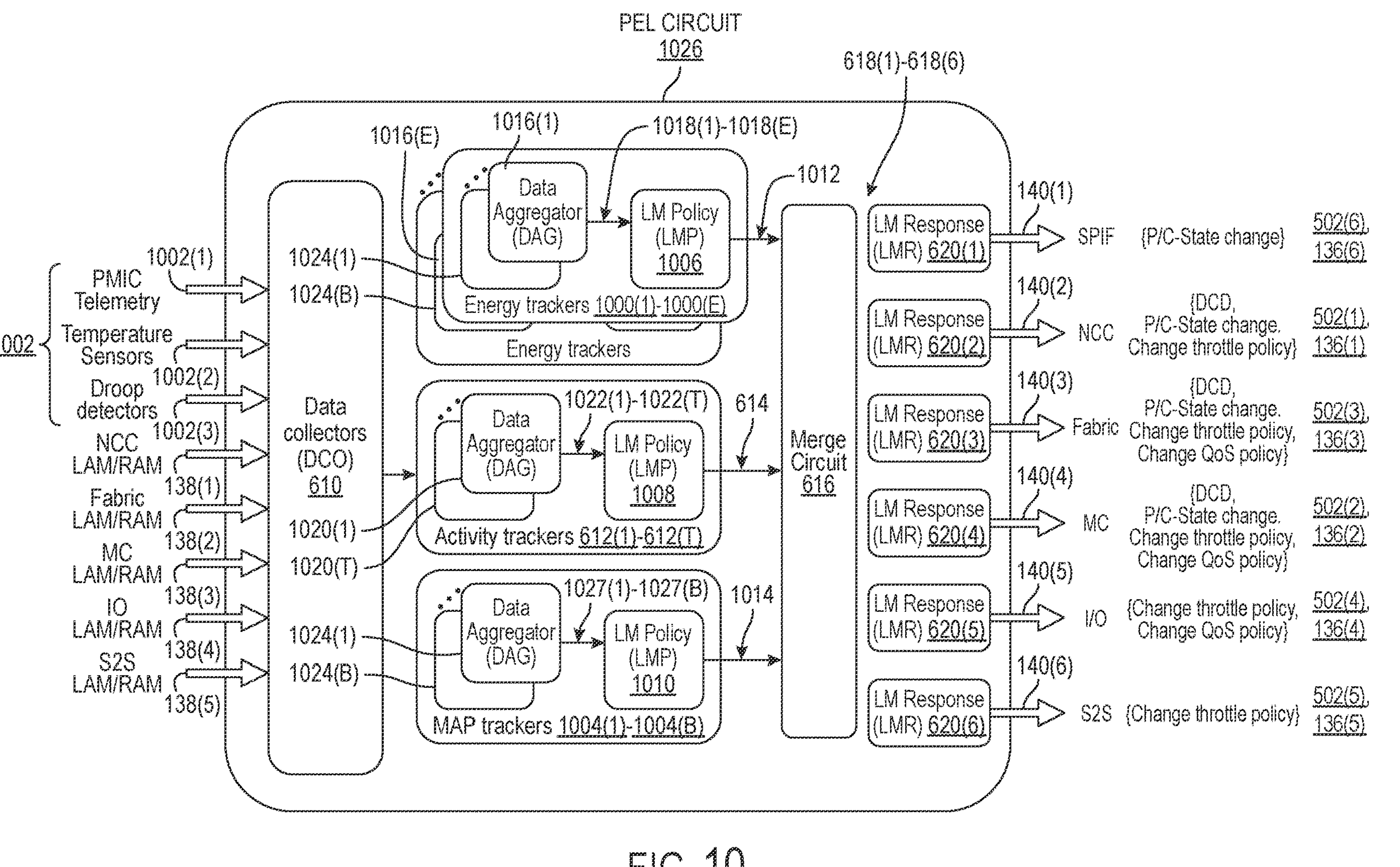
FIG. 10 is a logic diagram of an exemplary PEL circuit that can be provided in a hierarchical power management system of the processor-based system and that illustrates exemplary components for receiving power events, decoding the received power events in tracking circuits, and merging the tracked power events to generate a power limiting management responses to throttle power consumption in the processor-based system in response to the received power events.

The components of the hierarchical power management systems 124, 624, 724 in FIGS. 1-3 and 5-7 described above can be provided in different implementations. For example, FIG. 10 is a logic diagram of another exemplary LAM circuit 1000 that can be any of LAM circuits 126 provided in the hierarchical power management system 124, 624, 724 in FIGS. 1-3 and 5-7. Common elements between the PEL circuit 1026 in FIG. 10 and the PEL circuit 126 in the hierarchical power management system 124, 624, 724 in FIGS. 1-3 and 5-7 are shown with common element numbers.

In another example of the components of the hierarchical power management systems 124, 624, 724 in FIGS. 1-3 and 5-7 described above, FIG. 10 shows the PEL circuit 1026 configured to receive the aggregated activity power events 138(1)-138(5) from the one or more RAM circuits 502. The PEL circuit 1026 can be the PEL circuit 126 provided in the hierarchical power management system 124, 624, 724 in FIGS. 1-3 and 5-7. In this example, the PEL circuit 126 includes the decode circuit 610 that is configured to decode the received aggregated activity power events 138(1)-138(5) into the corresponding activity tracker circuit 612(1)-612(T) as previously described. The PEL circuit 1026 in this example also includes energy tracker circuits 1000(1)-1000(E) that are associated with energy power events 1002, such as PMIC telemetry power events 1002(1), temperature events 1002(2), and voltage droop detection events 1002(3) (all of which are examples of non-activity power events), that can also affect how the PEL circuit 126 decides to throttle power. The PEL circuit 1026 in this example also includes maximum average power (MAP) tracker circuits 1004(1)-1004(B) that are circuit trackers that track the total power consumed in the SoC 120 according to a defined maximum power consumption limit. Similar to the activity tracker circuits 612(1)-612(T), the energy tracker circuits 1000(1)-1000(E) and the MAP tracker circuits 1004(1)-1004(B) are configured to respective energy power events 1002(1)-1002(3) and/or aggregated activity power events 138(1)-138(5) to determine whether a factor exists that is dependent on power consumption that exceeds a defined power (e.g., current) threshold/limit.

The energy tracker circuits 1000(1)-1000(E) may each include respective data aggregator circuits 1016(1)-1016(E) that are configured to aggregate the received energy power events 1002 into respective aggregated energy power events 1018(1)-1018(E). The activity tracker circuits 1000(1)-1000(E) may also each include respective data aggregator circuits 1020(1)-1020(T) that are configured to aggregate received energy power events into respective aggregated energy power events 1022(1)-1022(T). The MAP tracker circuits 1004(1)-1004(B) may also each include respective data aggregator circuits 1024(1)-1024(T) that are configured to aggregate received energy power events into respective aggregated MAP power events 1027(1)-1027(T). The energy tracker circuits 1000(1)-1000(E), the activity tracker circuits 612(1)-612(T), and the MAP tracker circuits 1004(1)-1004(B) in this example, each include a respective energy power limit management policy circuits 1006, activity power limit management policy circuits 1008, and MAP power limit management policy circuits 1010 that are configured to generate respective energy power throttle recommendations 1012, activity power throttle recommendations 614, and MAP power throttle recommendations 1014. These generated respective energy power throttle recommendations 1012, activity power throttle recommendations 614, and MAP power throttle recommendations 1014 may be based on the respective received aggregated energy power events 1018(1)-1018(E), aggregated activity power events, 1022(1)-1022(T), aggregated MAP power events 1027(1)-1027(B) for the PEL circuit 126 to process to determine how to throttle power consumption in the IC chip 104.

With continuing reference to FIG. 10, the energy tracker circuits 1000(1)-1000(E), the activity tracker circuits 612(1)-612(T), and the MAP tracker circuits 1004(1)-1004(B) are configured to compare a power consumption indicated by the respective aggregated energy power events 1018(1)-1018(E), aggregated activity power events 1022(1)-1022(T), and aggregated MAP power events 1027(1)-1027(B), to the respective energy power limit management policy circuits 1006, activity power limit management policy circuits 1008, and MAP power limit management policy circuits 1010 energy tracker circuits 1000(1)-1000(E), the activity tracker circuits 612(1)-612(T), and the MAP tracker circuits 1004(1)-1004(B). The energy tracker circuits 1000(1)-1000(E), the activity tracker circuits 612(1)-612(T), and the MAP tracker circuits 1004(1)-1004(B) may then be configured to generate the respective energy power throttle recommendations 1012, activity power throttle recommendations 614, and MAP power throttle recommendations 1014 based on the comparison of the power consumptions indicated by the respective aggregated power events 1018(1)-1018(E), 1022(1)-1022(T), 1027(1)-1027(B) to the respective power limit management policy circuits 1006, 1008, 1010. For example, the energy power limiting management policy circuits 1006, the activity power limit management policy circuits 1008, and the MAP limiting management policy circuits 1010 may each have respective a threshold power consumption that is compared to the respective aggregated power events 1018(1)-1018(E), 1022(1)-1022(T), 1027(1)-1027(B) to determine the respective power throttle recommendations 1012, 614, 1014.

With continuing reference to FIG. 10, the PEL circuit 1026 also includes the merge circuit 616 that merges the energy power throttle recommendations 1012, generates respective activity power throttle recommendations 614, and MAP power throttle recommendations 1014 into merged power throttle recommendations 618(1)-618(6). The merged power throttle recommendations 618(1)-618(6) are provided to respective assigned target circuits 620(1)-620(6). Note that each merged power throttle recommendation 618(1)-618(6) can be influenced by power throttle recommendations from each of the energy power throttle recommendations 1012, generate respective activity power throttle recommendations 614, and MAP power throttle recommendations 1014. Each target circuit 620(1)-620(6) is associated with a different target device 200 in the processor-based system 100 in which the PEL circuit 1026 can issue power limiting management responses 140(1)-140(6) to limit the power consumption of such target device 200.

The target devices 200 can include the interface circuits 127(1)-127(Z) that can be throttled by power limiting management responses 140(1) communicated to a RAM circuit 502(6) and/or LAM circuit 136(6) configured to throttle power consumption in such interface circuits 127(1)-127(Z). The target devices 200 can include the PU clusters 108(0)-108(N) that can be throttled by power limiting management responses 140(2) communicated to a RAM circuit 502(1) and/or LAM circuit 136(1) configured to throttle power consumption in such PU clusters 108(0)-108(N). The target devices 200 can include the internal communication network 114 that can be throttled by power limiting management responses 140(3) communicated to a RAM circuit 502(3) and/or LAM circuit 136(3) configured to throttle power consumption in such internal communication network 114. The target devices 200 can include the memory controllers 118(0)-118(M) that can be throttled by power limiting management responses 140(4) communicated to a RAM circuit 502(2) and/or LAM circuit 136(2) configured to throttle power consumption in such memory controllers 118(0)-118(M). The target devices 200 can include the I/O interface circuits 120(0)-120(X) that can be throttled by power limiting management responses 140(5) communicated to a RAM circuit 502(4) and/or LAM circuit 136(4) configured to throttle power consumption in such I/O interface circuits 120(0)-120(X). The target devices 200 can include the S2S interface circuits 122(0)-122(Y) that can be throttled by power limiting management responses 140(6) communicated to a RAM circuit 502(5) and/or LAM circuit 136(5) configured to throttle power consumption in such S2S interface circuits 122(0)-122(Y).

The merge circuit 616 in the PEL circuit 1026 can be programmed to map (e.g., through firmware, electronic fuses, etc.) merged power throttle recommendations 618(1)-618(6) to a particular target device 200, and thus a target circuit 620(1)-620(6), that may not directly correlate to each other. In this manner, the merged power throttle recommendations 618(1)-618(6) related to power issues and power consumption in the IC chip 104 can be mapped in the PEL circuit 1026 to correlate to different target devices 200 for throttling power consumption. The merge circuit 616 can be programmed in a "many-to-many mapping" to correlate to different power-limiting management responses within the IC chip 104 in the desired manner for more flexibility in managing power consumption in the IC chip 104 while still achieving the desired performance. In this manner, the power throttling management behavior of the PEL circuit 1026 can be configured and changed even after the IC chip 104 is deployed in an application.

With continuing reference to FIG. 10, the target circuits 620(1)-620(6) are may each be configured to determine if the power consumption of an associated target device 200 in the processor-based system 100 should be throttled based on the merged power throttle recommendations 618(1)-618(6) provided to the target circuits 620(1)-620(6). The target circuits 620(1)-620(6) may each be configured to analyze the respectively received merged power throttle recommendation 618(1)-618(6) to determine if power consumption of an associated target device 200 should be throttled. If a target circuit 620(1)-620(Q) determines that power consumption of an associated target device 200 in the processor-based system 100 should be throttled, the target circuit 620(1)-620(Q) causes an associated power limiting management response 140(1)-140(6) to be generated to be communicated to a respective RAM circuit 502(1)-502(6) and/or LAM circuit 136(1)-136(6) cause the power consumption of a target device 200 associated with the power limiting management response 140(1)-140(Q) to limit power consumption.

Figure 11:
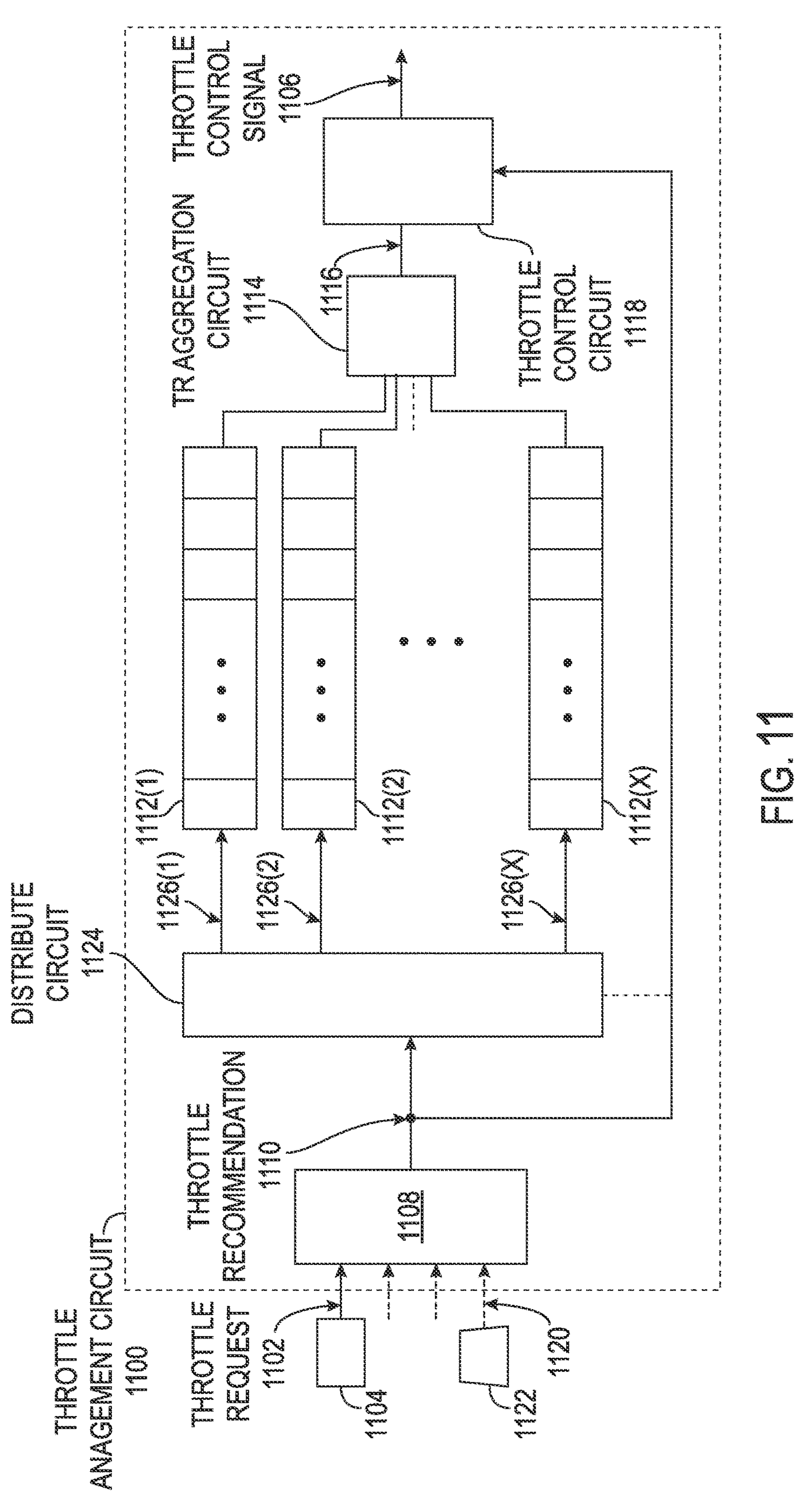
FIG. 11 is a logic diagram of an exemplary throttle management circuit in the processor-based system to illustrate exemplary components for receiving throttle request(s) based on a measured state of processing circuits and generating a throttle control signal to throttle processing activity in the processing circuits to dynamically respond to detected states of the processor-based system.

The components of a power management system, such as hierarchical power management systems 124, 624, 724 in FIGS. 1-3 and 5-7 described above can be provided in different implementations. For example, FIG. 11 is a logic diagram of another exemplary throttle management circuit 1100 that can be an alternative to the throttle FSM circuit 644 provided in the hierarchical power management system 124, 624, 724 in FIGS. 1-3 and 5-7. Common elements between the throttle management circuit 1100 in FIG. 11 and the throttle FSM circuit 644 in the hierarchical power management system 124, 624, 724 in FIGS. 1-3 and 5-7 are shown with common element numbers.

FIG. 11 shows a throttle management circuit 1100 configured to receive a throttle request 1102 from at least one state detection circuit 1104 and generate a throttle control signal 1106. The throttle control signal may be to selectively throttle activity of monitored processing devices 110 in a processor-based system 100 of an integrated circuit (IC) chip 104 according to FIG. 1. In an example, the throttle management circuit 1100 may be configured to generate a throttle control signal to selectively throttle activity of the monitored processing devices 110 in one of the LAM circuits 136 in FIG. 2. That is, one or more of the LAM circuits 136 may include the throttle management circuit 1100. Based on one or more measures of a state of the processor-based system 100 detected or sensed by the at least one state detection circuit 1104, the throttle management circuit 1100 can throttle (e.g., selectively reduce within a configurable range) activity of the monitored processing devices 110 on which the one or more measured state at least partially depends. While the present disclosure presents examples where the disclosed throttle management circuit is included in one or more LAM circuits, the present disclosure is not so limited. Rather, any IC chip comprising a processor-based system comprising processing circuits operating in response to a clock signal may comprise a management circuit, such as the throttle management circuit 1100 according to the present disclosure.

Activity (e.g., circuit switching) in the monitored processing devices 110 can have a variety of direct and indirect effects, which can cause a reduction in performance and/or even potentially may physically damage the processor-based system 100. Certain measured states (e.g., in the LAM circuit 136) that may be caused by such activity may include, for example, peak power consumption, average power consumption, peak voltage, average voltage, peak current, average current, rate of change of current or voltage, temperature, and firm-ware measurable activity. In response to a measure of one or more of such states, the throttle management circuit 1100 can react dynamically at a local level to avoid or reduce any negative impact from the measured state(s). For example, the throttle management circuit 1100 can react dynamically at a local level without having to wait for the delay of a reaction through the hierarchy of the power management system 124 (e.g., through the RAM circuit 502 and the PEL circuit 126). In particular, the throttle management circuit 1100 can change the throttle control signal 1106, which may be the local throttle signal 634, to affect activity, either in a local time window or immediately (e.g., in the next cycle of the clock signal CLK).

The clock signal CLK is employed to trigger switching in the throttle management circuit 1100 as well as in the monitored processing devices 110 and other circuits. In some examples, the clock signal CLK may be the clock signal 508 to clock the PU clusters 108(1)-108(N) and/or the clock signal 512 to clock the network nodes 500 (as discussed above).

In this regard, the throttle requests 1102 may be received from a plurality of state detection circuits 1104 that can each request a change in the activity of the monitored processing devices 110. The at least one state detection circuits 1104 may measure different ones of the states described above or other states not explicitly mentioned here and may additionally or alternatively measure a same state (e.g., temperature) at different locations. The throttle requests 1102 are received in a throttle request merge circuit 1108 that generates a throttle recommendation 1110 based on the at least one throttle request 1102. The throttle recommendation 1110 may be generated in every cycle of the clock signal CLK in which at least one throttle request 1102 is received from the at least one state detection circuits 1104. However, there may be cycles of the clock signal CLK in which no throttle request 1102 is received in the throttle request merge circuit 1108. In such cycles, no throttle recommendation 1110 is generated.

In some examples, throttle requests 1102 may be provided from hierarchical logic to locally throttle circuits. For example, the throttle management circuit may be included in one of the LAM circuits 136, as shown in FIG. 5, that is among the subset of LAM circuits 136 coupled to one of the RAM circuits 502(3) and may receive a throttle request 1102 from the RAM circuit 502(3). It is further noted that the various sources of the throttle requests 1102 may not be synchronized and, thus, the throttle requests 1102 may be received randomly and may only be received from any one of the sources (e.g., state detection circuits 1104) occasionally.

The throttle management circuit 1100 may also include a distribute circuit 1124, explained more fully below, that passes the throttle recommendation 1110 as one of a plurality of decoded throttle recommendations 1126(1)-1126(X).

The throttle management circuit 1100 includes a plurality of throttle recommendation registers ("TR registers") 1112(1)-1112(X) that are each configured to receive one of the decoded throttle recommendations 1126(1)-1126(X) generated in the throttle request merge circuit 1108 in a cycle of the clock signal CLK and forwarded by the distribute circuit 1124. The TR registers 1112(1)-1112(X) each store at least a portion of a corresponding one of the throttle recommendations 1126(1)-1126(X) for a number (X) consecutive cycles of the clock signal CLK. The throttle recommendation registers 1112(1)-1112(X) may receive the throttle recommendation 1126(1)-1126(X) in a rotating or round-robin order, in which a first throttle recommendation 1126(1) is received in a first one of the plurality of TR registers 1112(1) in a first cycle of the clock signal CLK, a second throttle recommendation 1126(2) may be received in a second one of the plurality of the TR registers 1112(2) in a next cycle of the clock signal CLK, and so on. Alternatively, because the throttle request merge circuit 1108 may not receive any throttle request 1102 and generate a throttle recommendation 1110 in every cycle, as noted above, there may be cycles of the clock signal CLK in which none of the TR registers 1112(1)-1112(X) are loaded with a new throttle recommendation 1110. In examples in which the throttle recommendation 1126(X) is stored in the TR register 1112(X), the distribute circuit 1124 would wrap around in the next cycle and send the next throttle recommendation 1110 from the throttle merge request circuit 1108 as throttle recommendation 1126(1), which would be received in TR register 1112(1).

The TR registers 1112 are, for example, shift registers that shift out the throttle recommendations 1126(1)-1126(X) one bit per cycle. As an example, the first TR register 1112(1) continues to store at least a portion of the first throttle recommendation 1126(1) for the number (X) of cycles, which corresponds to the number of bits (X) in the throttle recommendation 1126(1), as explained further below. After the number (X) of cycles, the last bit of the throttle recommendation 1126(1) is shifted out. In the next cycle, either a new throttle recommendation 1126(1) is received and stored in the first TR register 1112(1) or, if no throttle request 1102 is received in the throttle request merge circuit 1108, there may or may not be a throttle recommendation 1110 generated. A throttle recommendation 1110 may be indicated by a valid signal, for example (not shown). If no throttle recommendation 1110 is generated, then there may be no corresponding throttle recommendation 1126(1)-1126(X) provided to the TR register 1112(1). As a result, one or more of the TR registers 1112(1)-1112(X) may contain only zeroes "0s", which have been shifted into the left-most bit and will not cause any reduction of activity. If no throttle request 1102 is received for X consecutive cycles of the clock signal CLK, all the TR registers will be empty and no throttling will occur.

As long as at least one throttle request 1102 is received in each cycle, the plurality of TR registers 1112(1)-1112(X) would each be storing a different number of bits of the throttle recommendations 1126(1)-1126(X). Further details of operation of the throttle recommendation registers 112 are provided below by way of a description of an example in FIGS. 13A-13C.

With reference back to FIG. 11, the throttle management circuit 1100 also includes a throttle recommendation aggregation circuit 1114 ("TR aggregation circuit 1114") that generates a throttle result 1116 based on the throttle recommendations 1126(1)-1126(X). In this regard, the throttle result 1116 is an aggregation of all of the throttle recommendations 1110 of the last X cycles. In some examples, X cycles may correspond to a local time window of the LAM circuit 136. In some examples, the throttle recommendation aggregation circuit 1114 may generate the throttle result 1116 from a logical OR of a particular bit position of each of the throttle recommendation registers 1112(1)-1112(X), as explained in further detail with reference to FIGS. 13A-13C. Although, other methods of aggregating the throttle recommendations 1126(1)-1126(X) from previous X cycles may be employed in the throttle recommendation aggregation circuit 1114.

The throttle management circuit 1100 also includes a throttle control circuit 1118 that receives the throttle result 1116, e.g., in each cycle of the clock signal CLK, and generates the throttle control signal 1106 to selectively throttle activity in the monitored processing devices 110. In some examples, the throttle control circuit 1118 may generate the throttle control signal 1106 from (e.g., only) the throttle result 1116. In some examples, in addition to receiving the throttle result 1116 from the throttle recommendation aggregation circuit 1114 in each cycle of the clock signal CLK, the throttle control circuit 1118 may also receive the throttle recommendation 1110 generated in the throttle request merge circuit 1108 or the most recently generated one of the throttle recommendations 1126(1)-1126(X) from the distribute circuit 1124. The throttle control circuit 1118, in such examples, may generate the throttle control signal 1106 based on the throttle result 1116 received in a current cycle and on the throttle recommendations 1126(1)-1126(X) received in any of the X previous cycles of the clock signal CLK. In examples in which no throttle requests are received for X consecutive cycles, all the TR registers 1112(1)-1112(X) will contain 0s (zeroes), and the throttle result 1116 will be "0", such that no throttling is requested by the throttle control signal 1106. To facilitate a more detailed description of operation of the throttle management circuit 1100 provided below with reference back to FIG. 11, a detailed description of a state detection circuit 1200 is first provided with reference to FIG. 12.

Figure 12:
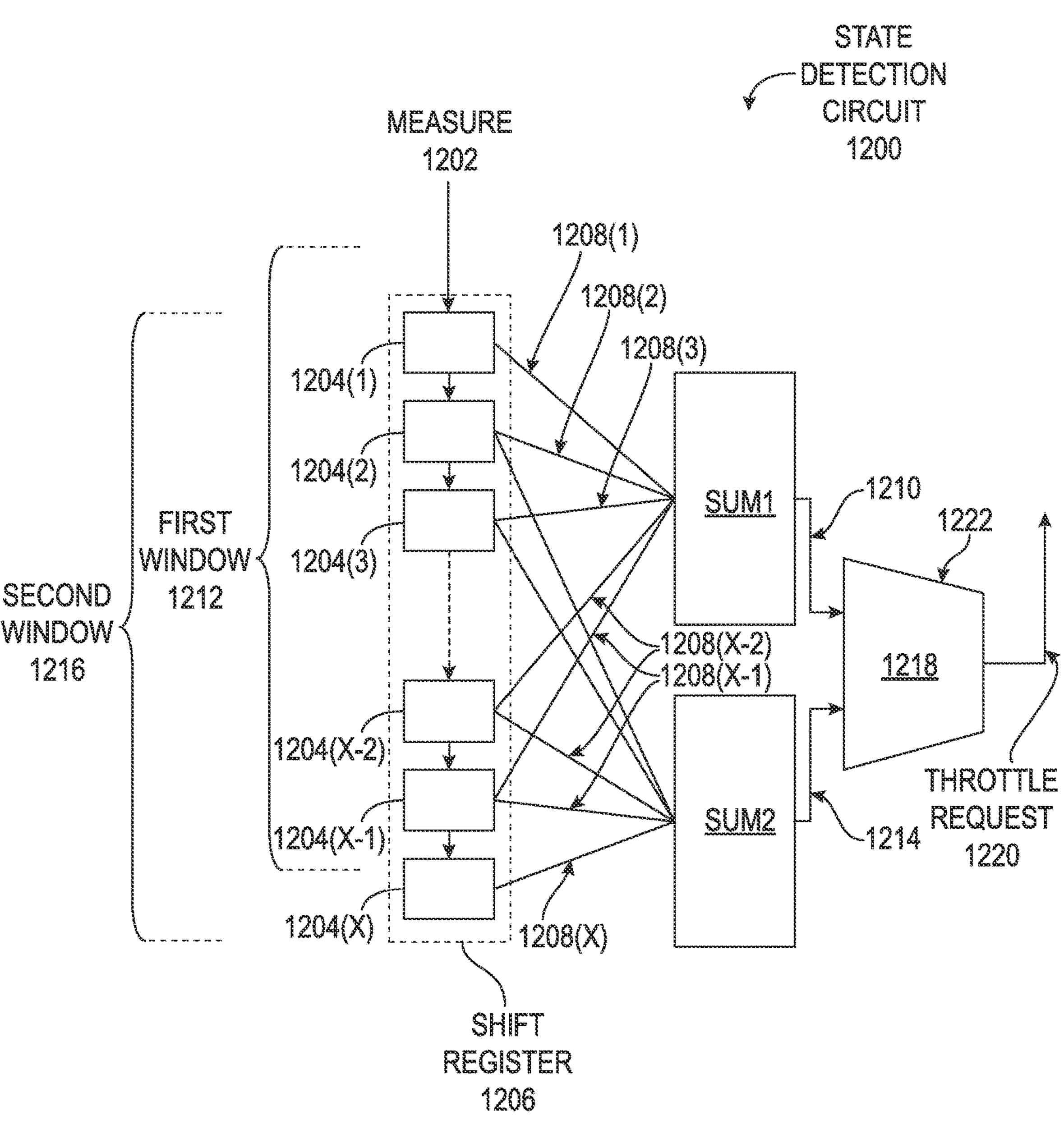
FIG. 12 is a logic diagram of an exemplary state detection circuit for generating throttle requests in each cycle of a clock to respond dynamically to state changes caused by activity in the processing circuits.

FIG. 12 is a logic diagram of a state detection circuit 1200 for generating throttle requests as frequently as each cycle of the clock signal CLK to respond dynamically to state changes caused by activity in the processing circuits 110. The state detection circuit 1200 is one example of the state detection circuit 1104 in FIG. 11. The state detection circuit 1200 may be an alternative to the di/dt circuit 636 in FIG. 6, which is employed to track a rate of change of current flow. In this example, a measure 1202 is an indication of a current flow in the processor-based system 100 depending on activity of the monitored processing devices 110 in the LAM circuit 136. In some examples, the measure 1202 is a measure of current provided to the monitored processing devices 110. The measure 1202 may be sampled by the state detection circuit 1200 from, for example, the accumulate circuit 602 in FIG. 6 as frequently as every cycle of the clock signal CLK. In some examples, the measure 1202 of the current flow may be the summed current demand 604 in FIG. 6.

In each cycle of the clock signal CLK, the state detection circuit 1104 may receive the measure 1202 and store the measure 1202 in a first entry 1204(1) of a plurality of entries 1204(1)-1204(X) of a shift register 1206, which may be any appropriate type of storage circuit. The entries 1204(1)-1204(X) store or contain measures 1208(1)-1208(X), which are the measure 1202 received in X previous cycles of the clock signal CLK. The measure 1202 is stored in the first entry 1204(1) in response to (e.g., a rising or falling edge of) the clock signal CLK. Also, in response to the clock signal CLK, the measure 1208(1) (e.g., the measure 1202 received in an immediately previous cycle) is shifted into the entry 1204(2) in a direction toward the last entry 1204(X). Similarly, the measure 1208(2) is shifted from the second entry 1204(2) into the third entry 1204(3), the measure 1208(X−1) is shifted from the entry 1204(X−1) into the entry 1204(X), and measure 1208(X) shifted out of the shift register 1206.

Determining a rate of change of current includes generating a first sum 1210 of the measure 1202 and the measures 1208(1)-1208(X−1), which corresponds to a first window 1212 of X cycles, and generating a second sum 1214 of the measures 1208(1)-1208(X) corresponding to a second window 1216 of X cycles. The window 1216 and the window 1212 overlap in X−1 cycles, and the first sum 1210 is compared to the second sum 1214. The number X and the number of cycles of overlap of the windows 1212 and 1216 may be programmable.

The first sum 1210 and the second sum 1214 in this example (in which X=8) are determined (summed) in summing circuits SUM1 and SUM2, respectively. Thus, the first sum 1210 determined in summing circuit SUM1 is a total of the measure 1202 received in a current cycle and the stored measures 1208(1)-1208(7) of the state in all of the entries 1204(1)-1204(7) in the shift register 1206 except for the last entry 1204(8). The second sum 1214 determined in the summing circuit SUM2 is a total of the measures 1208(1)-1208(8) in the entries 1204(1)-1204(8) of the shift register. The first sum 1210 and the second sum 1214 are based on X−1 overlapping cycles that are compared every cycle. In this regard, the state detection circuit 1104 can dynamically respond to a single cycle change in current and can cause the throttle management circuit 1100 to respond in the next cycle.

In the example above, the number of cycles in the windows 1212 and 1216 is equal to the number X of entries 1204(1)-1204(X). In some examples, a number W of cycles in windows 1212 and 1216 may be configurable up to a maximum of X. In other words, although there are X entries

1204(1)-1204(X) in the register 1206, the first sum 1210 may be a sum of the measure 1202 and the measures 1208(1)-1208(M−1) and the second sum 1214 may be a sum of measures 1208(1)-1208(M), where the number M is configurable up to X.

The state detection circuit 1104 may include a throttle request generation circuit 1218 that compares the first sum 1210 to the second sum 1214 and generates a throttle request 1220 based on the first sum 1210 and the second sum 1214. In some examples, the throttle request generation circuit 1218 generates the throttle request 1220 based on a difference between the first sum 1210 and the second sum 1214. In some examples, the request 1220 is additionally or alternatively based on the magnitudes of the first sum 1210 and the second sum 1214. Performing the comparison of the first sum 1210 and the second sum 1214 in this example includes determining a difference 1222 between the first sum 1210 and the second sum 1214 by subtraction in the throttle request generation circuit 1218 and generating a throttle request 1220 based on the difference 1222. In this regard, the throttle request 1220 may be increased in response to the difference 1222 being a large positive number indicating a significant increase in current. An increase in the throttle request 1220 in such example corresponds to a request to reduce activity in the monitored processing devices 110. In some examples, if the difference 1222 is a positive number that exceeds a first threshold, the throttle request may be incrementally increased. The difference 1222 exceeding a second threshold may cause a greater increase. The thresholds may be configurable. In another example, if the second sum 1214 is greater than the first sum 1210, causing the difference 1222 to be negative, the threshold request 1220 may be reduced.

The throttle request 1220 may be increased or decreased because the throttle request 1220 generated in each of the at least one state detection circuits, such as the state detection circuit 1200, comprises a throttle value having one of a number (V) of throttle values in a range that includes more than two throttle values and may be, for example, four, eight, or more. Although not shown, for example, a LAM circuit, such as the LAM circuit 136 may include a throttle value range configuration circuit employed to configure the number V of throttle values in the range of throttle values of the throttle request 1220 generated in each of the at least one state detection circuit 1104 in FIG. 11.

As an example, the throttle request 1220 may be generated at a lower value in the range of throttle values in response to determining that current is decreasing and/or decreasing at a rate that exceeds a rate threshold or in response to determining that the first sum 1210 and the second sum 1214 are each below a sum threshold. For example, if the number V of throttle values in the range of throttle values is eight (8), the throttle request 1220 may be indicated as any one of 0/8, 1/8, 2/8, and 7/8, where 0/8 does not request any reduction or throttling of the activity in the monitored processing devices 110 and 7/8 is a strongest or most restrictive request for reduction or stopping of activity in the monitored processing devices 110. The throttle request 1220 may be a request to limit activity in the monitored processing devices 110 for a first number of cycles among a second number of cycles. In the examples described above, a throttle request 2/8 requests that, in a local time window of eight (8) cycles of the clock signal CLK, activity in the monitored processing devices 110 is suspended during two (2) of the cycles. In some examples, such as when there is little or no activity in the processing circuits 110, no valid throttle request 1220 may be generated.

Although the state detection circuit 1200 in FIG. 12 is directed to detecting a rate of change of current (e.g., current flow or current level) and whether such change exceeds a threshold, the state detection circuit 1104 in FIG. 11 may be employed for detecting a change in other states, such as voltage, peak power, peak current, average voltage, average current, average power, temperature or activity measured by an activity measurement algorithm, which may be implemented in firmware (e.g., a circuit implementing instructions of an algorithm). In such alternative examples, the measure 1202 would be a measure of such state.

A more detailed description of the state detection circuit 1104, which may be the state detection circuit 1200 in FIG. 12, is provided with reference back to FIG. 11 and the above example of the throttle request 1220 having a range of eight (8) throttle values.

As noted above, the throttle request merge circuit 1108 in FIG. 11 receives the throttle request 1102, which may be the throttle request 1220 in FIG. 12, as a first throttle request 1102 from one of the at least one state detection circuits 1104. As described with reference to FIG. 12, the state detection circuit 1200 generates the throttle request 1220 in each cycle of the clock signal CLK, which makes it possible to dynamically respond in a single cycle of the clock signal CLK to changes in a measured state of the LAM circuit 136. In some examples, the throttle request merge circuit 1108 also receives a second throttle request 1120 from a second state detection circuit 1122 and may receive the second throttle request 1120 less often than each cycle of the clock signal CLK. In this regard, while the state detection circuit 1200 may generate a throttle request 1102 every cycle, another type of state detection circuit 1104 (e.g., the second state detection circuit 1122) may generate a second throttle request 1120 only under certain conditions or at a lower frequency. Such conditions may include a threshold being exceeded or the occurrence of an event detected by the second state detection circuit 1122. In some examples, the throttle request may be received periodically (e.g., every 4 cycles or 8 cycles) or randomly.

In cycles in which the second throttle request 1120 is received from the second state detection circuit 1122, the throttle request merge circuit 1108 generates the throttle recommendation 1110 based on both the first throttle request 1102 and the second throttle request 1120.

In each cycle of the clock signal CLK in which the second throttle request 1120 is not received from the second state detection circuit 1122, the throttle request merge circuit 1108 may generate the throttle recommendation 1110 based only on the first throttle request 1102 from the first state detection circuit 1104. In some examples, multiple state detection circuits (not shown) provide a throttle request 1102 in every cycle of the clock signal CLK in addition to the throttle request 1102 received from the first state detection circuit 1104. In such example, the throttle request merge circuit 1108 may generate the throttle recommendations 1126(1)-1126(X) based on the first throttle request 1102 from the first state detection circuit 1104 and the other throttle requests received in a same cycle.

In other examples, the throttle request merge circuit 1108 may generate the throttle recommendations 1110 based on the last (e.g., most recently received) second throttle request 1120 from the second state detection circuit 1122 in addition to the first throttle request 1102 from the first state detection circuit 1104. In such example, the throttle request merge circuit 1108 may include a circuit for storing a last received second throttle request 1120 and generate throttle recommendations 1110 based on a last stored throttle value of the second throttle request 1120 and/or other throttle requests that are not received every cycle. The throttle request merge circuit 1108 may determine whether the throttle request 1102 or the second throttle request 1120 is received in a given cycle based on, for example, a valid signal (not shown) being activated in a cycle in which the throttle request 1102 is provided.

With further reference to FIG. 12, an example of the throttle request 1220 having eight (8) possible values is discussed above. As known in the art, eight possible values can be encoded in three binary signals (bits). Thus, the throttle request 1220, as well as the first throttle request 1102 and the second throttle request 1120 in FIG. 11, may be received as three-bit binary values (e.g., from "000" to "111"). The throttle recommendation 1110 generated by the throttle request merge circuit 1108 may have a same level of granularity (e.g., range of values) as the throttle requests 1102 and accordingly can also be represented by a same number of digits (e.g., 3 in this case). In other words, the throttle recommendation 1110 is generated with the number V of possible values. However, the throttle recommendation 1110 generated each cycle is stored in the throttle recommendation registers 1112(1)-1112(X) in a decoded form including V bits, where a number of bits set to "1" corresponds to the value of the throttle recommendation 1110, as explained below. In this regard, the distribute circuit 1124 is configured to receive the throttle recommendation 1110 from the throttle request merge circuit 1108, decode the throttle recommendation 1110, and store the throttle recommendation 1110 (e.g., in decoded format) into an appropriate one of the throttle recommendation registers 1112(1)-1112(X).

In operation, the V possible values (e.g., 0/8, 1/8, . . . 7/8) of the throttle recommendation 1110 are interpreted in the throttle management circuit 1100 as of ratio of inactive cycles to active cycles of the monitored processing devices 110. Stated differently, the throttle recommendation is a recommendation for a number of "inactive cycles" out of a total number of cycles in a local time window (e.g., V cycles). A variety of methods of distributing the "inactive cycles" among the V cycles in a local time window are possible. For example, a throttle recommendation 1110 having a value of "4/8" (indicating 4 inactive cycles out of 8) can be implemented to alternate every other cycle in the local time window between active and inactive. Alternatively, a throttle recommendation of "4/8" may be implemented as alternating between two consecutive active cycles and two consecutive inactive cycles repeatedly. In an alternative employed herein, the throttle recommendations are implemented with the number of inactive cycles followed by the active cycles. In other words, in the example of a throttle recommendation that is "4/8", the throttle recommendation 1110 would hold the monitored process circuits 110 inactive for four cycles followed by four active cycles. Thus, in this example, an encoded throttle recommendation 1110 provided to the distribute circuit 1124 as "011" binary is decoded and provided to the throttle recommendation registers 1112(1)-1112(X) as a V-bit value of "00001111", where each bit corresponds to a cycle of the clock signal CLK. In this example, bits of the decoded throttle recommendation 1110 from right to left correspond to cycles in time order. Each bit of the multi-bit value is a recommendation of "inactive" ("1") or "active" ("0") for a corresponding one of V (e.g., eight) cycles.

The distribute circuit 1124 decodes the throttle recommendation 1110 and stores the throttle recommendation 1110 in decoded form in an appropriate one of the throttle recommendation registers 1112(1)-1112(X), according to a rotating sequence, as discussed above. A sequence of storing the throttle recommendations 1110 in the throttle recommendation registers 1112(1)-1112(X) is explained further in an example illustrated in FIGS. 13A-13C. In the example illustrated in FIGS. 13A-13C, at least one throttle request 1102 is received from one or more of the state detection circuits 1104 in every cycle.

Throttle recommendation registers 1300(1)-1300(8) are an example of the throttle recommendation registers 1112 consistent with the example in FIG. 11, in which the throttle request 1102 has a range of V=8 possible throttle values, which leads to the throttle recommendations 1110 having eight possible values, which further leads to the throttle recommendation registers 1300(1)-1300(8) each having storage for the eight bits of the throttle recommendations 1110 in decoded form. As explained below, the number (8) of throttle recommendation registers 1300(1)-1300(8) in this example is equal to the number of bits in the throttle recommendation registers 1112(1)-1112(X). The throttle recommendation aggregation circuit 1306 is an example of the throttle recommendation aggregation circuit 1114 of FIG. 11.

Figure 13A:
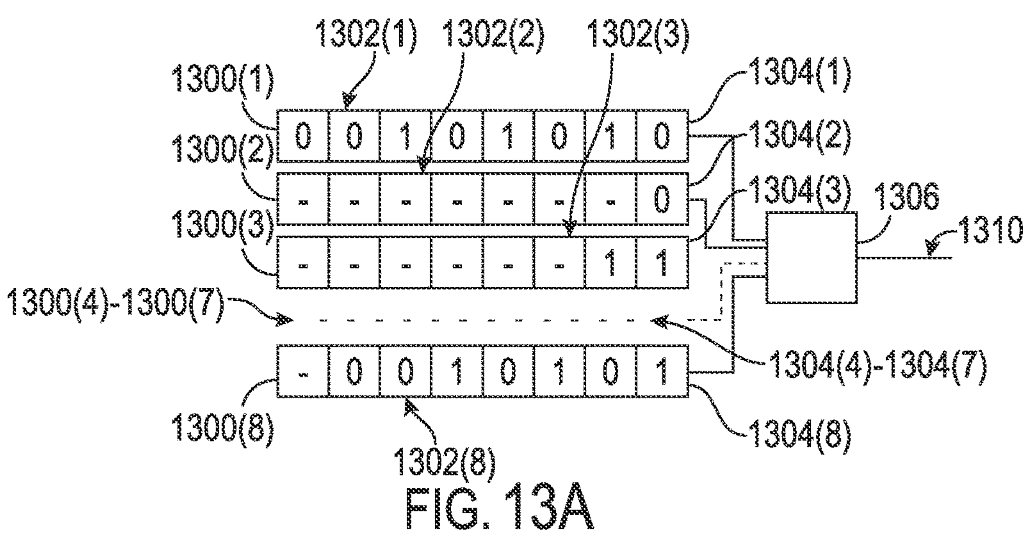
FIGS. 13A-13C are logic diagrams illustrating data movement in a three-cycle sequence in the throttle recommendation registers for generating the throttle control signal in the throttle recommendation aggregation circuit in FIG. 11.
Figure 13B:
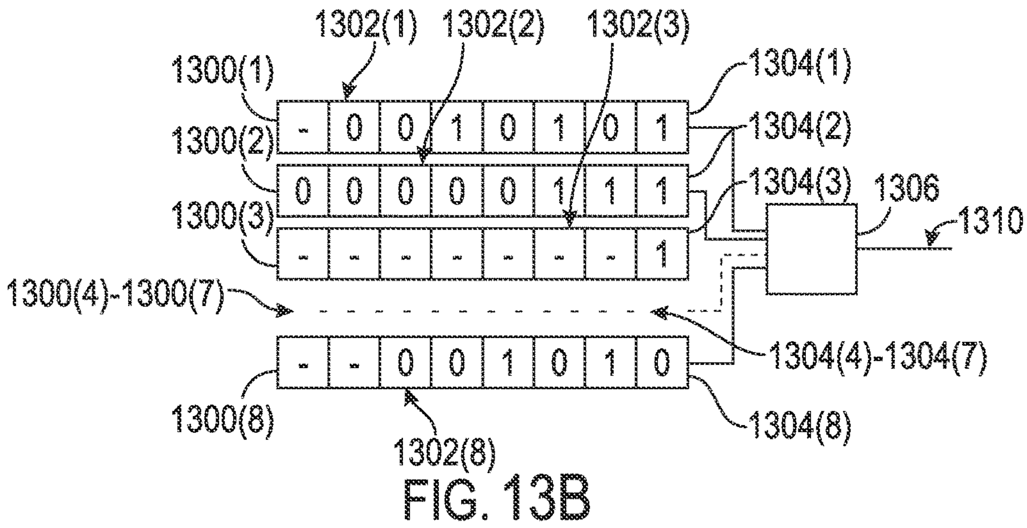
Figure 13C:
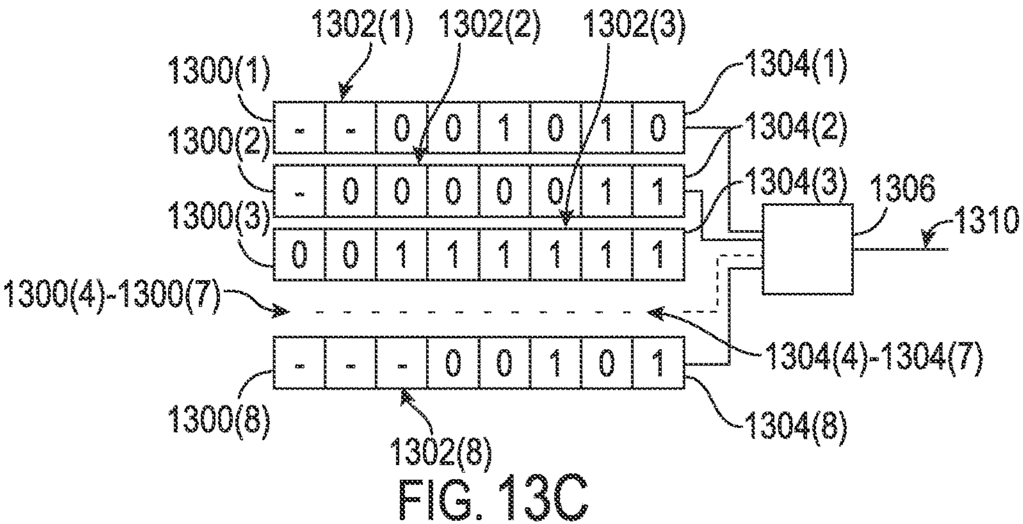

FIGS. 13A-13C illustrate the contents of the throttle recommendation registers 1300(1)-1300(X) in consecutive cycles of the clock signal CLK in an example in which X=8. In this explanation, the term "throttle recommendation register" may be abbreviated as "TR register" for simplicity. Each of the TR registers 1300(1)-1300(8) operate as shift registers in this example, wherein each bit of the 8-bit throttle recommendations 1302(1)-1302(8) are shifted in a first direction (e.g., to the right) by one bit position in each cycle of the clock signal CLK. The throttle recommendations 1302(1)-1302(8) are the throttle recommendations 1126(1)-1126(8) in FIG. 11. The right-hand bits 1304(1)-1304(8), respectively, of the TR registers 1300(1)-1300(8) are provided to the throttle recommendation aggregation circuit 1306, which corresponds to the throttle recommendation aggregation circuit 1114. The throttle recommendation aggregation circuit 1306 generates a throttle result 1310 corresponding to the throttle result 1116 in FIG. 1. In this example, the throttle result 1310 is based on the right-hand bits 1304(1)-1304(8) from each of the throttle recommendation registers 1300(1)-1300(8). In some examples, the throttle recommendation aggregation circuit 1114 is implemented as a logical OR circuit that will output a "1" if any one of the right-hand bits 1304(1)-1304(8) is a "1".

In each cycle, the right-hand bits 1304(1)-1304(8) are shifted out and discarded. Also, in each cycle of the clock signal CLK, the distribute circuit 1124 provides a recently generated one of the throttle recommendations 1302(1)-1302(8) in decoded form into an appropriate one of the TR registers 1300(1)-1300(8) as the other (7) registers (i.e., those containing at least two bits) shift their stored throttle recommendations 1302(1)-1302(8) to the right. Thus, in any given cycle of the clock signal CLK, the TR registers 1300(1)-1300(8) will have 8, 7, 6, 5, 4, 3, 2, and 1 remaining bits, respectively but not necessarily in that order, of throttle recommendations 1302(1)-1302(8).

FIG. 13A shows a state of the TR registers 1300(1)-1300(3) and 1300(8) among the TR registers 1300(1)-1300(8) in a first cycle. A throttle recommendation 1302(1) in decoded form was stored in the TR register 1300(1) in a most recent cycle of the clock signal CLK. In contrast, the TR register 1300(2) contains only one remaining bit, which will be shifted out in the next cycle. Given that one bit is shifted out in each cycle, FIG. 13A indicates that the throttle recommendation 1302(2) was initially stored into the TR register

1300(2) seven (7) cycles ago and TR register 1300(2) will be available for storing the throttle recommendation 1302(2) in the next cycle. The TR registers 1300(3)-1300(8) have increasing numbers of remaining bits in the order of when throttle recommendations 1302(3)-1302(8) were stored.

FIG. 13B illustrates a state of the TR registers 1300(1)-1300(8) in a second cycle of the clock signal CLK immediately following the first cycle illustrated in FIG. 13A. As shown, the throttle recommendations 1302(1)-1302(8) stored in the TR registers 1300(1)-1300(8) have been shifted one bit position to the right except for TR register 1300(2), into which the throttle recommendation 1302(2), which was received from the distribute circuit 1124 in the previous cycle, was stored. TR register 1300(3) is storing only 1 remaining bit of the throttle recommendation 1302(3) and is available for storing the next throttle recommendation 1302(3).

FIG. 13C illustrates a state of the TR registers 1300(1)-1300(8) in a third cycle immediately following the second cycle illustrated in FIG. 13B. The throttle recommendations 1302(1)-1302(8) stored in each of the TR registers 1300(1)-1300(8) have been shifted again by one bit position to the right except for TR register 1300(3), which is storing the throttle recommendation 1302(3) generated during the cycle illustrated in FIG. 13B.

The throttle recommendation aggregation circuit 1306 generates a throttle result 1310 based on the right-hand bits 1304(1)-1304(8) of the TR registers 1300(1)-1300(8). Thus, in each of FIGS. 13A-13C, the throttle recommendation aggregation circuit 1306 would generate the throttle result 1310 as a "1" based on an "OR" of the right-hand bits 1304(1)-1304(8) having at least one "1" in each of the cycles of the clock signal CLK illustrated in FIGS. 13A-13C. In this regard, each of the throttle recommendations 1302(1)-1302(8) may affect the throttle result 1310 for up to eight cycles of the clock signal CLK. However, for example, the states measured in the LAM circuit may change significantly (e.g., improve) in less time than eight cycles, such that a reduction in performance requested many cycles ago is no longer necessary and would unnecessarily decrease performance.

In this regard, returning to FIG. 11, the throttle management circuit 1100 may provide the throttle recommendation 1110 from either the throttle request merge circuit 1108 or the distribute circuit 1124 to the throttle control circuit 1118. The throttle control circuit 1118 may employ an algorithm, a state machine, or other circuits to identify situations in which the control signal 1106 is determined by the throttle recommendation 1110 generated in a current cycle rather than by the throttle result 1116. That is, the throttle result 1116 may be determined by one of the throttle recommendation 1126(1)-1126(8) generated eight cycles ago, but the most recently generated throttle recommendation 1110 is a better indication of the current dynamic conditions. Thus, the throttle control circuit 1118 can determine whether to override the throttle result 1116 and generate the throttle control signal 1106 based on the throttle recommendation 1110. Such determination may be based on changes to the throttle recommendation 1110 from a previous one or two cycles to a current cycle.

For example, in response to a situation in which the throttle recommendation 1110 transitions from a highest value (e.g., 7/8 in the example above) in a first cycle to a lowest value (e.g., 0/8) in a second cycle immediately after the first cycle, the throttle control circuit 1118 may generate the throttle control signal 1106 based on the lowest value in the second cycle rather than on the throttle result 1116 because throttling (e.g., reducing) the activity of the monitored processing devices 110 appears to be no longer necessary. Alternatively, in response to a transition of the throttle recommendation 1110 from the highest (e.g., 7/8) or the second-highest (e.g., 6/8) value in the range in a first cycle to the lowest (e.g., 0/8) or second-lowest (e.g., 1/8) value in the next cycle, the throttle control circuit 1118 may generate the throttle control signal 1106 based on the throttle recommendation 1110 in the next cycle.

As another alternative, to avoid responding too quickly to a lower throttle request, it may be preferable to ensure that the throttle recommendation 1110 stays low for at least two cycles. Thus, in response to a transition of the throttle recommendation 1110 from the highest value (e.g., 7/8) in a first cycle of the clock signal CLK, to the lowest value (e.g., 0/8) in a second cycle (e.g., immediately following the first cycle), and remaining at the lowest value in a third cycle (e.g., immediately following the second cycle), the throttle control circuit 1118 may generate the throttle control signal 1106 based on the throttle recommendation 1110 in the third cycle, which is the lowest value.

In response to the throttle control signal 1106 having an active state indication, such as a binary "0", in a first cycle, the monitored processing devices 110 may be in an active state in the next cycle of the clock signal CLK or there may be an additional cycle of delay. In response to the throttle control signal 1106 having an inactive state indication, such as a binary "1", in a first cycle, the processing circuits 110 would be in an inactive state in the next cycle (or later) of the clock signal CLK. As an example, the throttle control signal 1106 may be an input to a clock gating circuit (not shown) for gating the clock signal CLK or another clock signal provided to the monitored processing devices 110 of the LAM circuit 136.

Figure 14:
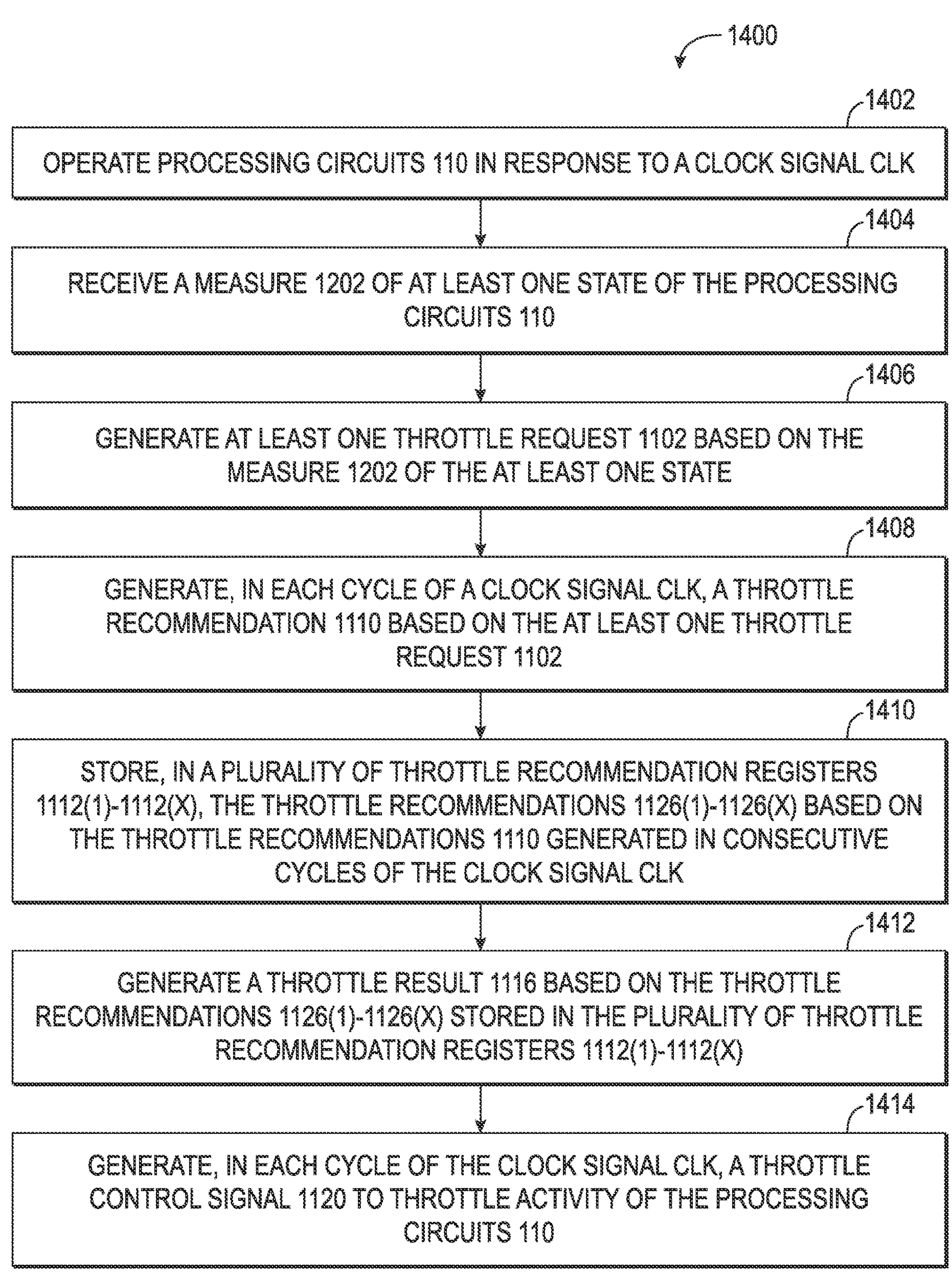
FIG. 14 is a flowchart illustrating an exemplary process for receiving throttle request(s) based on a measured state of processing circuits and generating a throttle control signal to throttle processing activity in the processing circuits to dynamically respond to detected states of the processor-based system, including but not limited to the throttle management circuit in FIGS. 11 and 13A-13C.

FIG. 14 is a flow chart illustrating a method 1400 of throttling activity in the processor-based system 100, including operating processing circuits 110 in response to a clock signal CLK (block 1402) and receiving a measure 1202 of at least one state of the processing circuits 110 (block 1404). The method includes generating at least one throttle request 1102 based on the measure 1202 of the at least one state (block 1406) and generating, in each cycle of a clock signal CLK, a throttle recommendation 1110 based on the at least one throttle request 1102 (block 1408). The method further includes storing, in a plurality of throttle recommendation registers 1112(1)-1112(X), the throttle recommendations 1126(1)-1126(X) based on the throttle recommendation 1110 generated in consecutive cycles of the clock signal CLK (block 1410) and generating a throttle result 1116 based on the throttle recommendations 1126(1)-1126(X) stored in the plurality of throttle recommendation registers 1112(1)-1112(X) (block 1412). The method also includes generating, in each cycle of the clock signal CLK, a throttle control signal 1106 to throttle activity of the processing circuits 110 (block 1414).

A throttle management circuit that can be configured in an IC chip for an integrated processor-based system that is configured to monitor states of local processing circuits to receive at least one throttle request from at least one state detection circuit and generate, in each cycle of a clock signal to the local processing circuits, a throttle recommendation, including but not limited to the throttle management circuit and components and methods thereof illustrated in FIGS. 11-14, and according to any aspects disclosed herein, may be provided in or integrated into any processor-based device. Examples, without limitation, include a set-top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, laptop computer, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, an avionics system, a drone, and a multicopter.

Figure 15:
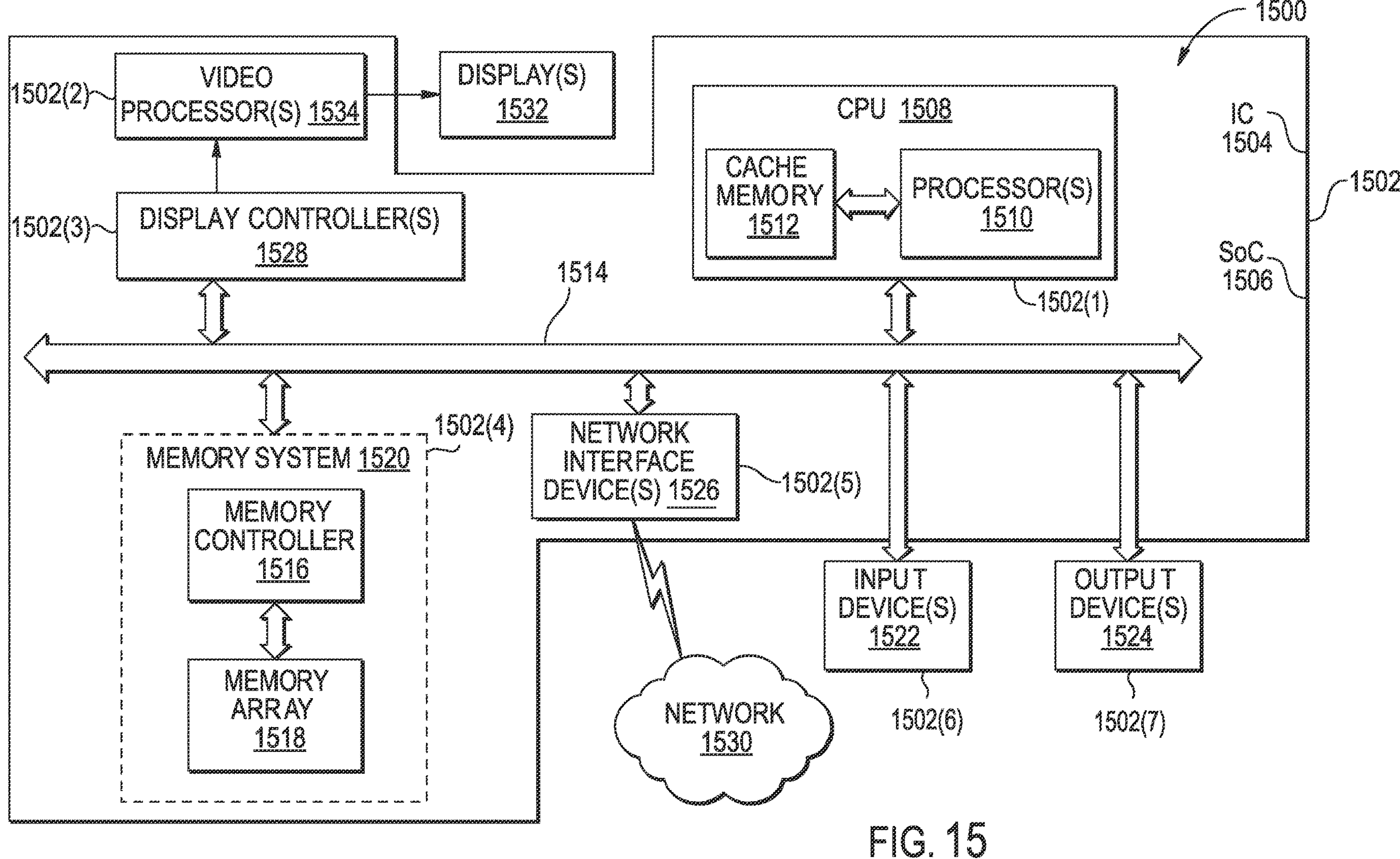
FIG. 15 is a block diagram of another exemplary processor-based system that includes the throttle management circuit configured to receive throttle request(s) based on a measured state of processing circuits and generate a throttle control signal to throttle processing activity in the processing circuits to dynamically respond to detected states of the processor-based system, including but not limited to the throttle management circuit in FIGS. 11 and 13A-13C.

FIG. 15 is a block diagram of another exemplary processor-based system that includes a throttle management circuit that is configured to monitor states of local processing circuits to receive at least one throttle request from at least one state detection circuit and generate, in each cycle of a clock signal to the local processing circuits, a throttle recommendation.

In this example, the processor-based system 1500 may be formed in an IC chip 1502 and as a system-on-a-chip (SoC) 1504. The processor-based system 1500 includes a central processing unit (CPU)(s) 1506 that includes one or more processors 1508, which may also be referred to as CPU cores or processor cores. The CPU 1506 may have cache memory 1510 coupled to the CPU 1506 for rapid access to temporarily stored data. The CPU 1506 is coupled to a system bus 1512 and can intercouple master and slave devices included in the processor-based system 1500. As is well known, the CPU 1506 communicates with these other devices by exchanging address, control, and data information over the system bus 1512. For example, the CPU 1506 can communicate bus transaction requests to a memory controller 1514, as an example of a slave device. Although not illustrated in FIG. 15, multiple system buses 1512 could be provided, wherein each system bus 1512 constitutes a different fabric.

Other master and slave devices can be connected to the system bus 1512. As illustrated in FIG. 15, these devices can include a memory system 1516 that includes the memory controller 1514 and a memory array(s) 1518, one or more input devices 1520, one or more output devices 1522, one or more network interface devices 1524, and one or more display controllers 1526, as examples. The input device(s) 1520 can include any type of input device, including, but not limited to, input keys, switches, voice processors, etc. The output device(s) 1522 can include any type of output device, including, but not limited to, audio, video, other visual indicators, etc. The network interface device(s) 1524 can be any device configured to allow exchange of data to and from a network 1528. The network 1528 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 1524 can be configured to support any type of communications protocol desired.

The CPU 1506 may also be configured to access the display controller(s) 126 over the system bus 1512 to control information sent to one or more displays 1530. The display controller(s) 1526 sends information to the display(s) 1530 to be displayed via one or more video processor(s) 1532, which processes the information to be displayed into a format suitable for the display(s) 1530. The display(s) 1530 can include any type of display, including, but not limited to, a cathode ray tube (CRT), a liquid crystal display (LCD), a plasma display, a light emitting diode (LED) display, etc.

The IC chip 1502 also includes a throttle management circuit 1534 that includes a state detection circuit 1536 as part of a processor-based system 1538. The throttle management circuit 1536 can be the throttle management circuit 1100 in FIGS. 11-13C as examples. The processor-based system 1538 can include one or more LAM circuits 1540 (1)-1140(6) that are associated with one or more of the processors 1508, the cache memory 1510, the memory controller 1514, the network interface device(s) 1524, the display controller 1526, and/or the system bus 1512 that are configured to monitor activity associated with these processing devices and reporting activity power events regarding activity of these devices within the hierarchical power management system 1538. The LAM circuits 1540(1)-1140 (6) may be the LAM circuits 136, 136R in the hierarchical power management systems 124, 624, 724 in FIGS. 1-3, 5-7, and 10A as examples.

Figure 16:
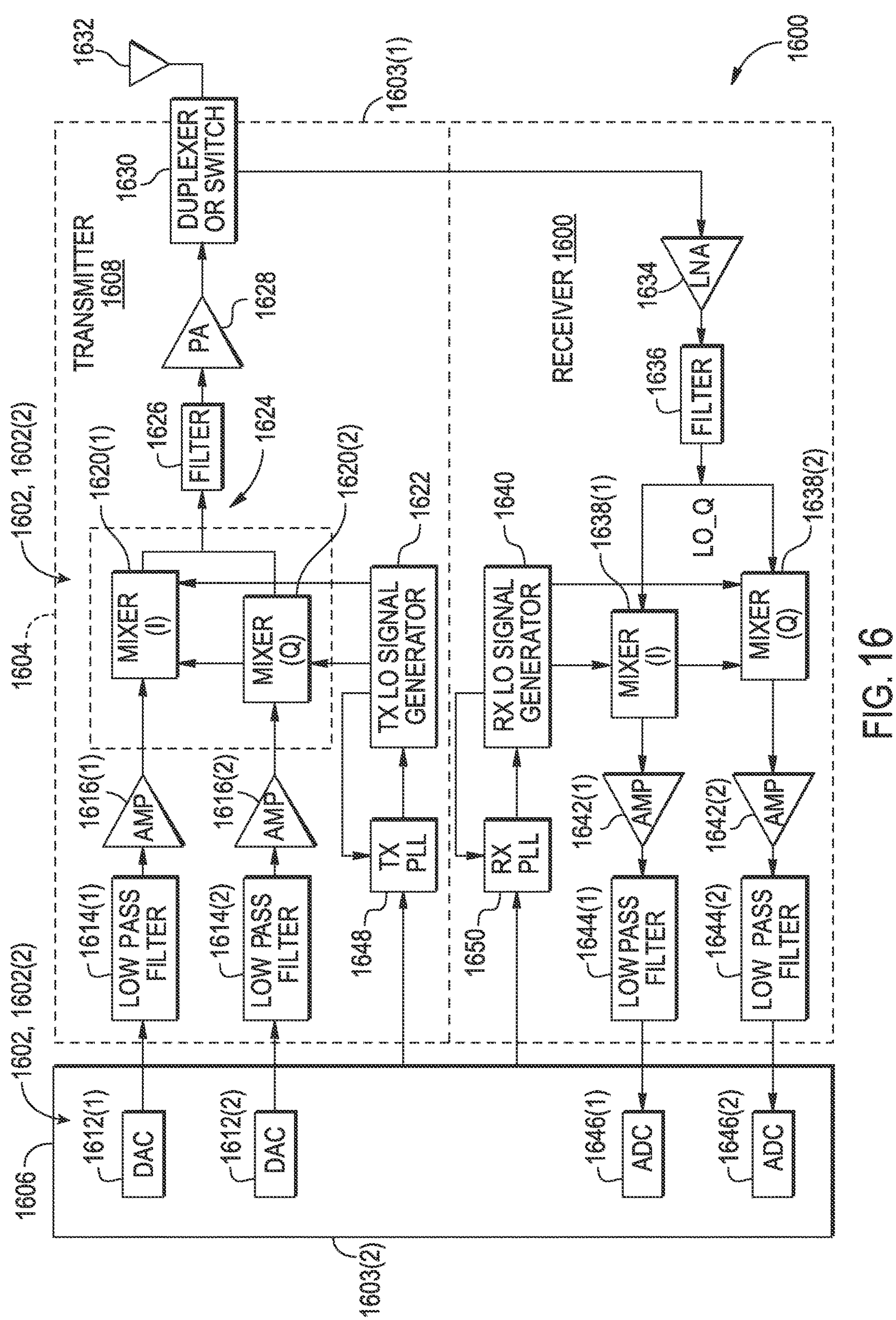
FIG. 16 is a block diagram of an exemplary wireless communication device that includes radio-frequency (RF) components that can include the throttle management circuit configured to receive throttle request(s) based on a measured state of processing circuits and generate a throttle control signal to throttle processing activity in the processing circuits to dynamically respond to detected states of the processor-based system, including but not limited to the throttle management circuit in FIGS. 11 and 13A-13C.

FIG. 16 illustrates an exemplary wireless communications device 1600 that can include processor-based system 1602 that including a throttle management circuit configured to detect or receive measures of states of local processing circuits and throttle their power consumption to dynamically respond to detected states of the processor-based system, including the throttle management circuit 1100 in FIGS. 11-13C.

As shown in FIG. 16, the wireless communications device 1600 includes a RF transceiver 1604 and a data processor 1606. The RF transceiver 1604 and/or the data processor 1606 can include respective hierarchical power management systems 1602(1), 1602(2) configured to locally monitor activity of devices in the processor-based system to locally estimate and throttle its power consumption and report activity power events regarding estimated power consumption to a centralized PEL circuit configured to collect activity power events regarding power consumption of the monitored processing devices and throttle power in the IC chip in response, including but not limited to the hierarchical power management systems 164, 624, 724 and their exemplary components in FIGS. 1-3, 5-7, and 9A-10.

The components of the RF transceiver 1604 and/or data processor 1606 can be split among multiple different die 1603(1), 1603(2). The data processor 1606 may include a memory to store data and program codes. The RF transceiver 1604 includes a transmitter 1608 and a receiver 1610 that support bi-directional communications. In general, the wireless communications device 1600 may include any number of transmitters 1608 and/or receivers 1610 for any number of communication systems and frequency bands. All or a portion of the RF transceiver 1604 may be implemented on one or more analog ICs, RF ICs, mixed-signal ICs, etc.

The transmitter 1608 or the receiver 1610 may be implemented with a super-heterodyne architecture or a direct-conversion architecture. In the super-heterodyne architecture, a signal is frequency-converted between RF and baseband in multiple stages, e.g., from RF to an intermediate frequency (IF) in one stage, and then from IF to baseband in another stage for the receiver 1610. In the direct-conversion architecture, a signal is frequency-converted between RF and baseband in one stage. The super-heterodyne and direct-conversion architectures may use different circuit blocks and/or have different requirements. In the wireless communications device 1600 in FIG. 16, the transmitter 1608 and the receiver 1610 are implemented with the direct-conversion architecture.

In the transmit path, the data processor 1606 processes data to be transmitted and provides I and Q analog output signals to the transmitter 1608. In the exemplary wireless communications device 1600, the data processor 1606 includes digital-to-analog converters (DACs) 1612(1), 1612(2) for converting digital signals generated by the data processor 1606 into the I and Q analog output signals, e.g., I and Q output currents, for further processing.

Within the transmitter 1608, lowpass filters 1614(1), 1614(2) filter the I and Q analog output signals, respectively, to remove undesired signals caused by the prior digital-to-analog conversion. Amplifiers (AMPs) 1616(1), 1616(2) amplify the signals from the lowpass filters 1614(1), 1614(2), respectively, and provide I and Q baseband signals. An upconverter 1618 upconverts the I and Q baseband signals with I and Q transmit (TX) local oscillator (LO) signals through mixers 1620(1), 1620(2) from a TX LO signal generator 1622 to provide an upconverted signal 1624. A filter 1626 filters the upconverted signal 1624 to remove undesired signals caused by the frequency upconversion as well as noise in a receive frequency band. A power amplifier (PA) 1628 amplifies the upconverted signal 1624 from the filter 1626 to obtain the desired output power level and provides a transmit RF signal. The transmit RF signal is routed through a duplexer or switch 1630 and transmitted via an antenna 1632.

In the receive path, the antenna 1632 receives signals transmitted by base stations and provides a received RF signal, which is routed through the duplexer or switch 1630 and provided to a low noise amplifier (LNA) 1634. The duplexer or switch 1630 is designed to operate with a specific receive (RX)-to-TX duplexer frequency separation, such that RX signals are isolated from TX signals. The received RF signal is amplified by the LNA 1634 and filtered by a filter 1636 to obtain a desired RF input signal. Downconversion mixers 1638(1), 1638(2) mix the output of the filter 1636 with I and Q RX LO signals (i.e., LO_I and LO_Q) from an RX LO signal generator 1640 to generate I and Q baseband signals. The I and Q baseband signals are amplified by AMPs 1642(1), 1642(2) and further filtered by lowpass filters 1644(1), 1644(2) to obtain I and Q analog input signals, which are provided to the data processor 1606. In this example, the data processor 1606 includes analog-to-digital converters (ADCs) 1646(1), 1646(2) for converting the analog input signals into digital signals to be further processed by the data processor 1606.

In the wireless communications device 1600 of FIG. 16, the TX LO signal generator 1622 generates the I and Q TX LO signals used for frequency upconversion, while the RX LO signal generator 1640 generates the I and Q RX LO signals used for frequency downconversion. Each LO signal is a periodic signal with a particular fundamental frequency. A TX phase-locked loop (PLL) circuit 1648 receives timing information from the data processor 1606 and generates a control signal used to adjust the frequency and/or phase of the TX LO signals from the TX LO signal generator 1622. Similarly, an RX PLL circuit 1650 receives timing information from the data processor 1606 and generates a control signal used to adjust the frequency and/or phase of the RX LO signals from the RX LO signal generator 1640.

Those of skill in the art will further appreciate that the various illustrative logical blocks, modules, circuits, and algorithms described in connection with the aspects disclosed herein may be implemented as electronic hardware, instructions stored in memory or in another computer-readable medium wherein any such instructions are executed by a processor or other processing device, or combinations of both. The devices and components described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

Implementation examples are described in the following numbered clauses:

1. An integrated circuit (IC) chip comprising a processor-based system, the processor-based system comprising:
   processing circuits operating in response to a clock signal;
   at least one state detection circuit configured to generate at least one throttle request based on one or more measures of at least one state of the processing circuits; and
   a throttle management circuit, comprising:
      a throttle request merge circuit configured to receive the at least one throttle request from the at least one state detection circuit and generate, in each cycle of the clock signal, a throttle recommendation based on the at least one throttle request;
      a plurality of throttle recommendation registers, each configured to, in a sequence:
         receive the throttle recommendation generated in the throttle request merge circuit in a first cycle of the clock signal; and
         store the throttle recommendation received for a first plurality of consecutive cycles of the clock signal after the first cycle;
      a throttle recommendation aggregation circuit configured to generate a throttle result based on the throttle recommendations stored in the plurality of throttle recommendation registers; and
      a throttle control circuit configured to receive the throttle result and generate, in each cycle of the clock signal, a throttle control signal to selectively throttle activity of the processing circuits.
2. The IC chip of clause 1, wherein the throttle request generated in each of the at least one state detection circuit comprises a throttle value having one of a first number of throttle values in a throttle value range including more than two throttle values.
3. The IC chip of clause 1 or clause 2, wherein the throttle request comprises a request to limit the activity of the processing circuits in a second number of cycles among a first number of cycles of the clock signal.
4. The IC chip of any of clause 1 to clause 3, further comprising a throttle value range configuration circuit configured to determine the first number of throttle values in the throttle value range of the throttle request generated in each of the at least one state detection circuit.
5. The IC chip of any of clause 1 to clause 4, wherein the throttle request merge circuit is configured to:
   receive a first throttle request from a first one of the at least one state detection circuit in each cycle of the clock signal; and
   receive a second throttle request from a second one of the at least one state detection circuit less often than each cycle of the clock signal.
6. The IC chip of any of clause 1 to clause 5, wherein the throttle request merge circuit is further configured to:
   in each cycle in which the second throttle request is not received from the second one of the at least one state detection circuit, generate the throttle recommendation based on a last throttle request received from the second one of the at least one state detection circuit.
7. The IC chip of any of clause 1 to clause 6, wherein the throttle request merge circuit is further configured to:
   in a second cycle in which the throttle request is not received from the second one of the at least one state detection circuit, generate the throttle recommendation based only on the throttle requests received in the second cycle from the at least one state detection circuit, including the first throttle request.
8. The IC chip of any of clause 1 to clause 7, wherein each of the plurality of throttle recommendation registers is configured to store the throttle recommendation as a multi-bit value, wherein each bit of the multi-bit value corresponds to a cycle of the clock signal.
9. The IC chip of clause 8, wherein each of the plurality of throttle recommendation registers comprises a shift register further configured to shift the multi-bit value in a first direction by one bit in each cycle of the clock signal.
10. The IC chip of any of clause 1 to clause 9, wherein the throttle management circuit is further configured to, in each cycle of the clock signal, store the generated throttle recommendation in one of the plurality of throttle recommendation registers, storing only one remaining bit of a shifted multi-bit value of a stored throttle recommendation.
11. The IC chip of any of clause 1 to clause 10, wherein a first number of the plurality of the throttle recommendation registers is equal to a second number of bits in each of the plurality of throttle recommendation registers.
12. The IC chip of any of clause 8 to clause 11, wherein the throttle recommendation aggregation circuit is further configured to generate the throttle result based on one bit of the multi-bit values stored in each of the plurality of throttle recommendation registers.
13. The IC chip of clause 12, the throttle recommendation aggregation circuit further configured to generate the throttle result based on a logical OR of the one bit of the multi-bit values stored in each of the plurality of throttle recommendation registers.

14. The IC chip of any of clause 1 to clause 13, wherein the throttle control circuit is further configured to generate the throttle control signal from the throttle result.
15. The IC chip of any of clause 1 to clause 14, wherein the throttle control circuit is further configured to, in each cycle of the clock signal:
   receive the throttle recommendation generated in the throttle request merge circuit; and
   generate the throttle control signal based on either the throttle result or the throttle recommendations received in a plurality of previous cycles of the clock signal.
16. The IC chip of any of clause 8 to clause 15, wherein:
   the multi-bit value of the throttle recommendation is in a range from a highest value configured to reduce the activity of the processing circuits for a highest number of cycles to a lowest value configured to reduce the activity of the processing circuits for a lowest number of cycles; and
   the throttle control circuit is further configured to, in response to a transition of the throttle recommendation from the highest value in a first cycle of the clock signal to the lowest value in a next cycle of the clock signal, generate the throttle control signal based on the lowest value in the next cycle.
17. The IC chip of any of clause 8 to clause 16, wherein:
   the multi-bit value of the throttle recommendation is in a range from a highest value configured to reduce the activity of the processing circuits for a highest number of cycles to a lowest value configured to reduce the activity of the processing circuits for a lowest number of cycles; and
   the throttle control circuit is further configured to, in response to a transition of the throttle recommendation from one of the highest value and a second-highest value in the first cycle of the clock signal to one of the lowest value and a second-lowest value in the next cycle of the clock signal, generate the throttle control signal based on the throttle recommendation in the next cycle.
18. The IC chip of any of clause 8 to clause 17, wherein:
   the multi-bit value of the throttle recommendation is in a range from a highest value configured to reduce the activity of the processing circuits for a highest number of cycles to a lowest value configured to reduce the activity of the processing circuits for a lowest number of cycles; and
   the throttle control circuit is further configured to, in response to a transition of the throttle recommendation from the highest value in a first cycle of the clock signal to the lowest value in a second cycle of the clock signal and the lowest value in a third cycle of the clock signal, generate the throttle control signal based on the throttle recommendation in the third cycle.
19. The IC chip of any of clause 1 to clause 18, wherein:
   the throttle control signal has one of an active state indication and an inactive state indication;
   in response to the throttle control signal having the active state indication in a second cycle, the processing circuits are active in a third cycle following the second cycle; and
   in response to the throttle control signal having the inactive state indication in a third cycle, the processing circuits are inactive in a fourth cycle following the third cycle.
20. The IC chip of any of clause 1 to clause 19, the at least one state detection circuit comprising a plurality of entries, wherein the at least one state detection circuit is further configured to, in each cycle of a first plurality of cycles:
   receive the measure of the state;
   store the measure of the state in a first entry of a first plurality of entries of a shift register;
   shift the measure of the state stored in each of the first plurality of entries in a first direction from the first entry toward a last entry;
   generate a first sum of the measure of the state received and the stored measure of the state in all entries of the shift register except the last entry;
   generate a second sum of the stored measure of the state in all entries of the shift register;
   compare the first sum and the second sum; and
   generate the throttle request based on a difference between the first sum and the second sum.
21. The IC chip of any of clause 1 to clause 20, wherein the measure of the state comprises a measure of electrical current provided to the processing circuits.
22. The IC chip of any of clause 20 to clause 21, wherein the first number of consecutive cycles of the clock signal, in which the measure of the state is stored, is configurable.
23. The IC chip of any of clause 20 to clause 22, wherein the measure of the state comprises a measure of one of a voltage, a peak power, a peak current, an average voltage, an average current, a temperature, and an activity measured using an activity measurement algorithm.
24. The IC chip of any of clause 20 to clause 23 integrated into a device selected from the group consisting of: a set-top box; an entertainment unit; a navigation device; a communications device; a fixed location data unit; a mobile location data unit; a global positioning system (GPS) device; a mobile phone; a cellular phone; a smartphone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.
25. A method of throttling activity in processing circuits in a processor-based system, comprising:
   operating processing circuits in response to a clock signal;
   generating, in at least one state detection circuit, at least one throttle request based on one or more measures of at least one state of the processing circuits;
   generating, in each cycle of the clock signal for a first plurality of consecutive cycles of the clock signal, a throttle recommendation based on the at least one throttle request;
   storing, in a plurality of throttle recommendation registers, the throttle recommendations generated in the first plurality of consecutive cycles of the clock signal;
   generating a throttle result based on the throttle recommendations stored in the plurality of throttle recommendation registers; and generating, in each cycle of the clock signal, a throttle control signal to throttle activity of the processing circuits based on the throttle control signal.

26. The method of clause 25, wherein generating the throttle request comprises generating a throttle value among a range including more than two throttle values.

27. The method of clause 25 or clause 26, wherein generating the throttle request comprises generating a request to reduce the activity of the processing circuits for a first plurality of cycles among a second plurality of cycles of the clock signal.

28. The method of any of clause 25 to clause 27, further comprising determining, based on a throttle value range configuration circuit, a number of possible throttle values of the throttle request generated in each of at least one state detection circuit.

29. The method of any of clause 25 to clause 28, further comprising:

generating, in a first one of the at least one state detection circuit, a first throttle request in each cycle of the clock signal; and generating, in a second one of the at least one state detection circuit, a second throttle request less often than each cycle of the clock signal.

30. The method of clause 29, further comprising:

in each cycle in which the second throttle request from the second one of the at least one state detection circuit is not received, generating the throttle recommendation based on a received last second throttle request from the second one of the at least one state detection circuit.

31. The method of clause 29 or clause 30, further comprising:

in each cycle in which the throttle request is not received from the second one of the at least one state detection circuit, generating the throttle recommendation based on the throttle requests received from the at least one state detection circuit, including the first throttle request.

32. The method of any of clause 25 to clause 31, further comprising:

storing the throttle recommendation as a multi-bit value in each of the plurality of throttle recommendation registers, wherein each bit of the multi-bit value corresponds to a cycle of the clock signal.

33. The method of clause 32, further comprising shifting the multi-bit value in each of the plurality of throttle recommendation registers in a first direction by one bit in each cycle of the clock signal.

34. The method of clause 33, further comprising, in each cycle of the clock signal, storing the generated throttle recommendation in one of the plurality of throttle recommendation registers having only one remaining bit of a shifted multi-bit value of a stored throttle recommendation.

35. The method of any of clause 32 to clause 34, further comprising generating the throttle result based on one bit of the multi-bit values stored in each of the plurality of throttle recommendation registers.

36. The IC chip of clause 35, further comprising generating the throttle result based on a logical OR of the one bit of the multi-bit values stored in each of the plurality of throttle recommendation registers.

37. The method of any of clause 25 to clause 36, further comprising generating the throttle control signal from the throttle result.

38. The method of any of clause 25 to clause 37, further comprising, in each cycle of the clock signal:

receiving the throttle recommendation generated in the throttle request merge circuit; and generating the throttle control signal based on the throttle result and on throttle recommendations received in a plurality of cycles of the clock signal.

39. The method of any of clause 32 to clause 36, wherein the multi-bit value of the throttle recommendation is in a range from a highest value corresponding to reducing the activity of the processing circuits for a highest number of cycles to a lowest value corresponding to reducing the activity of the processing circuits for a lowest number of cycles, the method further comprising:

in response to a transition of the throttle recommendation from the highest value in a first cycle of the clock signal to the lowest value in a next cycle of the clock signal, generating the throttle control signal based on the lowest value.

40. The method of clause 39, further comprising:

in response to a transition of the throttle recommendation from one of the highest value and a second-highest value in the first cycle of the clock signal to one of the lowest value and a second-lowest value in the next cycle of the clock signal, generating the throttle control signal based on the throttle recommendation.

41. The method of clause 39, further comprising:

in response to a transition of the throttle recommendation from the highest value in a first cycle of the clock signal to the lowest value in the next cycle of the clock signal and the lowest value in a current cycle of the clock signal, generating the throttle control signal based on the lowest value.

42. The IC chip of any of clause 25 to clause 41, wherein the throttle control signal has one of an active state indication and an inactive state indication, the method further comprising:

in response to the throttle control signal having the active state indication in a second cycle, activating the processing circuits in the second cycle; and in response to the throttle control signal having the inactive state indication in a third cycle, deactivating the processing circuits in the third cycle.

43. The method of any of clause 25 to clause 42, wherein, measuring the state of the processor-based system in each cycle of the clock signal, further comprises:

measuring a state that depends on activity of the processing circuits;

storing the measure of the state received in each of a first number (X) of consecutive cycles of the clock signal;

generating a first sum of the measure of the state in a current cycle and the measure of the state stored in a previous second number (X−1) of the consecutive cycles of the clock signal;

generating a second sum of the measure of the state stored in the first number (X) of consecutive cycles of the clock signal;

comparing the first sum and the second sum; and generating the throttle request based on a difference between the first sum and the second sum.

44. The method of any of clause 25 to clause 42, wherein measuring the state comprises measuring current provided to the processing circuits.

45. The method of any of clause 25 to clause 44, wherein measuring the state comprises measuring one of a voltage, a peak power, a peak current, an average voltage, an average current, a temperature, and an activity measured using an activity measurement algorithm.

46. An apparatus comprising means configured for executing the method of anyone of clauses 25 to 45.

47. A computer program comprising instructions to cause an integrated circuit (IC) chip to execute the steps of the method of anyone of clauses 25 to 45.

What is claimed is:

1. An integrated circuit (IC) chip comprising a processor-based system, the processor-based system comprising:

processing circuits configured to operate in response to a clock signal and a throttle control signal; and a throttle management circuit configured to:

receive at least one throttle request indicating a change of a state of the processing circuits;

generate a throttle recommendation based on the at least one throttle request;

store the throttle recommendation in one of a plurality of throttle recommendation registers; and in each cycle of the clock signal:

generate a throttle result based on throttle recommendations, comprising the throttle recommendation, stored in the plurality of throttle recommendation registers; and generate the throttle control signal to selectively throttle operation of the processing circuits based on the throttle result.

2. The IC chip of claim 1, the throttle management circuit further configured to:

in response to receiving a first throttle request in a first cycle of the clock signal, store the first throttle request as a stored first throttle request and generate the throttle recommendation based on the first throttle request; and in response to not receiving the first throttle request in the first cycle of the clock signal, generate the throttle recommendation based on the stored first throttle request.

3. The IC chip of claim 1, wherein each of the at least one throttle request comprises a first throttle value indicating a plurality of cycles of the clock signal to suspend operation in the processing circuits.

4. The IC chip of claim 3, the throttle management circuit further configured to:

generate the throttle recommendation comprising a second throttle value based on the at least one throttle request;

decode the second throttle value to generate a decoded throttle recommendation comprising a second number of bits; and store the decoded throttle recommendation in one of the plurality of throttle recommendation registers;

wherein the plurality of throttle recommendation registers comprises a first number of throttle recommendation registers each comprising at least the second number of bits.

5. The IC chip of claim 4, wherein the first number of throttle recommendation registers is equal to the second number of bits in the decoded throttle recommendation.

6. The IC chip of claim 4, wherein:

decoding the second throttle value to generate the decoded throttle recommendation comprises setting bits of the decoded throttle recommendation based on the second throttle value; and storing the set bits of the decoded throttle recommendation in consecutive bit positions from a first end of one of the plurality of throttle recommendation registers.

7. The IC chip of claim 6, the throttle management circuit further configured to generate the throttle result based on a state of a bit in a same bit position in each of the plurality of throttle recommendation registers.

8. The IC chip of claim 7, the throttle management circuit further configured to in each cycle of the clock signal:

generate the throttle result based on logical OR of the bit in a last bit position in the first end of each of the plurality of throttle recommendation registers;

shift the bits of the decoded throttle recommendation in each of the plurality of throttle recommendation registers by one bit position toward the first end; and reset a bit on a second end, opposite to the first end, of each of the plurality of throttle recommendation registers.

9. The IC chip of claim 6, the throttle management circuit further configured to store each decoded throttle recommendation received in a plurality of consecutive cycles of the clock signal in one of the plurality of throttle recommendation registers in a round-robin order.

10. The IC chip of claim 1, further comprising at least one state detection circuit configured to generate one of the at least one throttle request based on a detected change of a state of the processing circuits exceeding a threshold.

11. The IC chip of claim 10, further comprising a throttle value range configuration circuit configured to determine a third number of bits of the throttle request generated in each of the at least one state detection circuit.

12. The IC chip of claim 10, the at least one state detection circuit comprising a plurality of entries each configured to store the state in the processing circuits, wherein the at least one state detection circuit is further configured to, in each cycle of a first plurality of cycles:

shift the state stored in each of the plurality of entries in a first direction from a first entry toward a last entry;

store next state in the first entry;

generate a first sum of the plurality of entries excluding the last entry;

generate a second sum of the plurality of entries excluding the first entry; and generate the throttle request based on a difference between the first sum and the second sum.

13. The IC chip of claim 1, the throttle management circuit further configured to, in a cycle in which the throttle recommendation generated based on the at least one throttle request changes from the throttle recommendation generated in an immediately previous cycle by more than a threshold, generate the throttle result based on the throttle recommendation.

14. The IC chip of claim 1, wherein the state comprises one of a voltage, a peak power, a peak current, an average voltage, an average current, a temperature, and an activity measured using an activity measurement algorithm.

15. The IC chip of claim 1 integrated into a device selected from the group consisting of: a set-top box; an entertainment unit; a navigation device; a communications device; a fixed location data unit; a mobile location data unit; a global positioning system (GPS) device; a mobile phone; a cellular phone; a smartphone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

16. A method in an integrated circuit (IC) chip comprising a processor-based system, the method comprising:
- operating processing circuits in response to a clock signal and a throttle control signal;
- receiving, in a throttle management circuit, at least one throttle request indicating a change of a state of the processing circuits;
- generating a throttle recommendation based on the at least one throttle request;
- storing the throttle recommendation in one of a plurality of throttle recommendation registers; and
- in each cycle of the clock signal:
  - generating a throttle result based on throttle recommendations, comprising the throttle recommendation, stored in the plurality of throttle recommendation registers; and
  - generating the throttle control signal to selectively throttle operation of the processing circuits based on the throttle result.

17. The method of claim 16, further comprising:
- in response to receiving a first throttle request in a cycle of the clock signal, storing the first throttle request as a stored first throttle request and generating the throttle recommendation based on the first throttle request; and
- in response to not receiving the first throttle request in the cycle of the clock signal, generating the throttle recommendation based on the stored first throttle request.

18. The method of claim 17, further comprising indicating, by a first throttle value of a throttle request, a plurality of cycles to suspend operation in the processing circuits.

19. The method of claim 18, further comprising:
- generating the throttle recommendation comprising a second throttle value based on the at least one throttle request;
- decoding the second throttle value to generate a decoded throttle recommendation comprising a second number of bits; and
- storing the decoded throttle recommendation in one of the plurality of throttle recommendation registers;
- wherein the plurality of throttle recommendation registers comprises a first number of throttle recommendation registers each comprising at least the second number of bits.

20. The method of claim 19, further comprising:
- decoding the second throttle value to generate the decoded throttle recommendation comprises setting bits of the decoded throttle recommendation based on the second throttle value and aligning the set bits on a first end of the decoded throttle recommendation; and
- the set bits of the decoded throttle recommendation are stored consecutively from the first end of one of the plurality of throttle recommendation registers.

21. The method of claim 20, further comprising, in each cycle of the clock signal:
- generating the throttle result based on logical OR of a bit in a last bit position in the first end of each of the plurality of throttle recommendation registers;
- shifting the bits of the decoded throttle recommendation in each of the plurality of throttle recommendation registers by one bit position toward the first end; and
- resetting the bit on a second end, opposite to the first end, of each of the plurality of throttle recommendation registers.

22. The method of claim 21, further comprising storing the decoded throttle recommendation received in each cycle of a plurality of consecutive cycles in one of the plurality of throttle recommendation registers in a round-robin order.

23. The method of claim 16, further comprising generating one of the at least one throttle request based on a detected change of a state of the processing circuits exceeding a threshold.

24. The method of claim 16, further comprising, in each cycle of the clock signal:
- storing a state in the processing circuits in a state detection;
- shifting the state stored in each of a plurality of entries in a first direction from a first entry toward a last entry;
- storing a next state in the first entry;
- generating a first sum of the plurality of entries excluding the last entry;
- generating a second sum of the plurality of entries excluding the first entry; and
- generating the throttle request based on a difference between the first sum and the second sum.

25. The method of claim 16, further comprising, in each cycle of the clock signal in which the throttle recommendation generated based on the at least one throttle request changes from the throttle recommendation generated in an immediately previous cycle by more than a threshold, generating the throttle result based on the throttle recommendation.

* * * * *